(12) United States Patent
Lin et al.

(10) Patent No.: US 11,662,769 B2
(45) Date of Patent: May 30, 2023

(54) FOLDABLE ELECTRONIC DEVICE

(71) Applicants: Che-Hsien Lin, Taipei (TW); Ko-Yen Lu, Taipei (TW); Che-Hsien Chu, Taipei (TW)

(72) Inventors: Che-Hsien Lin, Taipei (TW); Ko-Yen Lu, Taipei (TW); Che-Hsien Chu, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 204 days.

(21) Appl. No.: 17/010,835

(22) Filed: Sep. 3, 2020

(65) Prior Publication Data

US 2021/0064084 A1    Mar. 4, 2021

Related U.S. Application Data

(60) Provisional application No. 62/894,979, filed on Sep. 3, 2019, provisional application No. 62/911,195, filed on Oct. 4, 2019, provisional application No. 62/940,215, filed on Nov. 25, 2019, provisional application No. 62/978,796, filed on Feb. 19, 2020.

(51) Int. Cl.
*G06F 1/16* (2006.01)

(52) U.S. Cl.
CPC .......... *G06F 1/1616* (2013.01); *G06F 1/1681* (2013.01)

(58) Field of Classification Search
None
See application file for complete search history.

(56) References Cited

U.S. PATENT DOCUMENTS

| | | | | |
|---|---|---|---|---|
| 9,348,450 | B1* | 5/2016 | Kim | G06F 1/1616 |
| 9,714,533 | B2* | 7/2017 | Kuramochi | G06F 1/1681 |
| 2009/0080153 | A1* | 3/2009 | Richardson | A45F 5/00 |
| | | | | 361/679.55 |
| 2011/0228458 | A1* | 9/2011 | Richardson | B29C 45/1676 |
| | | | | 361/679.01 |
| 2012/0045679 | A1* | 2/2012 | Ishida | H04M 1/0262 |
| | | | | 429/100 |
| 2018/0059735 | A1* | 3/2018 | Tazbaz | G06F 1/1677 |
| 2018/0066465 | A1* | 3/2018 | Tazbaz | E05D 11/1007 |
| 2018/0164855 | A1* | 6/2018 | Tazbaz | G06F 1/1641 |
| 2018/0292860 | A1* | 10/2018 | Siddiqui | H04M 1/0216 |

* cited by examiner

*Primary Examiner* — Anthony Q Edwards
*Assistant Examiner* — Rashen E Morrison
(74) *Attorney, Agent, or Firm* — JCIPRNET

(57) ABSTRACT

A foldable electronic device includes a first body, a second body, a dual-axis hinge module, a first linkage mechanism, a second linkage mechanism, a first object and a second object. The dual-axis hinge module is disposed between the first body and the second body. The first linkage mechanism is disposed to the first body and is coupled to the dual-axis hinge module. The second linkage mechanism is disposed to the second body and is coupled to the dual-axis hinge module. The first object is slidably disposed to the first body and connected to the first linkage mechanism. The second object is slidably disposed to the second body and connected to the second linkage mechanism.

30 Claims, 81 Drawing Sheets

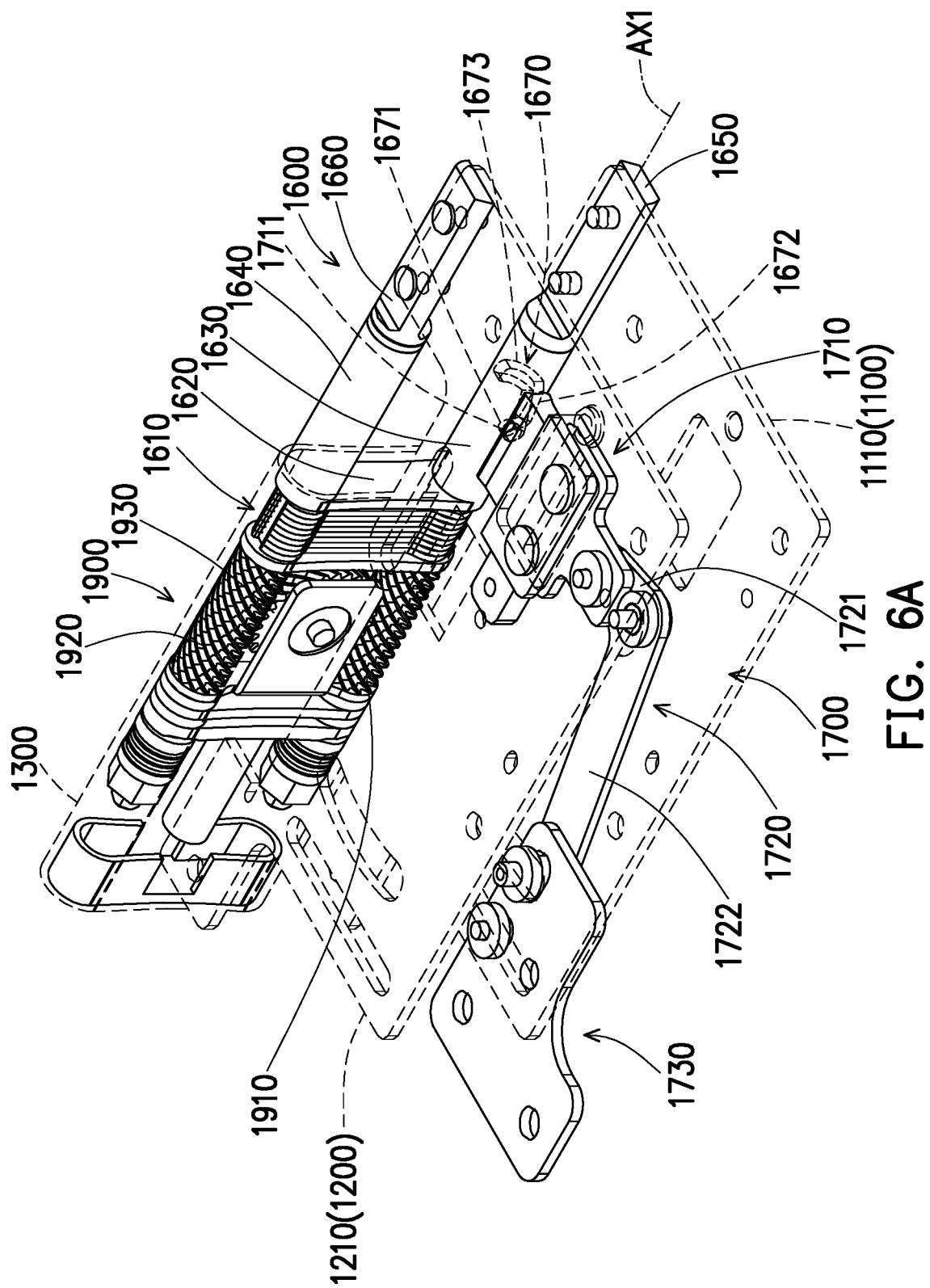

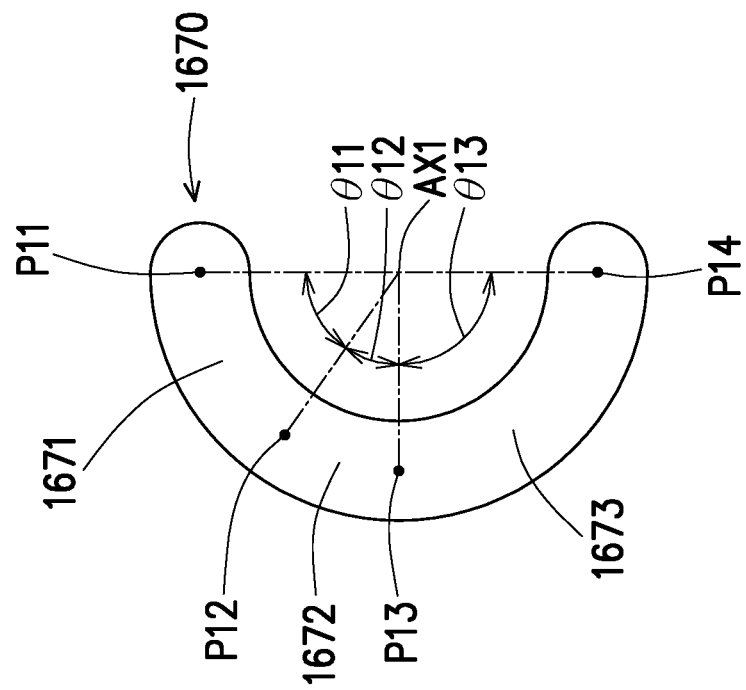
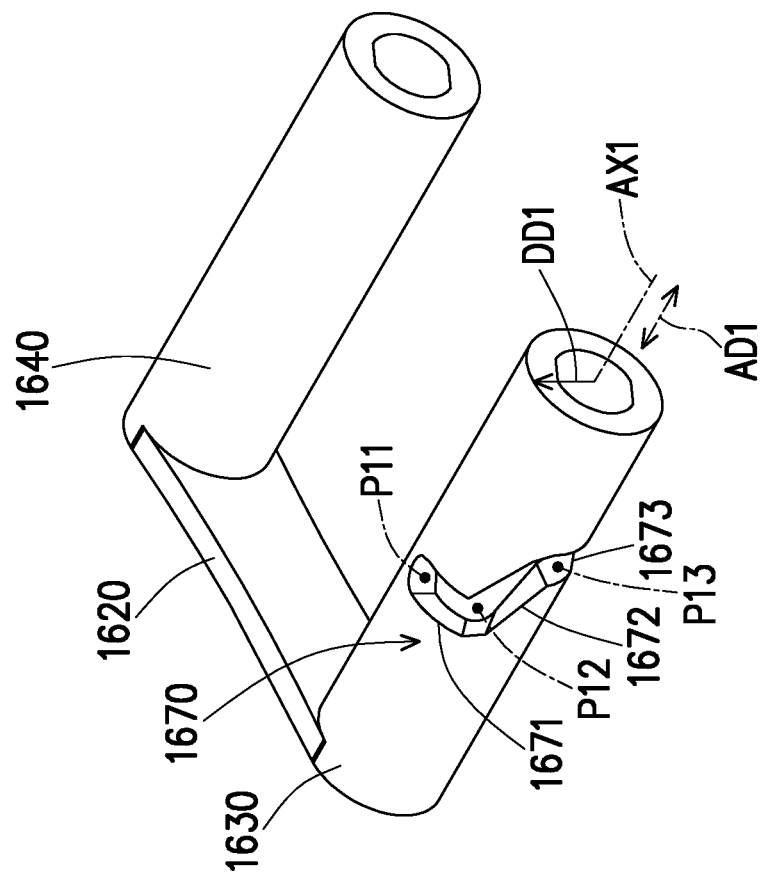
FIG. 6D
FIG. 6C

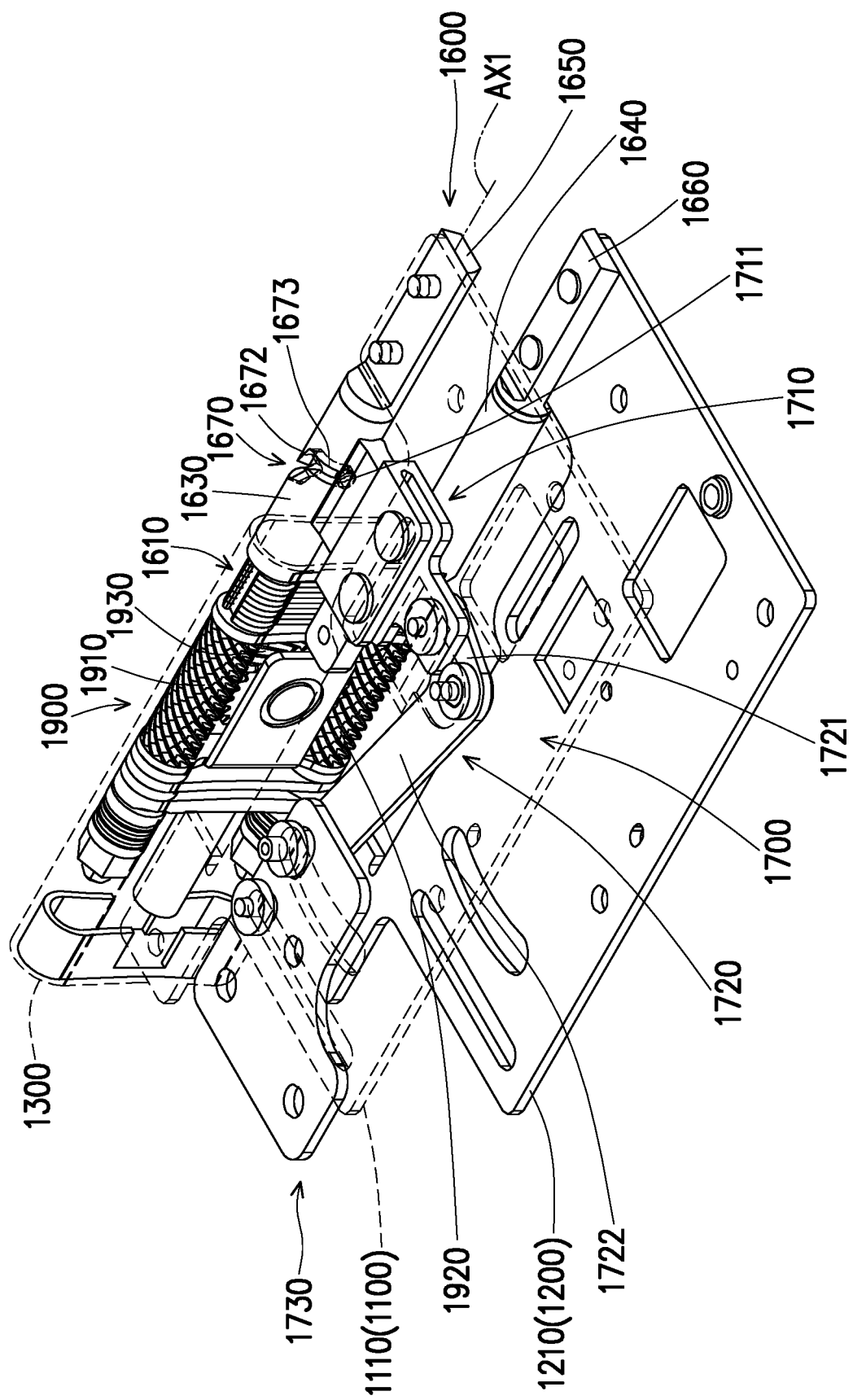

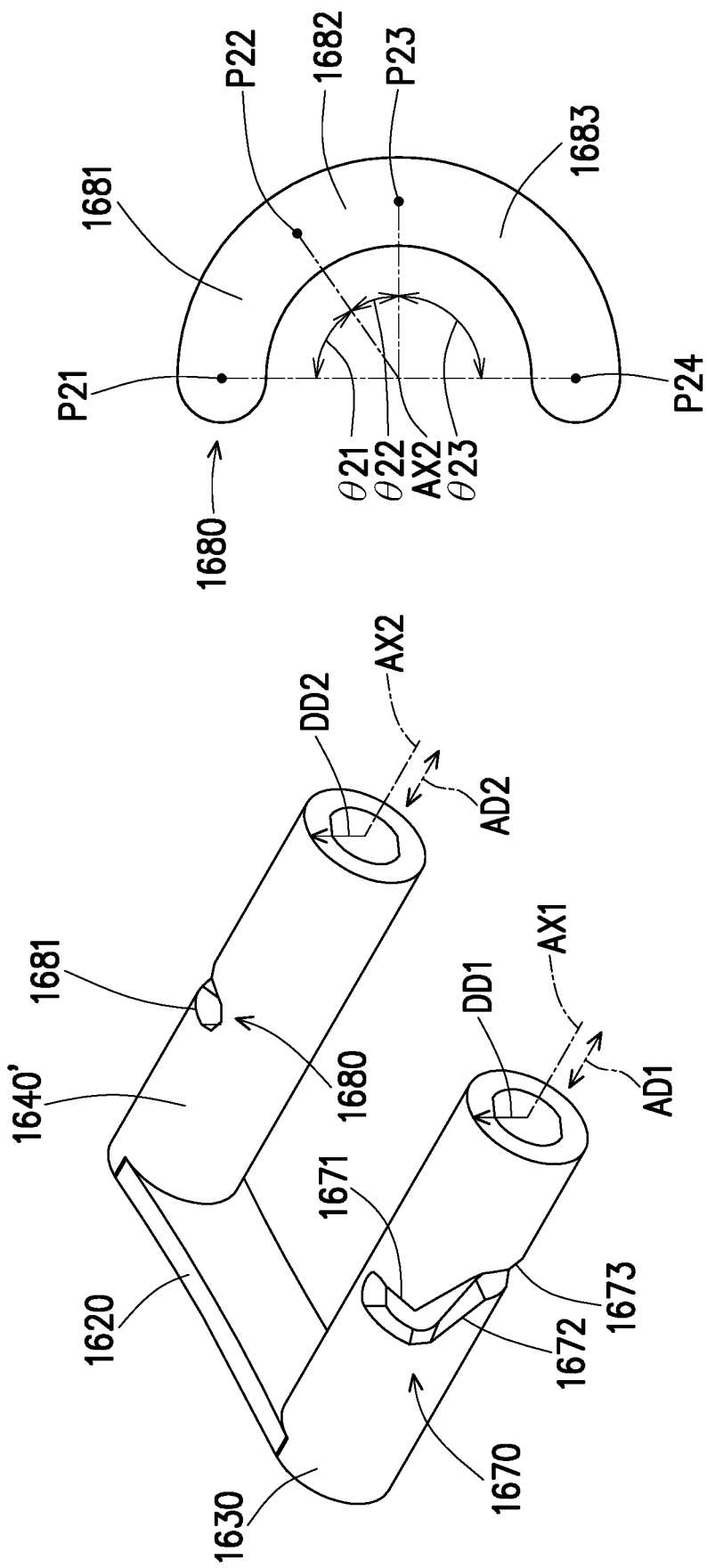

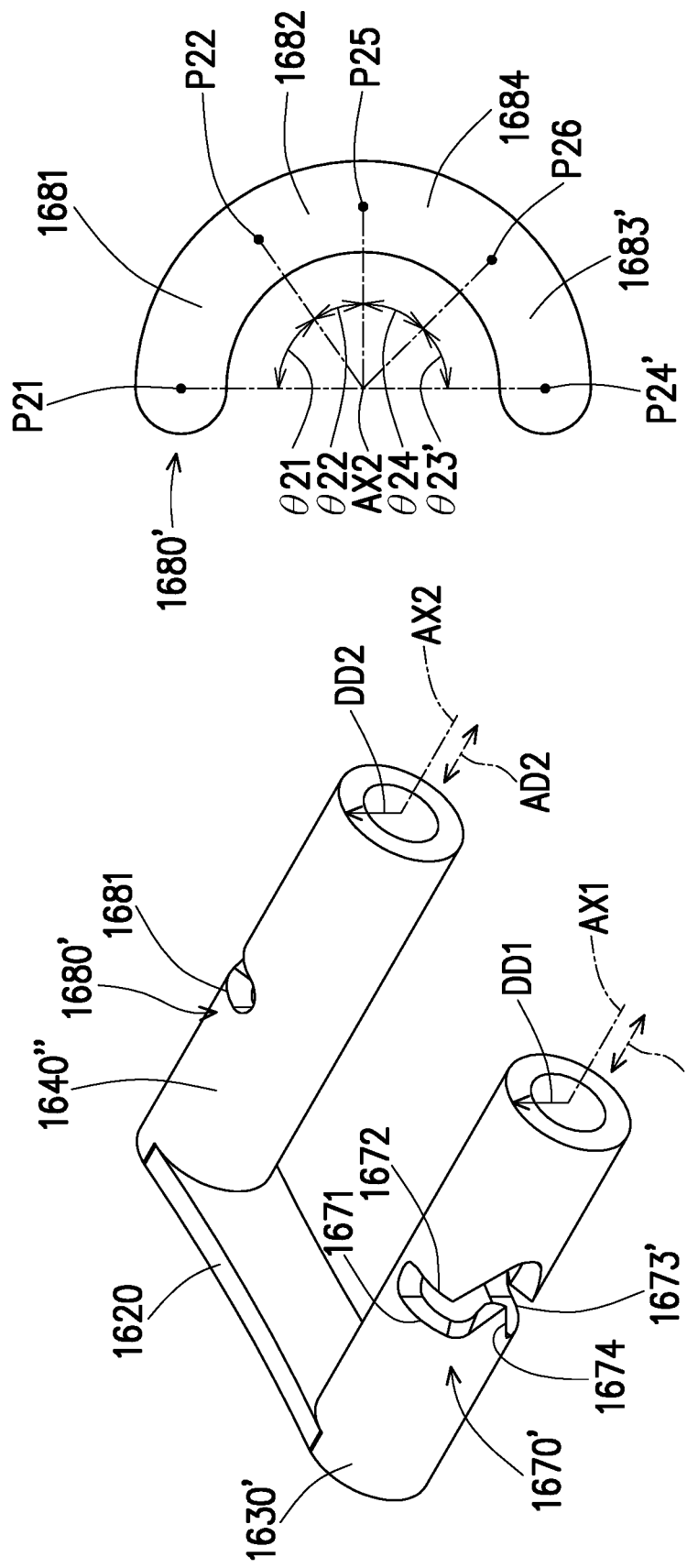

FOLDABLE ELECTRONIC DEVICE

CROSS-REFERENCE TO RELATED APPLICATION

This application claims the priority benefit of U.S. provisional application Ser. No. 62/894,979, filed on Sep. 3, 2019, U.S. provisional application Ser. No. 62/911,195, filed on Oct. 4, 2019, U.S. provisional application Ser. No. 62/940,215, filed on Nov. 25, 2019, and U.S. provisional application Ser. No. 62/978,796, filed on Feb. 19, 2020. The entirety of each of the above-mentioned patent applications is hereby incorporated by reference herein and made a part of this specification.

BACKGROUND

Field of the Disclosure

The disclosure relates to an electronic device, and particularly relates to a foldable electronic device.

Description of Related Art

Generally speaking, a foldable electronic device adopts a hinge module or a dual-axis hinge module for connecting two bodies, so that the two bodies can be opened or closed relative to each other. As consumers have increasingly higher requirement for the size of display screen, there have been foldable electronic devices with dual display screens available on the market. Such foldable electronic devices are provided with two display screens at the two bodies respectively, so that a display picture larger than the conventional foldable electronic device can be provided. However, in the existing foldable electronic devices on the market, in order to prevent the two display screens from interfering with each other when the two bodies are opened or closed, the typical design is that a large distance is provided between the two display screens and the hinge module or the dual-axis hinge module. In this manner, when the two display screens are parallel to each other, there is an excessively large distance between the two display screens, and the large distance hinders the visual continuity between the two display screens; therefore, the user's viewing experience is unfavorable.

SUMMARY OF THE DISCLOSURE

The disclosure provides a foldable electronic device, which can solve the problem of poor viewing experience caused by the existing foldable electronic device.

In the disclosure, a foldable electronic device includes a first body, a second body, a dual-axis hinge module, a first linkage mechanism, a second linkage mechanism, a first object and a second object. The dual-axis hinge module is disposed between the first body and the second body. The first linkage mechanism is disposed on the first body and is coupled to the dual-axis hinge module. The second linkage mechanism is disposed on the second body and is coupled to the dual-axis hinge module. The first object is slidably disposed on the first body and connected to the first linkage mechanism. The second object is slidably disposed on the second body and connected to the second linkage mechanism. When the first body and the second body are relatively rotated through the dual-axis hinge module to have a first included angle, the first object is at a first initial position relative to the first body, and the second object is at a second initial position relative to the second body. When the first body and the second body are rotated relative to each other through the dual-axis hinge module to have a second included angle, the first object slides relative to the first body to move away from the first initial position, the second object slides relative to the second body to move away from the second initial position, and the first object and the second object are relatively close to each other. The second included angle is different from the first included angle.

Based on the above, in the foldable electronic device of the disclosure, when the two bodies are parallel to each other, by at least making the first object to slide closer to the second object, the distance between the first object and the second object can be eliminated, such that a better viewing effect can be achieved.

In order to make the above-mentioned features and advantages of the present disclosure more obvious and understandable, the embodiments are specifically described below in detail in conjunction with the accompanying drawings.

BRIEF DESCRIPTION OF THE DRAWINGS

FIG. 6A is a perspective schematic view of the internal components of the foldable electronic device according to an embodiment of the disclosure.

FIG. 6C illustrates a partial enlarged schematic view of the connecting portion, the first guiding portion, the first bushing and the second bushing in FIG. 6B from a different perspective.

FIG. 6D is a schematic view of the design principle of the first guiding portion in FIG. 6C.

FIG. 6E to FIG. 6H are schematic views of different states of the components in FIG. 6A.

FIG. 7C illustrates a partial enlarged schematic view of the connecting portion, the first guiding portion, the second guiding portion, the first bushing and the second bushing in FIG. 7B from a different perspective.

FIG. 7D is a schematic view of the design principle of the first guiding portion in FIG. 7C.

FIG. 9C illustrates a partial enlarged schematic view of the connecting portion, the first guiding portion, the second guiding portion, the first bushing and the second bushing in FIG. 9B from a different perspective.

FIG. 9D is a schematic view of the design principle of the first guiding portion in FIG. 9C.

DESCRIPTION OF EMBODIMENTS

Figure 1:
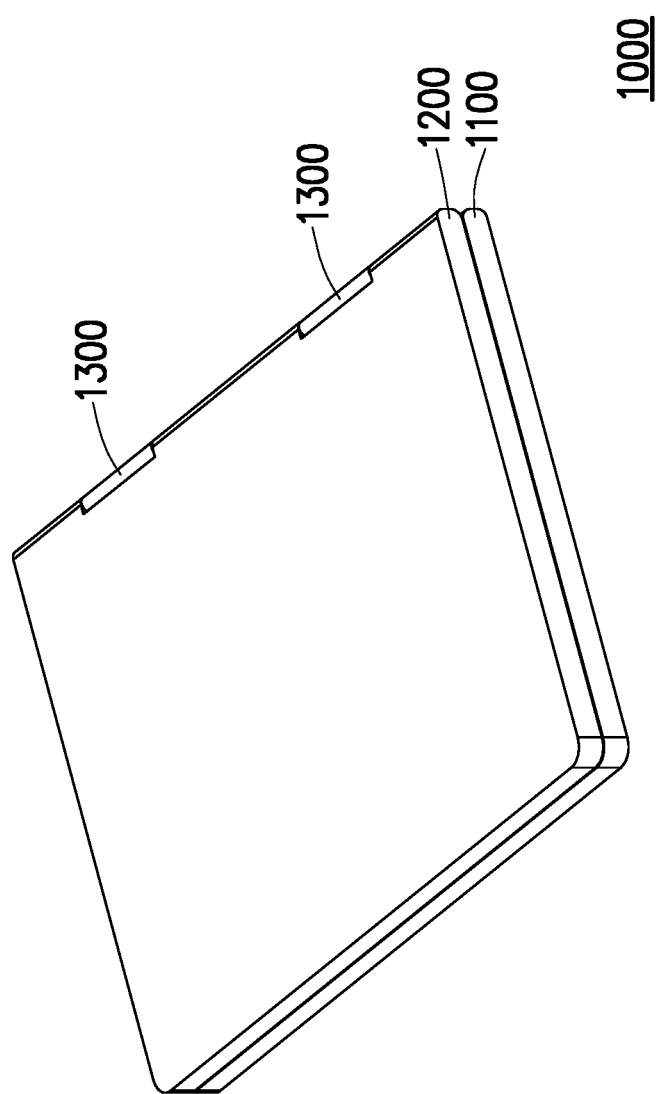
FIG. 1 is a perspective schematic view of a foldable electronic device according to an embodiment of the disclosure.
Figure 2:
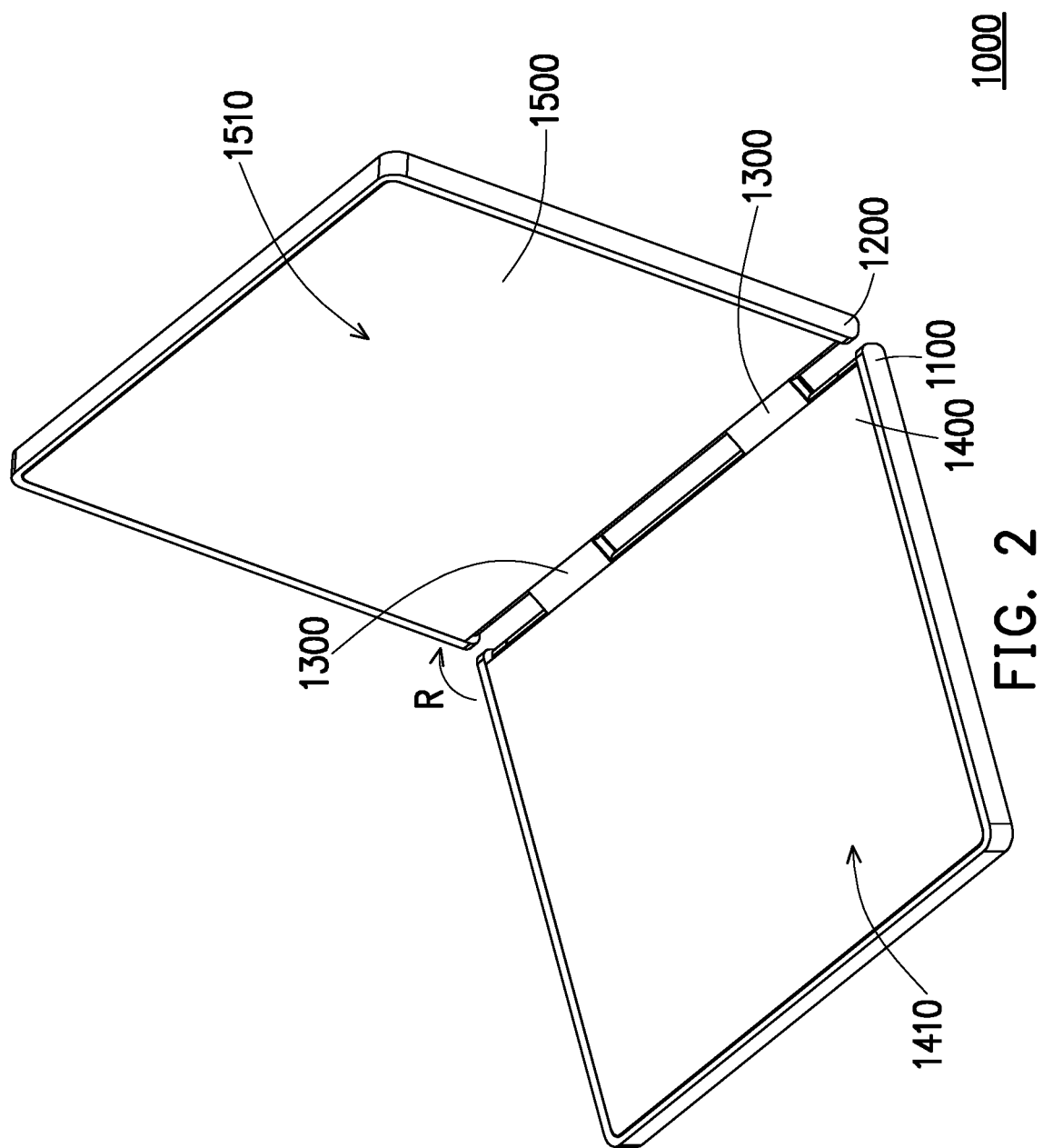
FIG. 2 is a perspective schematic view showing that the first body and the second body of the foldable electronic device have a first included angle relative to each other according to an embodiment of the disclosure.

FIG. 1 is a perspective schematic view of a foldable electronic device according to an embodiment of the disclosure. FIG. 2 is a perspective schematic view showing that the first body and the second body of the foldable electronic device have a first included angle relative to each other according to an embodiment of the disclosure. Please refer to FIG. 1 and FIG. 2 both. The foldable electronic device 1000 of the disclosure includes a first body 1100, a second body 1200, two hinge covers 1300, a first object 1400, and a second object 1500. The foldable electronic device 1000 is, for example but not limited to, a notebook computer. The first object 1400 is, for example but not limited to, a keyboard, a touch panel, a speaker, or a display screen. The disclosure provides no limitation to the first object 1400, and those of ordinary skill in the art can replace the first object 1400 with any object as required. The second object 1500 is, for example but not limited to, a display screen. In other words, among the first object 1400 and the second object 1500, at least the second object 1500 is a display screen. In a preferred embodiment, both the first object 1400 and the second object 1500 are display screens to provide a larger display picture.

It should be particularly noted that the denotation "first", "second", etc. used with the nouns in this disclosure are only for intuitive identification, so that readers can read them easily, and are not intended to limit this disclosure.

In detail, the two hinge covers 1300 are located between the first body 1100 and the second body 1200, and is configured to accommodate internal components that will be described later. The internal component at least includes a dual-axis hinge module, and the dual-axis hinge module can be connected to or provided with any mechanism. The first body 1100 and the second body 1200 are pivotally connected to each other through a dual-axis hinge module to be described later. The first object 1400 is connected to the first body 1100, and the first object 1400 has a first top surface 1410. The second object 1500 is connected to the second body 1200, and the second object 1500 has a second top surface 1510.

In an embodiment, the foldable electronic device 1000 in the state shown in FIG. 1 can be unfolded to the state shown in FIG. 2. When the foldable electronic device 1000 is in the state shown in FIG. 1, the first body 1100 and the second body 1200 are closed relative to each other, and the first top surface 1410 and the second top surface 1510 face each other. When the second body 1200 is unfolded relative to the first body 1100 to the state shown in FIG. 2 along the unfolding direction R, there is a first included angle between the first body 1100 and the second body 1200, and the second top surface 1510 has a first included angle as being unfolded relative to the first top surface 1410. In the state shown in FIG. 2, the second top surface 1510 is, for example but not limited to, unfolded by 110 degrees relative to the first top surface 1410. In other words, the second top surface 1510 is, for example but not limited to, inclined by 110 degrees relative to the first top surface 1410; that is, the first included angle is, for example but not limited to, 110 degrees. Under the condition, the first object 1400 does not slide, and the second object 1500 does not slide.

Figure 3A:
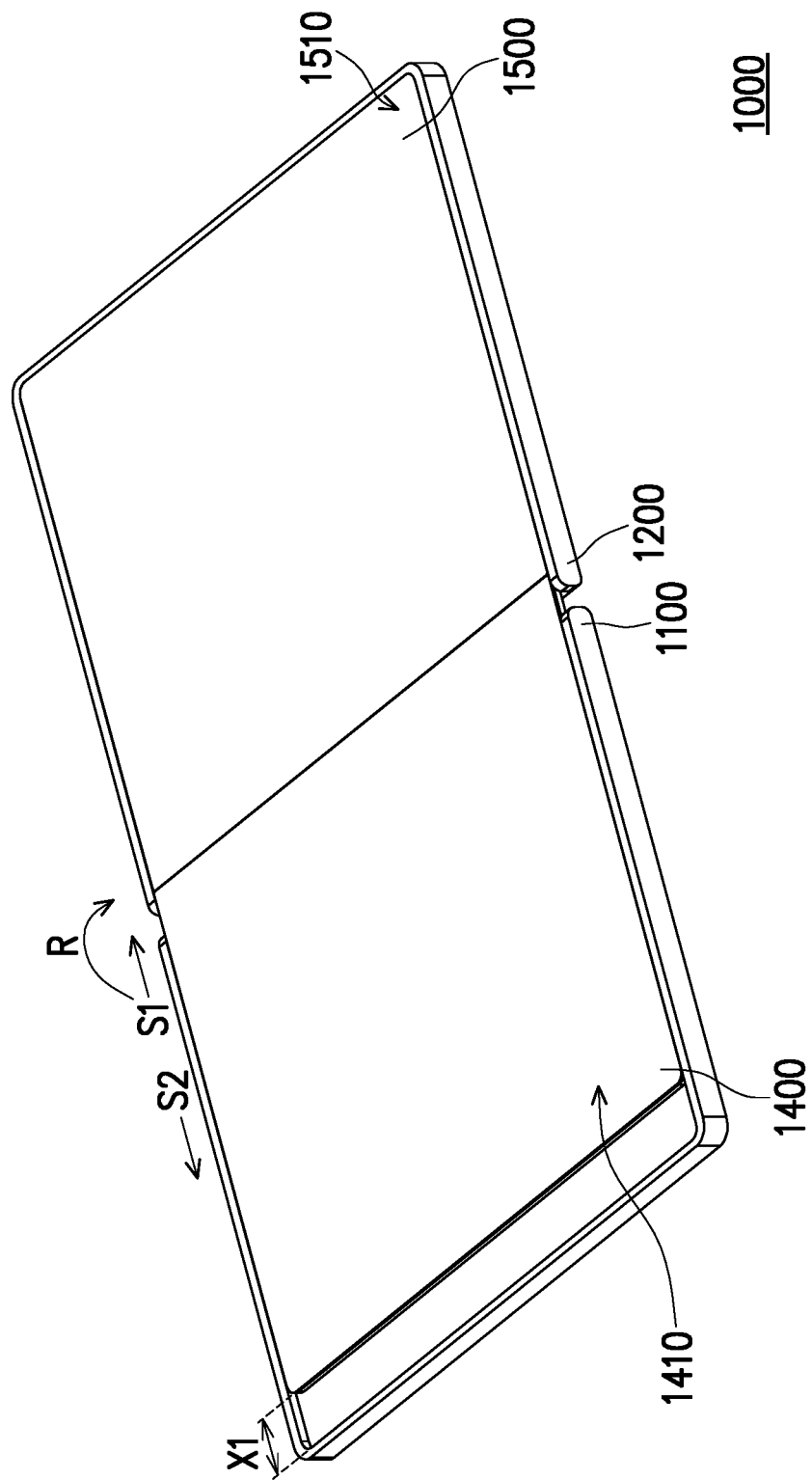
FIG. 3A is a perspective schematic view showing that the first body and the second body of the foldable electronic device have a second included angle relative to each other according to an embodiment of the disclosure.

FIG. 3A is a perspective schematic view showing that the first body and the second body of the foldable electronic device have a second included angle relative to each other according to an embodiment of the disclosure. In an embodiment, the foldable electronic device 1000 in the state shown in FIG. 1 and FIG. 2 can be further unfolded to the state shown in FIG. 3A, and the first object 1400 is slidably disposed on the first body 1100. In the state shown in FIG. 2, the position of the first object 1400 relative to the first body 1100 is defined as the first initial position, that is, the position of the first object 1400 in FIG. 2 is defined as the first initial position. When the second body 1200 is unfolded relative to the first body 1100 along the unfolding direction R from the state shown in FIG. 2 to the state shown in FIG. 3A, there is a second included angle between the first body 1100 and the second body 1200, and the second top surface 1510 has a second included angle as being unfolded relative to the first top surface 1410, and the first object 1400 automatically slides toward the hinge cover 1300 and the second object 1500 along the first sliding direction S1. The second included angle is, for example but not limited to, 180 degrees. In other words, under the condition, the second body 1200 is unfolded by 180 degrees in total relative to the first body 1100, and the first object 1400 slides by the first displacement X1 in total and is relatively close to the second object 1500. The first object 1400, for example but not limited to, abuts against the second object 1500, so that there is no gap between the first object 1400 and the second object 1500, and the user can have a better viewing experience when viewing the first object 1400 and the second object 1500. In other embodiments, the first object can slide close to but not abut against the second object according to design requirements.

Figure 3B:
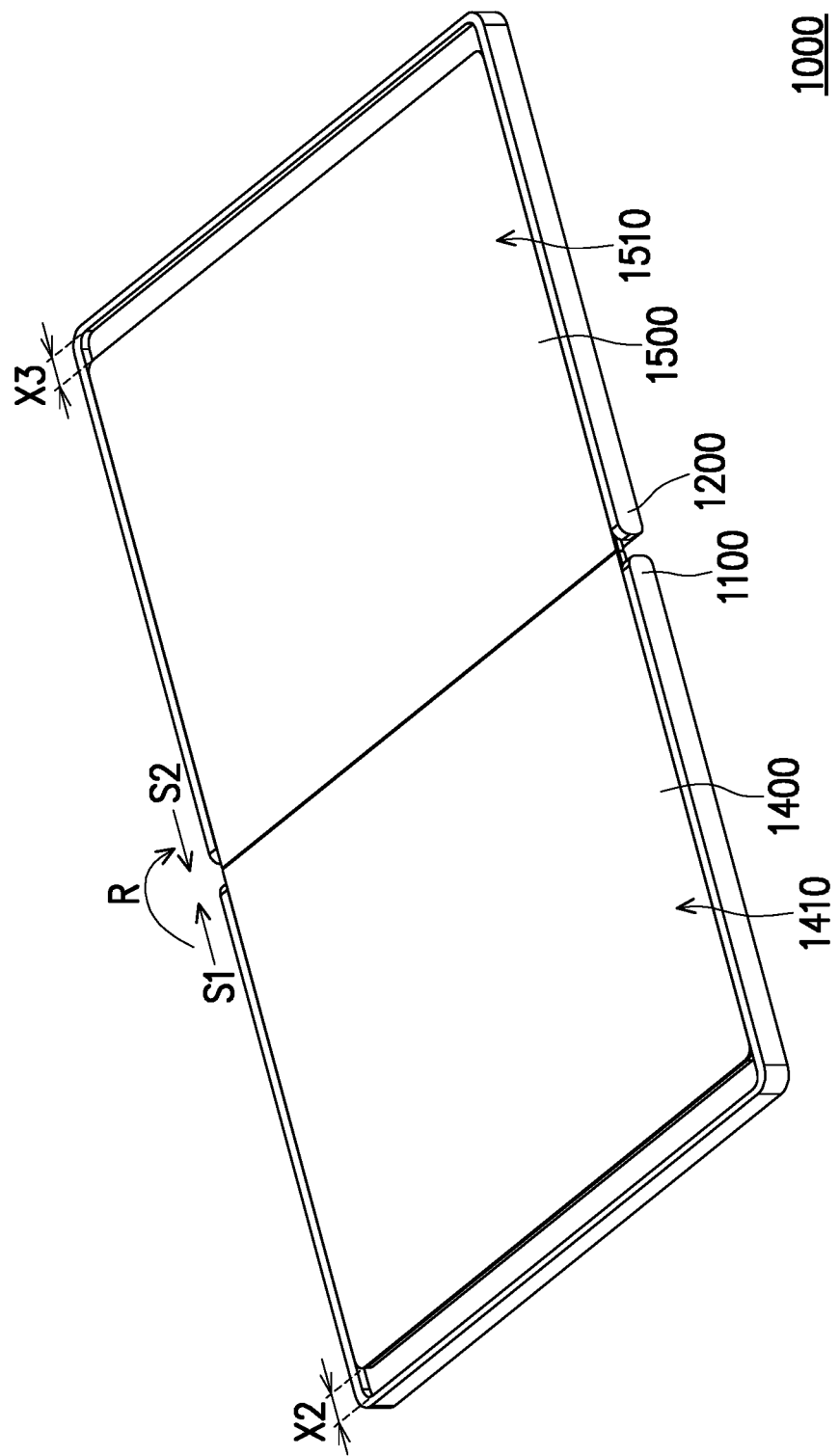
FIG. 3B is a perspective schematic view showing that the first body and the second body of the foldable electronic device have a second included angle relative to each other according to an embodiment of the disclosure.

FIG. 3B is a perspective schematic view showing that the first body and the second body of the foldable electronic device have a second included angle relative to each other according to an embodiment of the disclosure. In an embodiment, the foldable electronic device 1000 in the state shown in FIG. 1 and FIG. 2 can be further unfolded to the state shown in FIG. 3B, and the first object 1400 is slidably disposed on the first body 1100, and the second object 1500 is slidably disposed on the second body 1200. In the state shown in FIG. 2, the position of the first object 1400 relative to the first body 1100 is defined as the first initial position, and the position of the second object 1500 relative to the second body 1200 is defined as the second initial position. When the second body 1200 is unfolded relative to the first body 1100 along the unfolding direction R from the state shown in FIG. 2 to the state shown in FIG. 3A, there is a second included angle between the first body 1100 and the second body 1200, and the second top surface 1510 has a second included angle as being unfolded relative to the first top surface 1410. The first object 1400 automatically slides toward the hinge cover 1300 and the second object 1500 along the first sliding direction S1, and the second object 1500 automatically slides toward the hinge cover 1300 and the first object 1400 along the second sliding direction S2. The second included angle is, for example but not limited to, 180 degrees. In other words, under the condition, the second body 1200 is unfolded by 180 degrees in total relative to the first body 1100. The first object 1400 slides by the second displacement X2 in total, the second object 1500 slides by the third displacement X3 in total, and the first object 1400 and the second object 1500 are relatively close to each other. The second displacement X2 is, for example but not limited to, the same as the third displacement X3. The first object 1400 and the second object 1500, for example but not limited to, abut against each other, so that there is no gap between the first object 1400 and the second object 1500, and the user can obtain a better viewing experience when viewing the first object 1400 and the second object 1500. In other embodiments, the first object and the second object can slide close to each other but not abut against each other according to design requirements, and the second displacement can be set to be different from the third displacement according to design requirements.

Figure 4A:
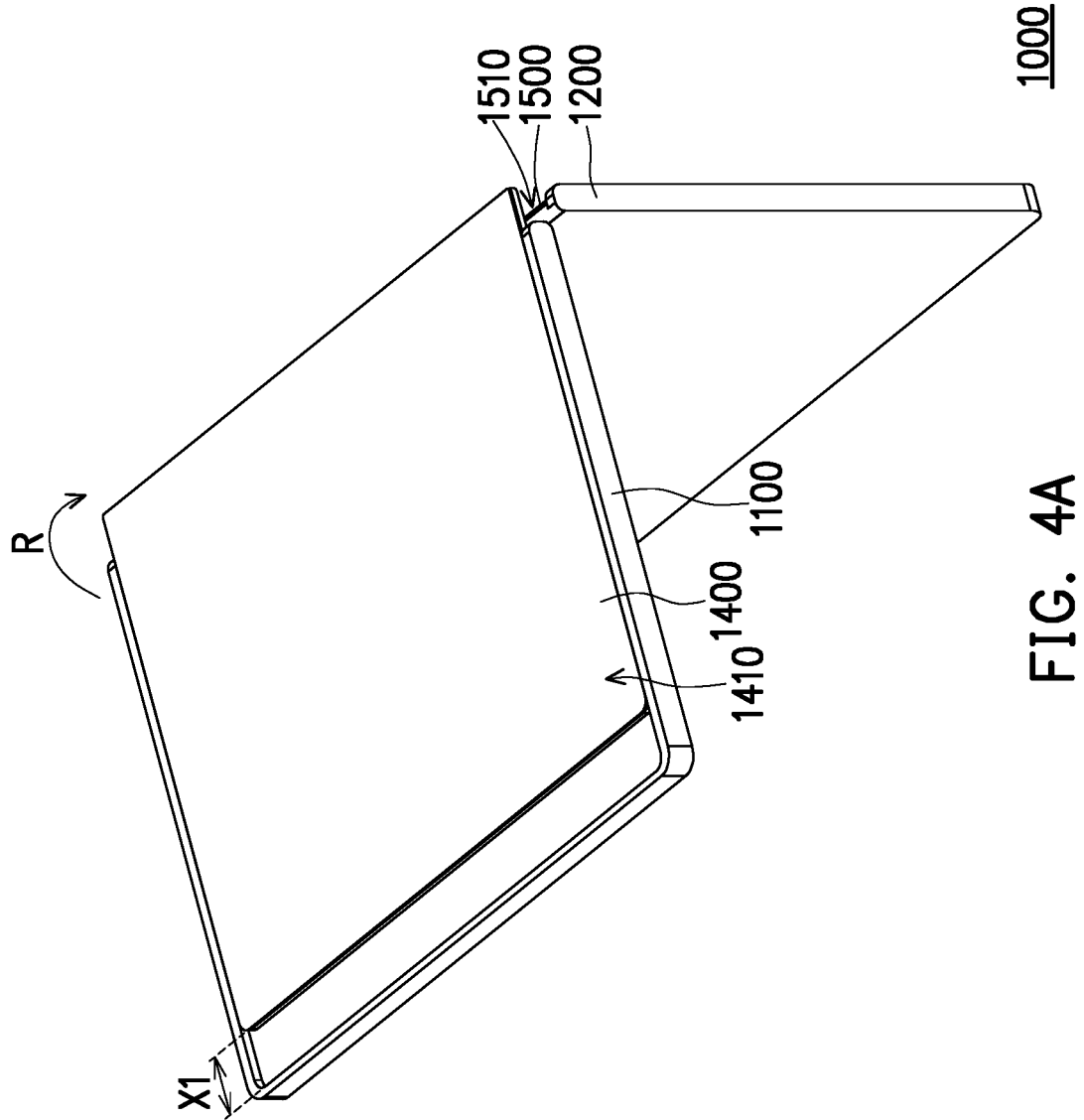
FIG. 4A is a perspective schematic view showing that the first body and the second body of the foldable electronic device have a fourth included angle relative to each other according to an embodiment of the disclosure.

FIG. 4A is a perspective schematic view showing that the first body and the second body of the foldable electronic device have a fourth included angle relative to each other according to an embodiment of the disclosure. In an embodiment, the foldable electronic device 1000 in the state shown in FIG. 1, FIG. 2 and FIG. 3A can be further unfolded to the state shown in FIG. 4A. When the second body 1200 is unfolded relative to the first body 1100 along the unfolding direction R from the state shown in FIG. 3A to the state shown in FIG. 4A, there is a fourth included angle between the first body 1100 and the second body 1200, and the second top surface 1510 has a fourth included angle as being unfolded relative to the first top surface 1410. In the state shown in FIG. 4A, the second top surface 1510 is, for example but not limited to, unfolded by a total of 270 degrees relative to the first top surface 1410. In other words, the second top surface 1510 is inclined by 270 degrees relative to the first top surface 1410, that is, the fourth included angle is, for example but not limited to 270 degrees. Compared with being having the second included angle, the first object 1400 does not slide at all, and therefore the relative positions of the first object 1400 and the first body 1100 remain unchanged, that is, the first object 1400 still slides relative to the first body 1100 by the first displacement X1 and is relatively close to the hinge cover 1300.

Figure 4B:
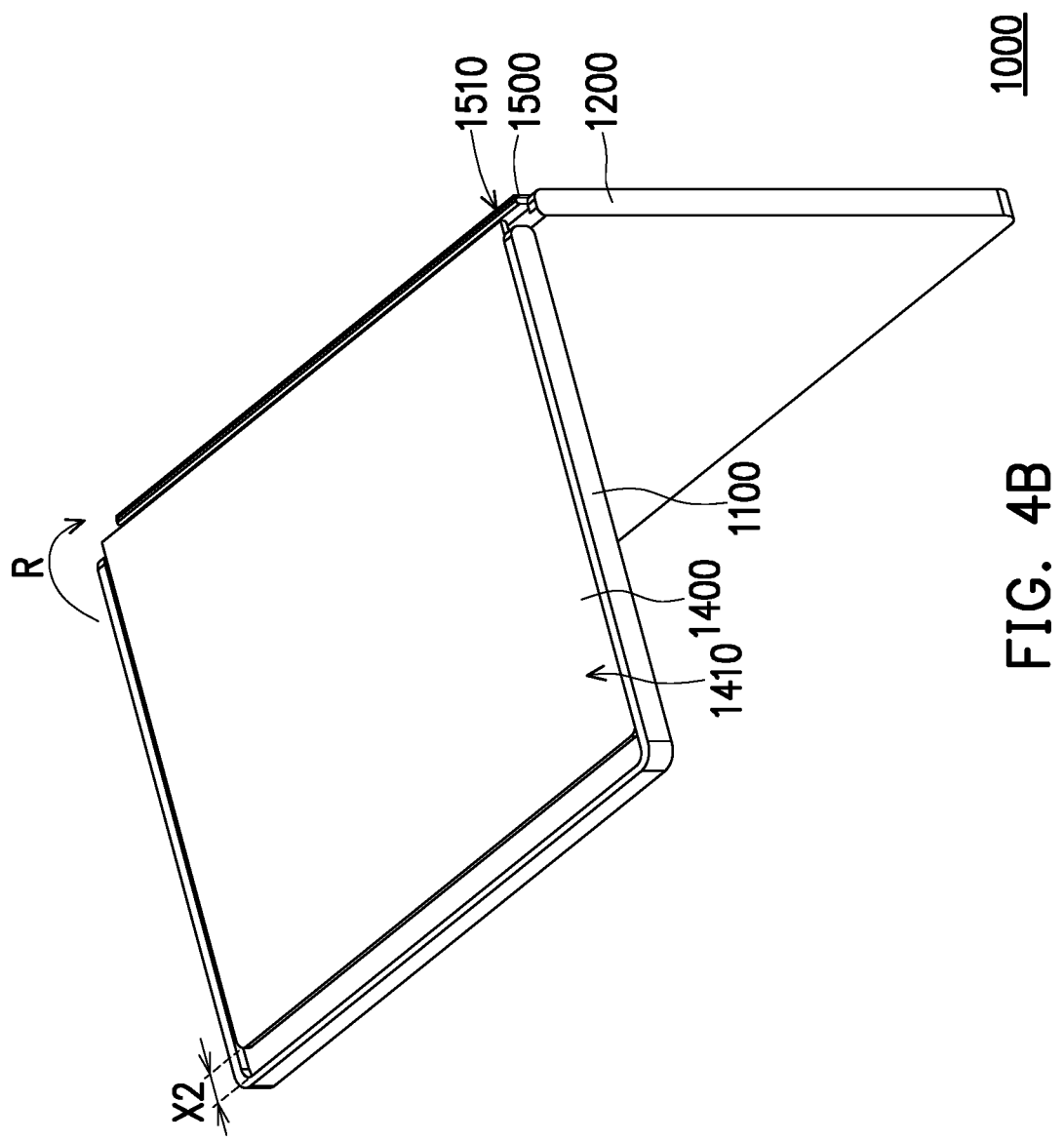
FIG. 4B is a perspective schematic view showing that the first body and the second body of the foldable electronic device have a fourth included angle relative to each other according to an embodiment of the disclosure.

FIG. 4B is a perspective schematic view showing that the first body and the second body of the foldable electronic device have a fourth included angle relative to each other according to an embodiment of the disclosure. In an embodiment, the foldable electronic device 1000 in the state shown in FIG. 1, FIG. 2 and FIG. 3B can be further unfolded to the state shown in FIG. 4B. When the second body 1200 is unfolded relative to the first body 1100 along the unfolding direction R from the state shown in FIG. 3B to the state shown in FIG. 4B, there is a fourth included angle between the first body 1100 and the second body 1200, and the second top surface 1510 has a fourth included angle as being unfolded relative to the first top surface 1410. In the state shown in FIG. 4B, the second top surface 1510 is, for example but not limited to, unfolded by a total of 270 degrees relative to the first top surface 1410. In other words, the second top surface 1510 is inclined by 270 degrees relative to the first top surface 1410, that is, the fourth included angle is, for example but not limited to 270 degrees. Compared with being having the second included angle, the first object 1400 and the second object 1500 do not slide at all, and therefore the relative positions of the first object 1400 and the first body 1100 remain unchanged, and the relative positions of the second object 1500 and the second body 1200 remain unchanged. In other words, the first object 1400 still slides relative to the first body 1100 by the second displacement X2 and is relatively close to the hinge cover 1300, and the second object 1500 still slides relative to the second body 1200 by the third displacement X3 and is relatively close to the hinge cover 1300.

Figure 4C:
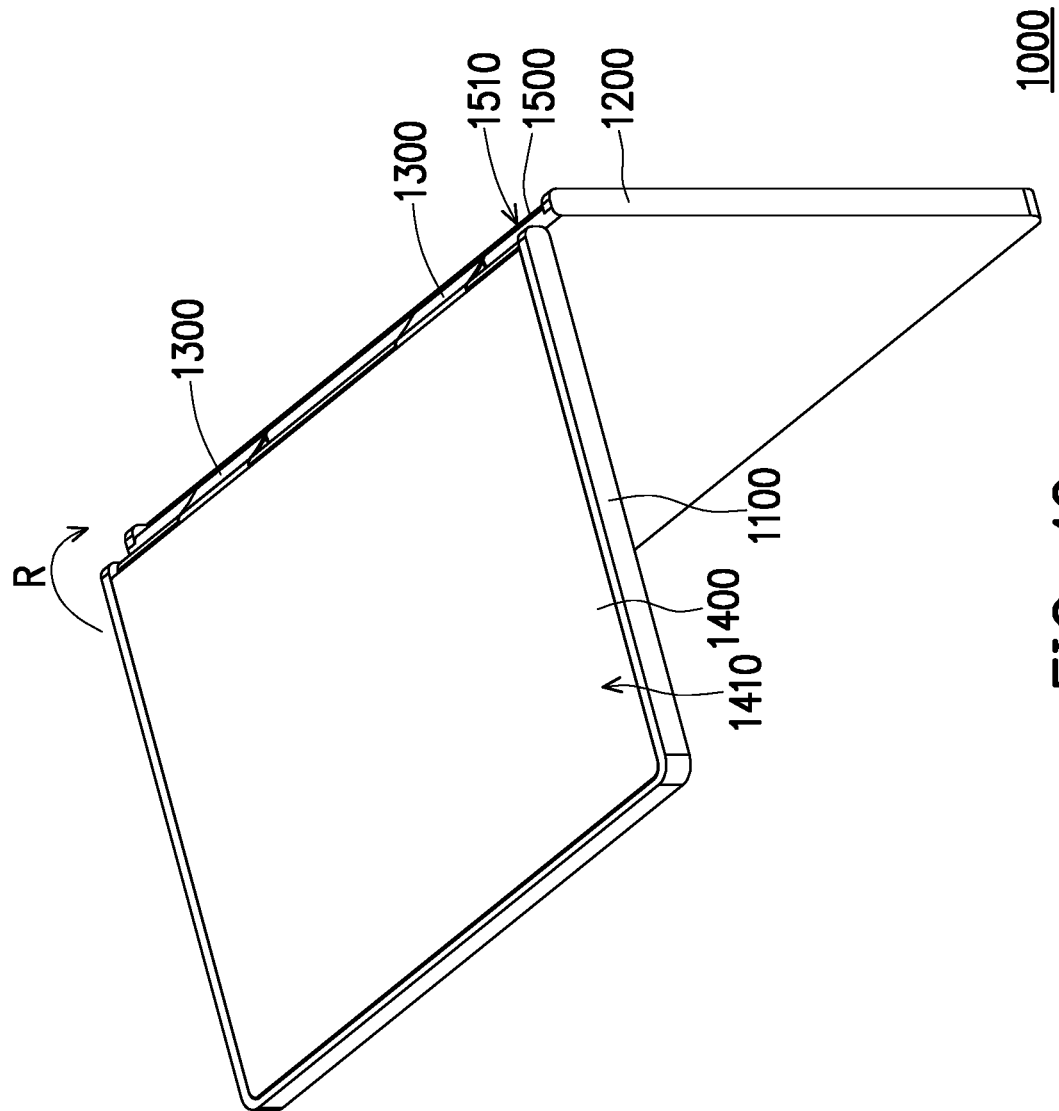
FIG. 4C is a perspective schematic view showing that the first body and the second body of the foldable electronic device have a fourth included angle relative to each other according to an embodiment of the disclosure.

FIG. 4C is a perspective schematic view showing that the first body and the second body of the foldable electronic device have a fourth included angle relative to each other according to an embodiment of the disclosure. In an embodiment, the foldable electronic device 1000 in the state shown in FIG. 1, FIG. 2 and FIG. 3A can be further unfolded to the state shown in FIG. 4C. When the second body 1200 is unfolded relative to the first body 1100 along the unfolding direction R from the state shown in FIG. 3A to the state shown in FIG. 4C, there is a fourth included angle between the first body 1100 and the second body 1200, and the second top surface 1510 has a fourth included angle as being unfolded relative to the first top surface 1410. In the state shown in FIG. 4C, the second top surface 1510 is, for example but not limited to, unfolded by a total of 270 degrees relative to the first top surface 1410. In other words, the second top surface 1510 is inclined by 270 degrees relative to the first top surface 1410, that is, the fourth included angle is, for example but not limited to 270 degrees. In addition, the first object 1400 automatically slides in a second sliding direction S2 opposite to the first sliding direction S1, so that the first object 1400 slides to the first initial position relative to the first body 1100. That is to say, the first object 1400 automatically slides in a direction opposite to the hinge cover 1300 and is relatively far away from the hinge cover 1300.

In an embodiment, the foldable electronic device 1000 in the state shown in FIG. 1, FIG. 2 and FIG. 3B can be further unfolded to the state shown in FIG. 4C. When the second body 1200 is unfolded relative to the first body 1100 in the unfolding direction R from the state shown in FIG. 3B to the state shown in FIG. 4C, there is a fourth included angle between the first body 1100 and the second body 1200, and the second top surface 1510 has a fourth included angle as being unfolded relative to the first top surface 1410. In the state shown in FIG. 4C, the second top surface 1510 is, for example but not limited to, unfolded by a total of 270 degrees relative to the first top surface 1410. In other words, the second top surface 1510 is inclined by 270 degrees relative to the first top surface 1410, that is, the fourth included angle is, for example but not limited to 270 degrees. In addition, the first object 1400 automatically slides in a second sliding direction S2 opposite to the first sliding direction S1, so that the first object 1400 slides to the first initial position relative to the first body 1100. Moreover, the second object 1500 automatically slides in the first sliding direction S1 opposite to the second sliding direction S2, so that the second object 1500 slides to the second initial position relative to the second body 1200. In other words, the first object 1400 automatically slides in a direction opposite to the hinge cover 1300 and is relatively away from the hinge cover 1300, and the second object 1500 automatically slides in a direction opposite to the hinge cover 1300 and is relatively away from the hinge cover 1300.

Figure 5A:
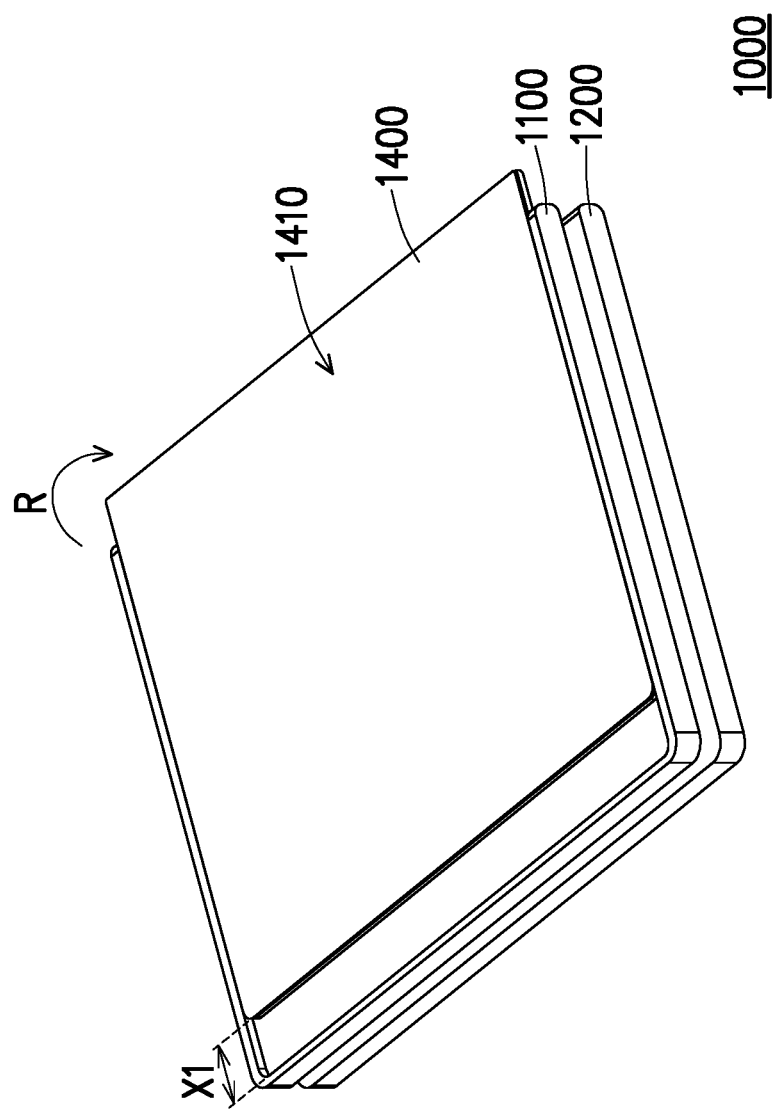
FIG. 5A is a perspective schematic view showing that the first body and the second body of the foldable electronic device have a third included angle relative to each other according to an embodiment of the disclosure.

FIG. 5A is a perspective schematic view showing that the first body and the second body of the foldable electronic device have a third included angle relative to each other according to an embodiment of the disclosure. In an embodiment, the foldable electronic device 1000 in the state shown in FIG. 1, FIG. 2, FIG. 3A, and FIG. 4A can be further unfolded to the state shown in FIG. 5A. When the second body 1200 is unfolded relative to the first body 1100 along the unfolding direction R from the state shown in FIG. 4A to the state shown in FIG. 5A, there is a third included angle between the first body 1100 and the second body 1200, and the second top surface 1510 and the first top surface 1410 have a third included angle therebetween as being unfolded relative to each other. In the state shown in FIG. 5A, the second top surface 1510 is, for example but not limited to, unfolded by a total of 360 degrees relative to the first top surface 1410, that is, the third included angle is, for example but not limited to 360 degrees. Compared with having the fourth included angle, the first object 1400 does not slide at all, and therefore the relative positions of the first object 1400 and the first body 1100 remain unchanged, that is, the first object 1400 still slides relative to the first body 1100 by the first displacement X1 and is relatively close to the hinge cover 1300.

Figure 5B:
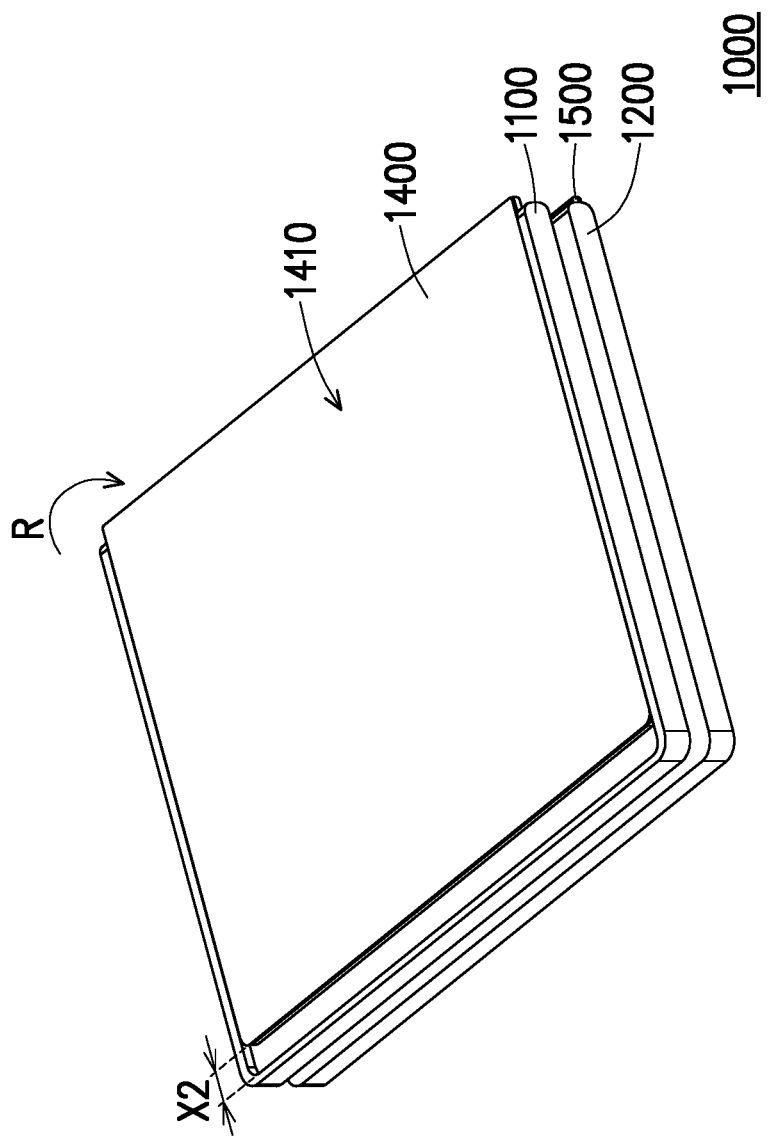
FIG. 5B is a perspective schematic view showing that the first body and the second body of the foldable electronic device have a third included angle relative to each other according to an embodiment of the disclosure.

FIG. 5B is a perspective schematic view showing that the first body and the second body of the foldable electronic device have a third included angle relative to each other according to an embodiment of the disclosure. In an embodiment, the foldable electronic device 1000 in the state shown in FIG. 1, FIG. 2, FIG. 3B, and FIG. 4B can be further unfolded to the state shown in FIG. 5B. When the second body 1200 is unfolded relative to the first body 1100 along the unfolding direction R from the state shown in FIG. 4B to the state shown in FIG. 5B, there is a third included angle between the first body 1100 and the second body 1200, and the second top surface 1510 and the first top surface 1410 have a third included angle therebetween as being unfolded relative to each other. In the state shown in FIG. 5B, the second top surface 1510 is, for example but not limited to, unfolded by a total of 360 degrees relative to the first top surface 1410, that is, the third included angle is, for example but not limited to 360 degrees. Compared with having the fourth included angle, the first object 1400 does not slide at all, and therefore the relative positions of the first object 1400 and the first body 1100 remain unchanged. The second object 1500 does not slide at all, and therefore the relative positions of the second object 1500 and the second body 1200 remain unchanged. In other words, the first object 1400 still slides relative to the first body 1100 by the second displacement X2 and is relatively close to the hinge cover 1300, and the second object 1500 still slides relative to the second body 1200 by the third displacement X3 and is relatively close to the hinge cover 1300.

Figure 5C:
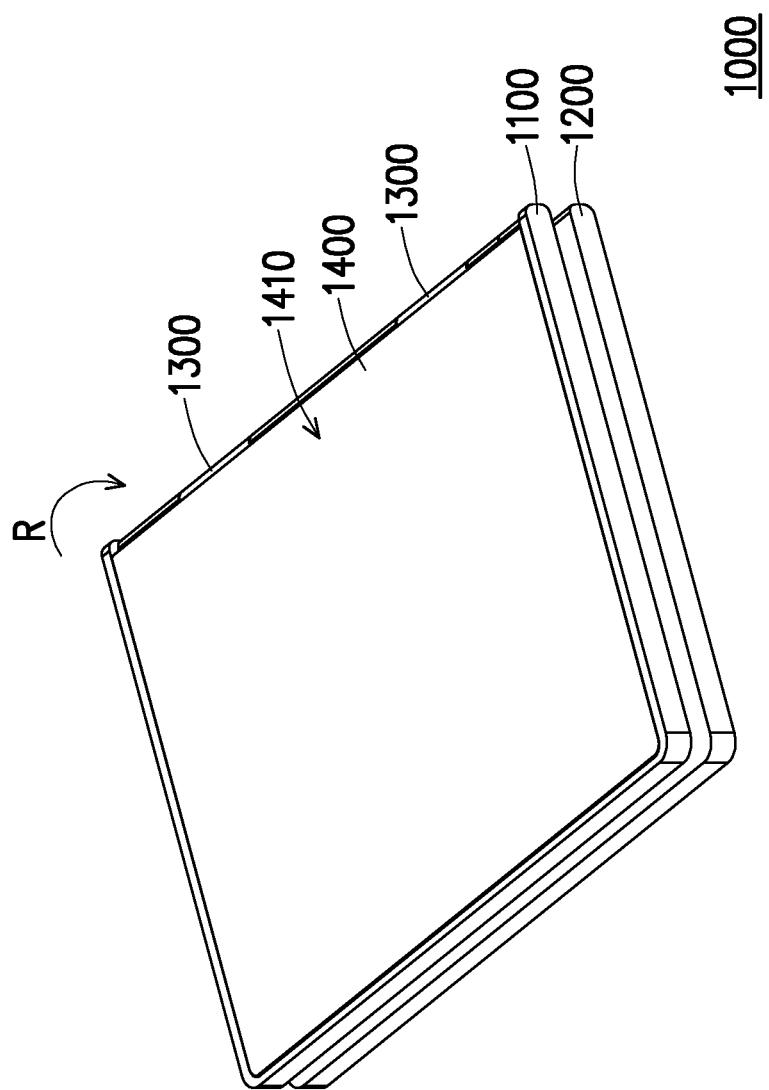
FIG. 5C is a perspective schematic view showing that the first body and the second body of the foldable electronic device have a third included angle relative to each other according to an embodiment of the disclosure.

FIG. 5C is a perspective schematic view showing that the first body and the second body of the foldable electronic device have a third included angle relative to each other according to an embodiment of the disclosure. In an embodiment, the foldable electronic device 1000 in the state shown in FIG. 1, FIG. 2, FIG. 3A, and FIG. 4C can be further unfolded to the state shown in FIG. 5C. When the second body 1200 is unfolded relative to the first body 1100 along the unfolding direction R from the state shown in FIG. 4C to the state shown in FIG. 5C, there is a third included angle between the first body 1100 and the second body 1200, and the second top surface 1510 and the first top surface 1410 have a third included angle therebetween as being unfolded relative to each other. In the state shown in FIG. 5C, the second top surface 1510 is, for example but not limited to, unfolded by a total of 360 degrees relative to the first top surface 1410, that is, the third included angle is, for example but not limited to 360 degrees. Under the condition, the first object 1400 is maintained at the first initial position away from the hinge cover 1300.

In an embodiment, the foldable electronic device 1000 in the state shown in FIG. 1, FIG. 2, FIG. 3B, and FIG. 4C can be further unfolded to the state shown in FIG. 5C. When the second body 1200 is unfolded relative to the first body 1100 along the unfolding direction R from the state shown in FIG. 4C to the state shown in FIG. 5C, there is a third included angle between the first body 1100 and the second body 1200, and the second top surface 1510 and the first top surface 1410 have a third included angle therebetween as being unfolded relative to each other. In the state shown in FIG. 5C, the second top surface 1510 is, for example but not limited to, unfolded by a total of 360 degrees relative to the first top surface 1410, that is, the third included angle is, for example but not limited to 360 degrees. Under the condition, the first object 1400 is maintained at the first initial position away from the hinge cover 1300, and the second object 1500 is maintained at the second initial position away from the hinge cover 1300.

FIG. 6A is a perspective schematic view of the internal components of the foldable electronic device according to an embodiment of the disclosure. For clarity of presentation and ease of description, a part of the structure is drawn with dashed lines in FIG. 6A. In an embodiment, by mounting the components in FIG. 6A to the inside of the hinge cover 1300, it is possible to make the foldable electronic device 1000 to achieve the changes shown in FIG. 1, FIG. 2, FIG. 3A, and FIG. 4A to FIG. 5A in sequence. For clarity of description, only a set of hinge covers 1300 on the right side of FIG. 1 is exemplified below.

Figure 6B:
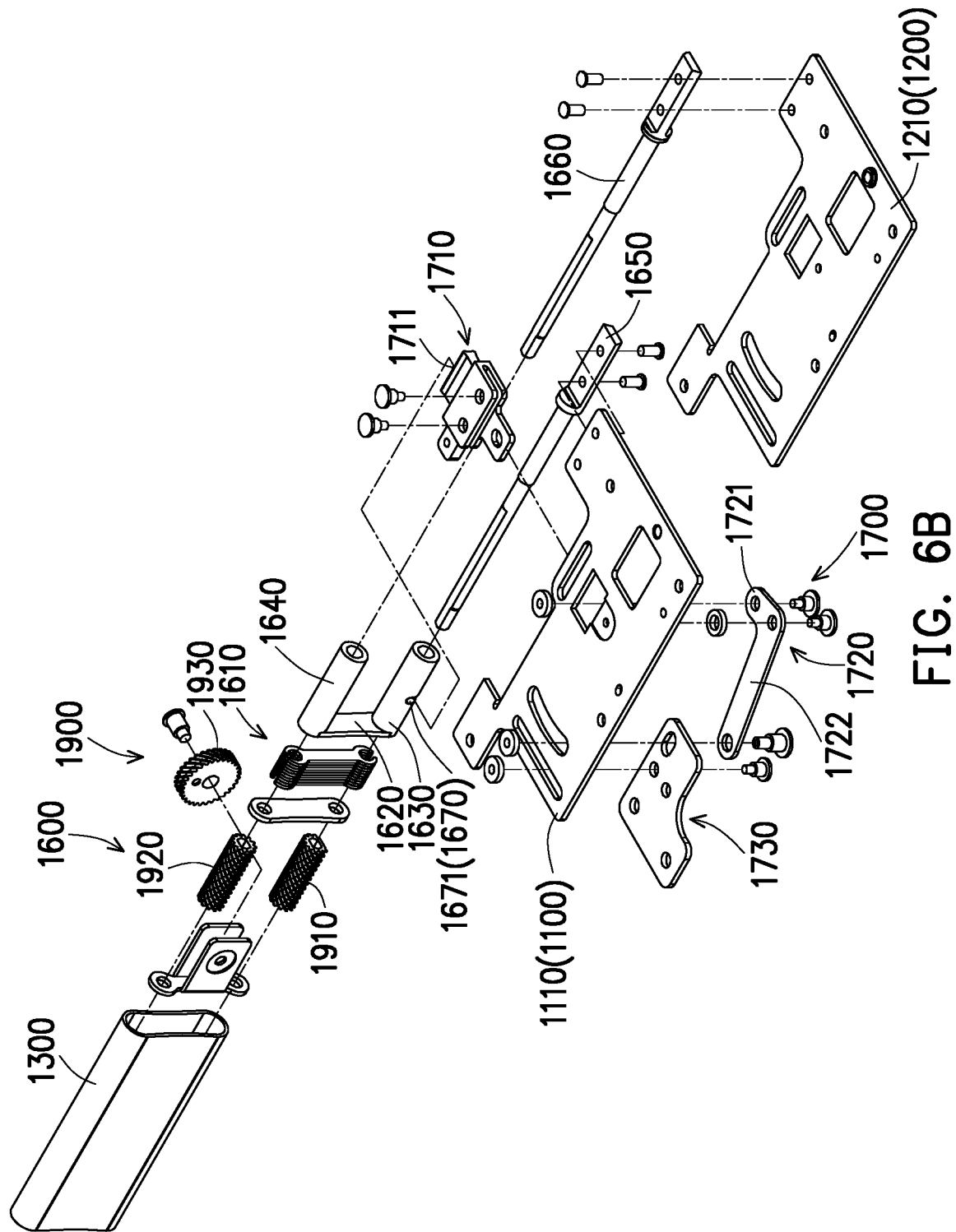
FIG. 6B is an exploded view of the components in FIG. 6A.
Figure 6E:
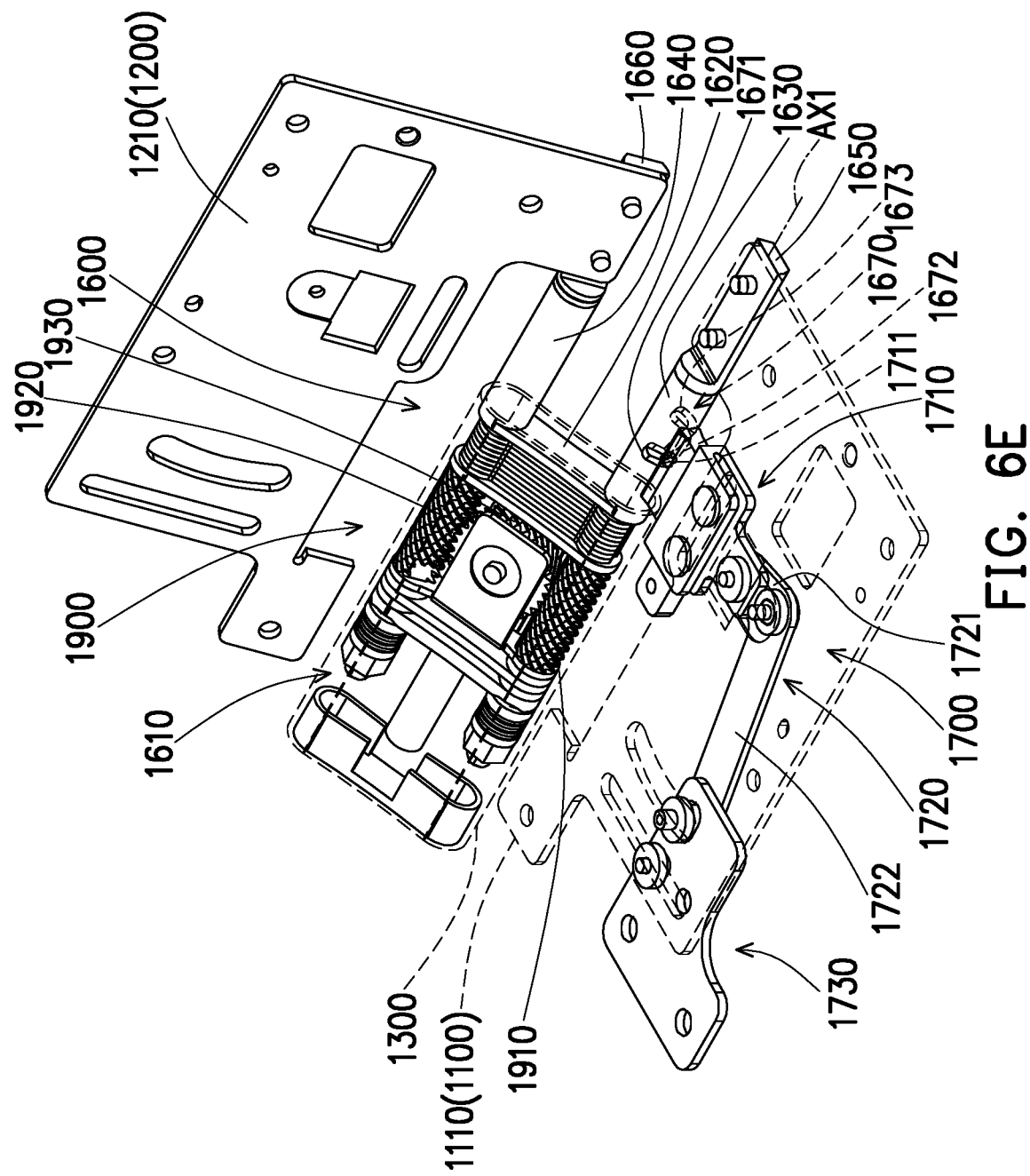
Figure 6F:
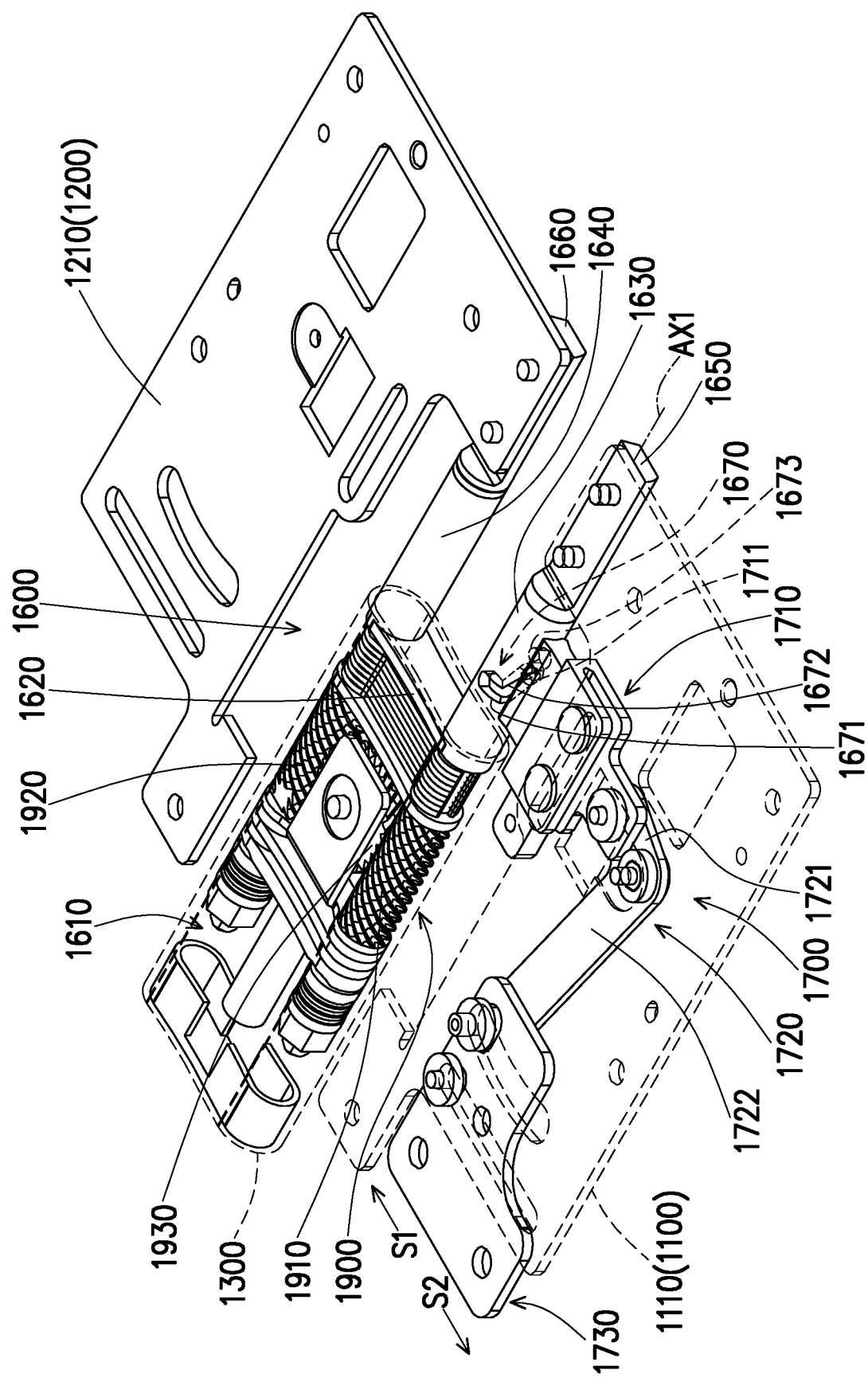
Figure 6G:
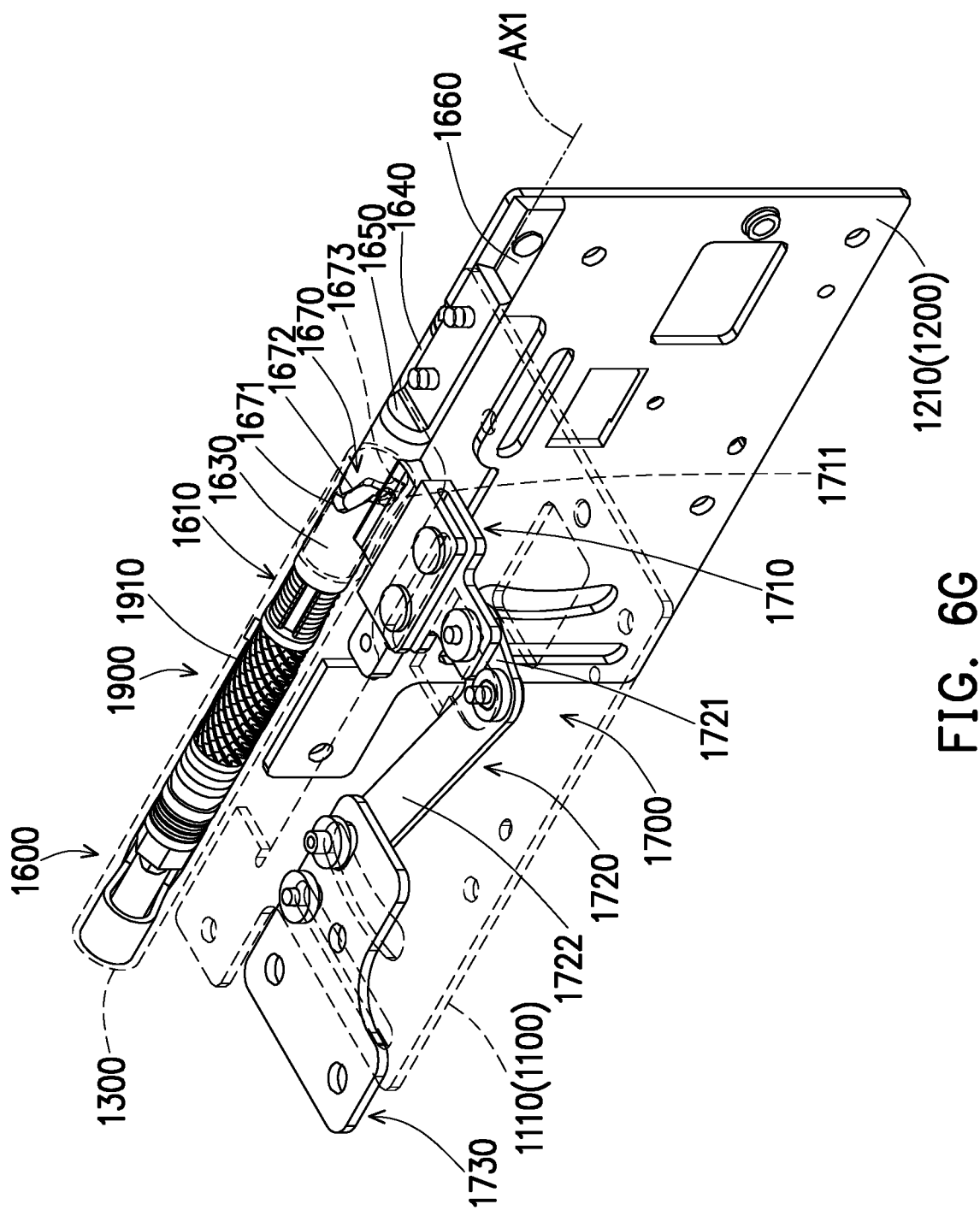

FIG. 6B is an exploded view of the components in FIG. 6A. Specifically, the foldable electronic device 1000 further includes a dual-axis hinge module 1600 and a first linkage mechanism 1700. The first body 1100 includes a first bracket 1110, and the second body 1200 includes a second bracket 1210. Both the first bracket 1110 and the second bracket 1210 are fixed at the dual-axis hinge module 1600, so that the first body 1100 and the second body 1200 can pivot relative to each other through the dual-axis hinge module 1600. The first linkage mechanism 1700 is disposed on one surface of the first bracket 1110. The disclosure provides no limitation to the position where the first linkage mechanism 1700 is disposed on the first bracket 1110. The first linkage mechanism 1700 is coupled to the dual-axis hinge module 1600 to be driven by the dual-axis hinge module 1600, and the first linkage mechanism 1700 is coupled to the first object 1400 to drive the first object 1400. In other words, as the second body 1200 is unfolded relative to the first body 1100, the dual-axis hinge module 1600 will pivot, and then the dual-axis hinge module 1600 can drive the first linkage mechanism 1700, and the first linkage mechanism 1700 can drive the first object 1400 to slide back and forth relative to the first body 1100. Through this mechanism, when the first body 1100 and the second body 1200 have a second included angle therebetween as being rotated relative to each other through the dual-axis hinge module 1600, and the second top surface 1510 is parallel to the first top surface 1410, the first object 1400 has been driven by the first linkage mechanism 1700 to slide and abut against the second object 1500, such that there is no gap between the first object 1400 and the second object 1500, and therefore the user can have a better viewing experience when viewing the first object 1400 and the second object 1500.

More specifically, the first linkage mechanism 1700 includes a first sliding block 1710, a first linkage 1720, and a first sliding member 1730. The first sliding block 1710 is slidably disposed on the first bracket 1110. The first sliding block 1710 has a first linkage portion 1711. The first linkage portion 1711 has, for example but not limited to, a cylindrical shape. The first linkage portion 1711 is coupled to the dual-axis hinge module 1600 to be driven by the dual-axis hinge module 1600. The first linkage 1720 has a first driven end 1721 and a first swinging end 1722. The first swinging end 1722 is connected to the first driven end 1721. The first linkage 1720 is rotatably disposed on the first bracket 1110 through the junction of the first driven end 1721 and the first swinging end 1722. The first driven end 1721 is coupled to the first sliding block 1710 to be driven by the first sliding block 1710. The first swinging end 1722 is coupled to the first sliding member 1730 to drive the first sliding member 1730. The first sliding member 1730 is slidably disposed on the first bracket 1110. The first object 1400 is fixed at the first sliding member 1730 to be driven by the first sliding member 1730.

On the other hand, the dual-axis hinge module 1600 includes a torque module 1610, a connecting portion 1620, a first bushing 1630, a second bushing 1640, a first rotating shaft 1650, and a second rotating shaft 1660. The first bushing 1630 and the torque module 1610 are arranged in parallel, and the second bushing 1640 and the torque module 1610 are arranged in parallel. The first rotating shaft 1650 is rotatably disposed through the first bushing 1630, and the first rotating shaft 1650 and the first bracket 1110 are fixed at each other. The second rotating shaft 1660 is rotatably disposed through the second bushing 1640, and the second rotating shaft 1660 and the second bracket 1210 are fixed at each other.

FIG. 6C illustrates a partial enlarged schematic view of the connecting portion, the first guiding portion, the first bushing and the second bushing in FIG. 6B from a different perspective. FIG. 6D is a schematic view of the design principle of the first guiding portion in FIG. 6C. In an embodiment, the dual-axis hinge module 1600 further includes a first guiding portion 1670 as shown in FIG. 6C. The first guiding portion 1670 is disposed on the first bushing 1630. In the first linkage mechanism 1700 shown in FIG. 6A, the first linkage portion 1711 of the first sliding block 1710 extends into the first guiding portion 1670 to be coupled with the first guiding portion 1670, so that the first linkage portion 1711 can be driven by the first guiding portion 1670.

In detail, the first guiding portion 1670 includes a first idle segment 1671, a first driving segment 1672, and a first stationary segment 1673. The first driving segment 1672 is connected between the first idle segment 1671 and the first stationary segment 1673. In order to more clearly define the first idle segment 1671, the first driving segment 1672 and the first stationary segment 1673, specifically, a first axis AX1, a first axis direction AD1, and a first diameter direction DD1 are defined at the first bushing 1630. The first idle segment 1671 and the first stationary segment 1673 are circumferentially arranged outside the first bushing 1630 in the first diameter direction DD1 of the first bushing 1630, and the first idle segment 1671 and the first stationary segment 1673 are located at different cross sections of the first of bushing 1630. The first driving segment 1672 is circumferentially arranged outside the first bushing 1630 in the first diameter direction DD1 and the first axis direction AD1 of the first bushing 1630.

Please refer to FIG. 1, FIG. 6A, FIG. 6C and FIG. 6D, a first idle end point P11 away from the first driving segment 1672 is defined at the first idle segment 1671. A first idle driving point P12 is defined at the junction of the first idle segment 1671 and the first driving segment 1672. A first driving stationary point P13 is defined at the junction of the first driving segment 1672 and the first stationary segment 1673. A first stationary end point P14 away from the first driving segment 1672 is defined at the first stationary segment 1673. A first idle center angle θ11 is defined at the first axis AX1, the first idle end point P11, and the first idle driving point P12. A first driving center angle θ12 is defined at the first axis AX1, the first idle driving point P12, and the first driving stationary point P13. A first stationary center angle θ13 is defined at the first axis AX1, the first driving stationary point P13, and the first stationary end point P14. The widths of the first guiding portion 1670 from the first idle end point P11, the first idle driving point P12, and the first driving stationary point P13 to the first stationary end point P14 are all the same.

In an embodiment, the foldable electronic device 1000 further includes a synchronization mechanism 1900. The synchronization mechanism 1900 is disposed on the dual-axis hinge module 1600, and the synchronization mechanism 1900 is configured to make the first body 1100 and the second body 1200 pivot synchronously relative to each other. Specifically, the synchronization mechanism 1900 includes a first gear 1910, a second gear 1920, and a synchronization gear 1930. The first gear 1910 is sleeved on the first rotating shaft 1650, and the first gear 1910 is engaged with the first rotating shaft 1650 to pivot synchronously with the first rotating shaft 1650. The second gear 1920 is sleeved on the second rotating shaft 1660, and the second gear 1920 is engaged with the second rotating shaft 1660 to pivot synchronously with the second rotating shaft 1660. The synchronization gear 1930 is rotatably disposed between the first gear 1910 and the second gear 1920, and the synchronization gear 1930 meshes with the first gear 1910 and the second gear 1920, such that the second gear 1920 rotates by the same angle as the first gear 1910 based on the angle by which the first gear 1910 rotates.

FIG. 6E to FIG. 6H are schematic views of different states of the components in FIG. 6A. For clarity and ease of description, a part of the structure is drawn in dashed lines in FIG. 6E to FIG. 6H. The components in the state shown in FIG. 6A correspond to the foldable electronic device 1000 in the state shown in FIG. 1. With further reference to FIG. 2, FIG. 6C and FIG. 6D, when the first linkage portion 1711 of the first sliding block 1710 of the linkage mechanism 1700 is coupled to the first idle end point P11 in the first idle segment 1671 of the first guiding portion 1670, the first sliding member 1730 and the first object 1400 are relatively far away from the hinge cover 1300 and the dual-axis hinge module 1600. In other words, the first object 1400 is still at the first initial position relative to the first body 1100.

When the second body 1200 is unfolded relative to the first body 1100 from the state shown in FIG. 1 to the state shown in FIG. 2, the second body 1200 is, for example but not limited to, unfolded by 110 degrees relative to the first body 1100. Under the condition, the state of the foldable electronic device 1000 corresponds to the state of the components in FIG. 6E. Through the action of the synchronization gear 1930, the first gear 1910 and the first rotating shaft 1650 are, for example but not limited to, rotated by 55 degrees, and the second gear 1920 and the second rotating shaft 1660 are, for example but not limited to, also rotated by 55 degrees. Additionally, the first linkage portion 1711 is coupled to the first idle driving point P12 of the first guiding portion 1670, and therefore the first sliding member 1730 and the first object 1400 are still relatively far away from the hinge cover 1300 and the dual-axis hinge module 1600, that is, the first object 1400 is still at the first initial position relative to the first body 1100. In other words, the first linkage portion 1711 moves in the first idle segment 1671 by an angle of the first idle center angle θ11. The angle of the first idle center angle θ11 is, for example but not limited to 55 degrees.

When the second body 1200 is unfolded relative to the first body 1100 from the state shown in FIG. 2 to the state shown in FIG. 3A, the second body 1200 is, for example but not limited to, further unfolded by 70 degrees relative to the first body 1100 from the state shown in FIG. 2. Under the condition, the state of the foldable electronic device 1000 corresponds to the state of the components in FIG. 6F. Through the action of the synchronization gear 1930, the first gear 1910 and the first rotating shaft 1650 are, for example but not limited to, further rotated by 35 degrees, and the second gear 1920 and the second rotating shaft 1660 are, for example but not limited to, also further rotated by 35 degrees. Furthermore, the first linkage portion 1711 is coupled to the first driving stationary point P13 of the first guiding portion 1670.

Therefore, under the guidance of the first driving segment 1672, the first linkage portion 1711 drives the first sliding block 1710 to slide in a direction parallel to the first axis AX1, the first sliding block 1710 drives the first driven end 1721 to swing, the first driven end 1721 drives the first swinging end 1722 to swing, and the first swinging end 1722 drives the first sliding member 1730 to slide close to the hinge cover 1300 and the dual-axis hinge module 1600 along the first sliding direction S1. That is, since the first object 1400 is fixed at the first sliding member 1730, the first object 1400 will slide close to the hinge cover 1300 and the dual-axis hinge module 1600 along with the first sliding member 1730, that is, the first object 1400 slides away from the first initial position relative to the first body 1100. Moreover, the first object 1400 and the second object 1500 abut against each other, so that there is no gap between the first object 1400 and the second object 1500, and therefore the user can have a better viewing experience when viewing the first object 1400 and the second object 1500. In addition, the first linkage portion 1711 moves in the first driving segment 1672 by an angle of the first driving center angle $\theta12$. The angle of the first driving center angle $\theta12$ is, for example but not limited to 35 degrees.

When the second body 1200 is unfolded relative to the first body 1100 from the state shown in FIG. 3A to the state shown in FIG. 4A, the second body 1200 is, for example but not limited to, further unfolded by 90 degrees relative to the first body 1100 from the state shown in FIG. 3A. Under the condition, the state of the foldable electronic device 1000 corresponds to the state of the components in FIG. 6G. Through the action of the synchronization gear 1930, the first gear 1910 and the first rotating shaft 1650 are, for example but not limited to, further rotated by 45 degrees, and the second gear 1920 and the second rotating shaft 1660 are, for example but not limited to, further rotated by 45 degrees. In addition, the first linkage portion 1711 is coupled to the first stationary segment 1673 of the first guiding portion 1670, so the first sliding member 1730 and the first object 1400 are still relatively close to the hinge cover 1300 and the dual-axis hinge module 1600, that is, the first object 1400 is still far away from the first initial position relative to the first body 1100. In other words, the first object 1400 still abuts against the second object 1500.

When the second body 1200 is unfolded relative to the first body 1100 from the state shown in FIG. 4A to the state shown in FIG. 5A, the second body 1200 is, for example but not limited to, further unfolded by 90 degrees relative to the first body 1100 from the state shown in FIG. 4A. Under the condition, the state of the foldable electronic device 1000 corresponds to the state of the components in FIG. 6H. Through the action of the synchronization gear 1930, the first gear 1910 and the first rotating shaft 1650 are, for example but not limited to, further rotated by 45 degrees, and the second gear 1920 and the second rotating shaft 1660 are, for example but not limited to, further rotated by 45 degrees. In addition, the first linkage portion 1711 is coupled to the first stationary end point P14 of the first guiding portion 1670, and therefore the first sliding member 1730 and the first object 1400 are still relatively close to the hinge cover 1300 and the dual-axis hinge module 1600, that is, the first object 1400 is still far away from the first initial position relative to the first body 1100. In other words, the first object 1400 still abuts against the second object 1500. In addition, from the state of the component shown in FIG. 6F to the state of the component shown in FIG. 6H, the first linkage portion 1711 moves in the first stationary segment 1673 by an angle of the first stationary center angle $\theta13$. The angle of the first stationary center angle $\theta13$ is, for example but not limited to 90 degrees. Under the action of the synchronization mechanism 1900, in order to enable the second body 1200 to unfold by 360 degrees relative to the first body 1100, the sum of the first idle center angle $\theta11$, the first driving center angle $\theta12$, and the first stationary center angle $\theta13$ is equal to 180 degrees. It should be noted that by adjusting the angles of the first idle center angle $\theta11$, the first driving center angle $\theta12$, and the first stationary center angle $\theta13$, the time point at which the first linkage portion 1711 drives the first sliding block 1710 can be adjusted, thereby adjusting the time point at which the first object 1400 slides relative to the first body 1100.

Figure 7A:
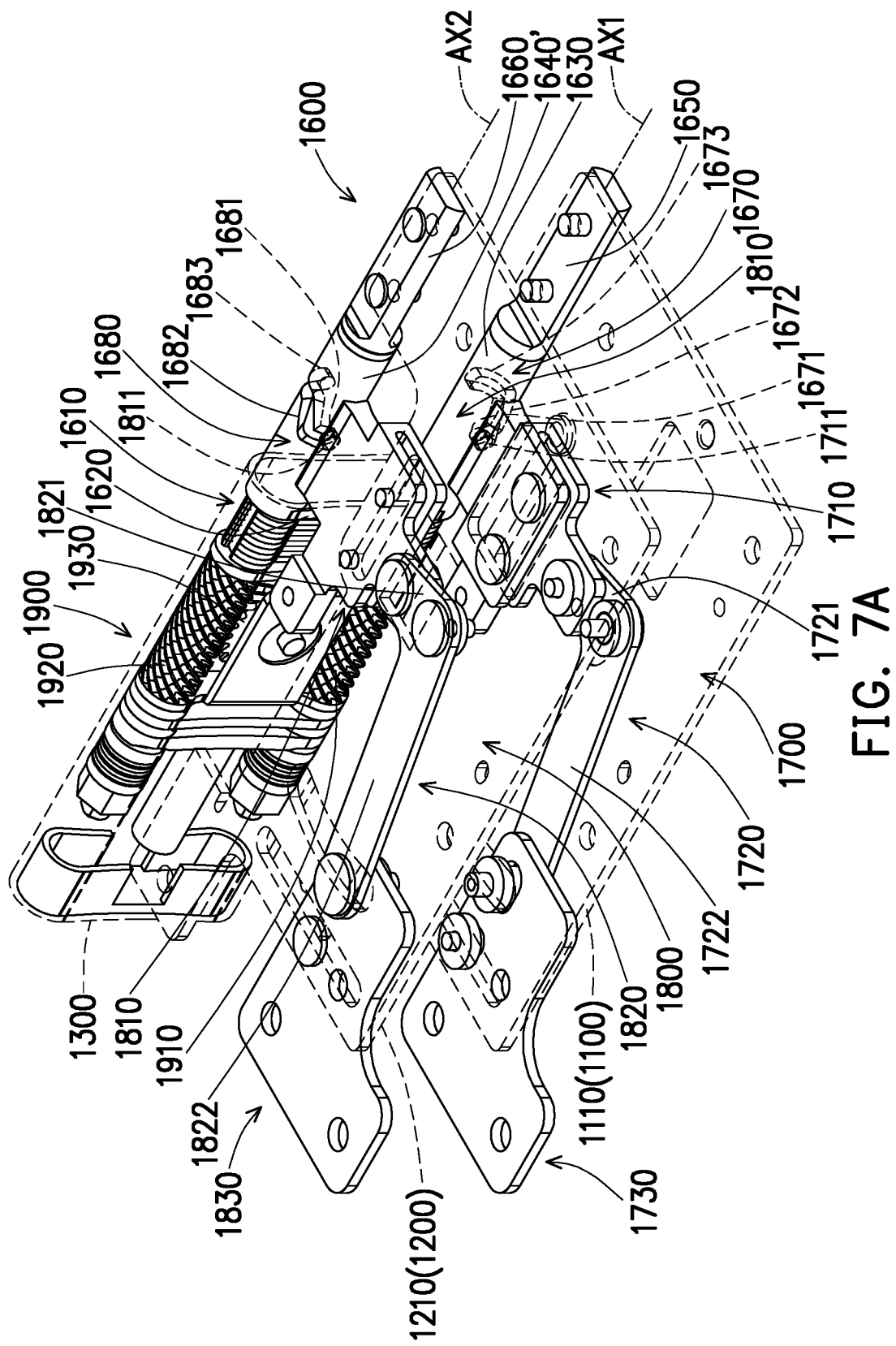
FIG. 7A is a perspective schematic view of the internal components of the foldable electronic device according to an embodiment of the disclosure.
Figure 7B:
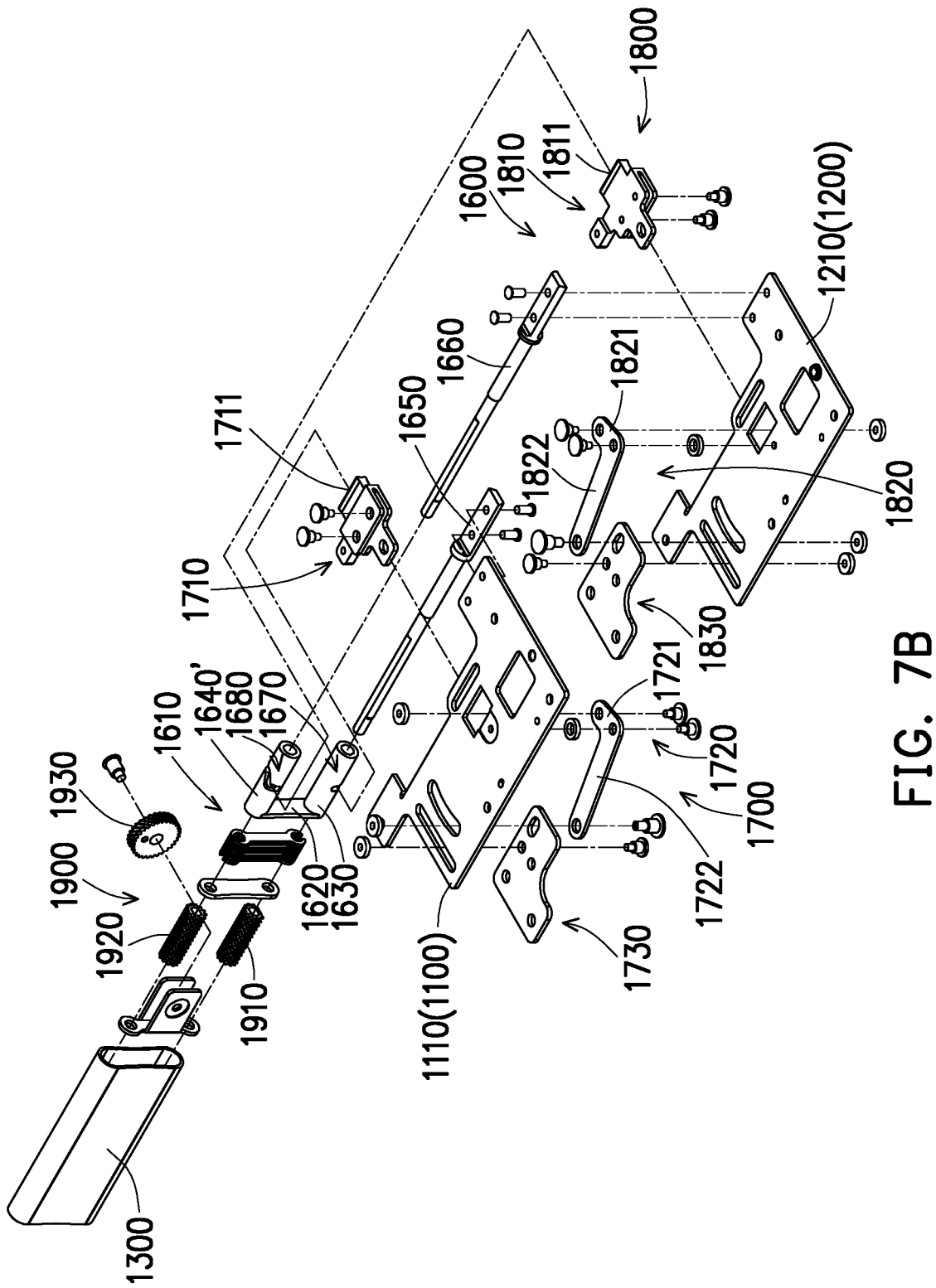
FIG. 7B is an exploded view of the components in FIG. 7A.
Figure 7E:
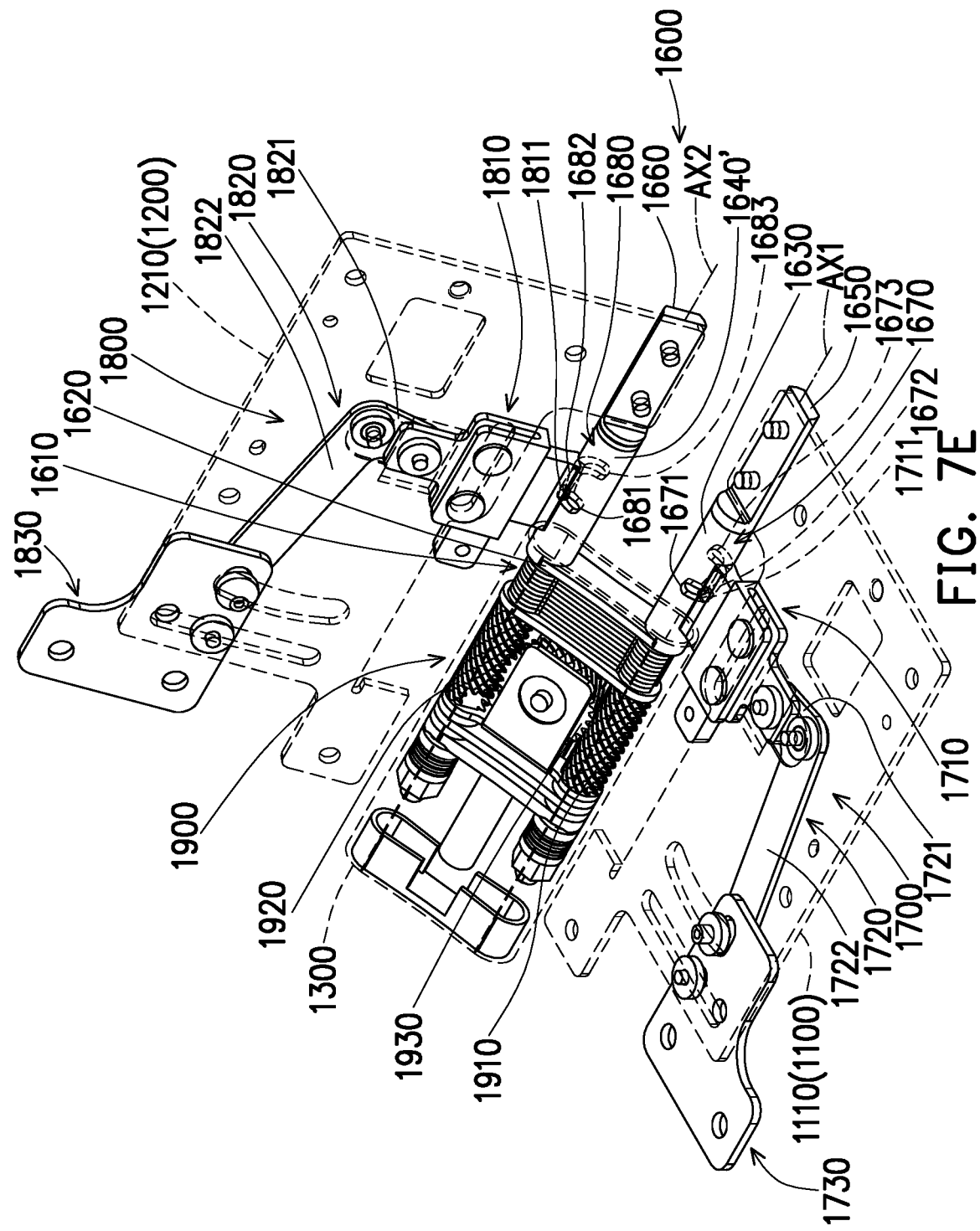
FIG. 7E to FIG. 7H are schematic views of different states of the components in FIG. 7A.

FIG. 7A is a perspective schematic view of the internal components of the foldable electronic device according to an embodiment of the disclosure. FIG. 7B is an exploded view of the components in FIG. 7A. For clarity and ease of description, a part of the structure is drawn with dashed lines in FIG. 7A. In an embodiment, by mounting the components in FIG. 7A to the inside of the hinge cover 1300, it is possible to make the foldable electronic device 1000 to achieve the changes shown in FIG. 1, FIG. 2, FIG. 3B, and FIG. 4B to FIG. 5B in sequence. In order to enable the first object 1400 and the second object 1500 to slide, the dual-axis hinge module 1600 includes two guiding portions (i.e., a first guiding portion 1670 and a second guiding portion 1680). The foldable electronic device 1000 includes two linkage mechanisms (i.e., a first linkage mechanism 1700 and a second linkage mechanism 1800). The second guiding portion 1680 is disposed on the second bushing 1640'. The second linkage mechanism 1800 is disposed on the second bracket 1210 and coupled to the second guiding portion 1680. The second object 1500 is fixed at the second linkage mechanism 1800 to be driven by the second linkage mechanism 1800.

FIG. 7C illustrates a partial enlarged schematic view of the connecting portion, the first guiding portion, the second guiding portion, the first bushing and the second bushing in FIG. 7B from a different perspective. FIG. 7D is a schematic view of the design principle of the first guiding portion in FIG. 7C. FIG. 7E to FIG. 7H are schematic views of different states of the components in FIG. 7A. For clarity of presentation and ease of description, a part of the structure is drawn in dashed lines in FIG. 7E to FIG. 7H. The components shown in FIG. 7A to FIG. 7H and the components in FIG. 6A to FIG. 6H denoted by the same or similar symbols have the same or similar configuration and operation principle, and therefore repetition will not be narrated herein. Additionally, among the components shown in FIG. 7A to FIG. 7H, the second guiding portion 1680, the second idle segment 1681, the second driving segment 1682, the second stationary segment 1683, the second linkage mechanism 1800, the second sliding block 1810, the second linkage portion 1811, the second linkage 1820, the second driven end 1821, the second swinging end 1822, the second sliding member 1830, the second axis direction AD2, the second axis AX2, the second diameter direction DD2, the second idle end point P21, the second idle driving point P22, the second driving stationary point P23, the second stationary end point P24, the second idle center angle $\theta21$, the second driving center angle $\theta22$, and second stationary center angle $\theta23$ have the same or similar configuration and operation principle like the following components shown in FIG. 6A to FIG. 6H, including the first guiding portion 1670, the first idle segment 1671, the first driving segment 1672, the first stationary segment 1673, the first linkage mechanism 1700, the first sliding block 1710, the first linkage portion 1711, the first linkage 1720, the first driven end 1721, the first swinging end 1722, the first sliding member 1730, the first axis direction AD1, the first axis AX1, the first diameter direction DD1, the first idle end point P11, the first idle driving point P12, the first driving stationary point P13, the first stationary end point P14, the first idle center angle θ11, the first driving center angle θ12, and the first stationary center angle θ13, and therefore repetition is not narrated herein.

Figure 7F:
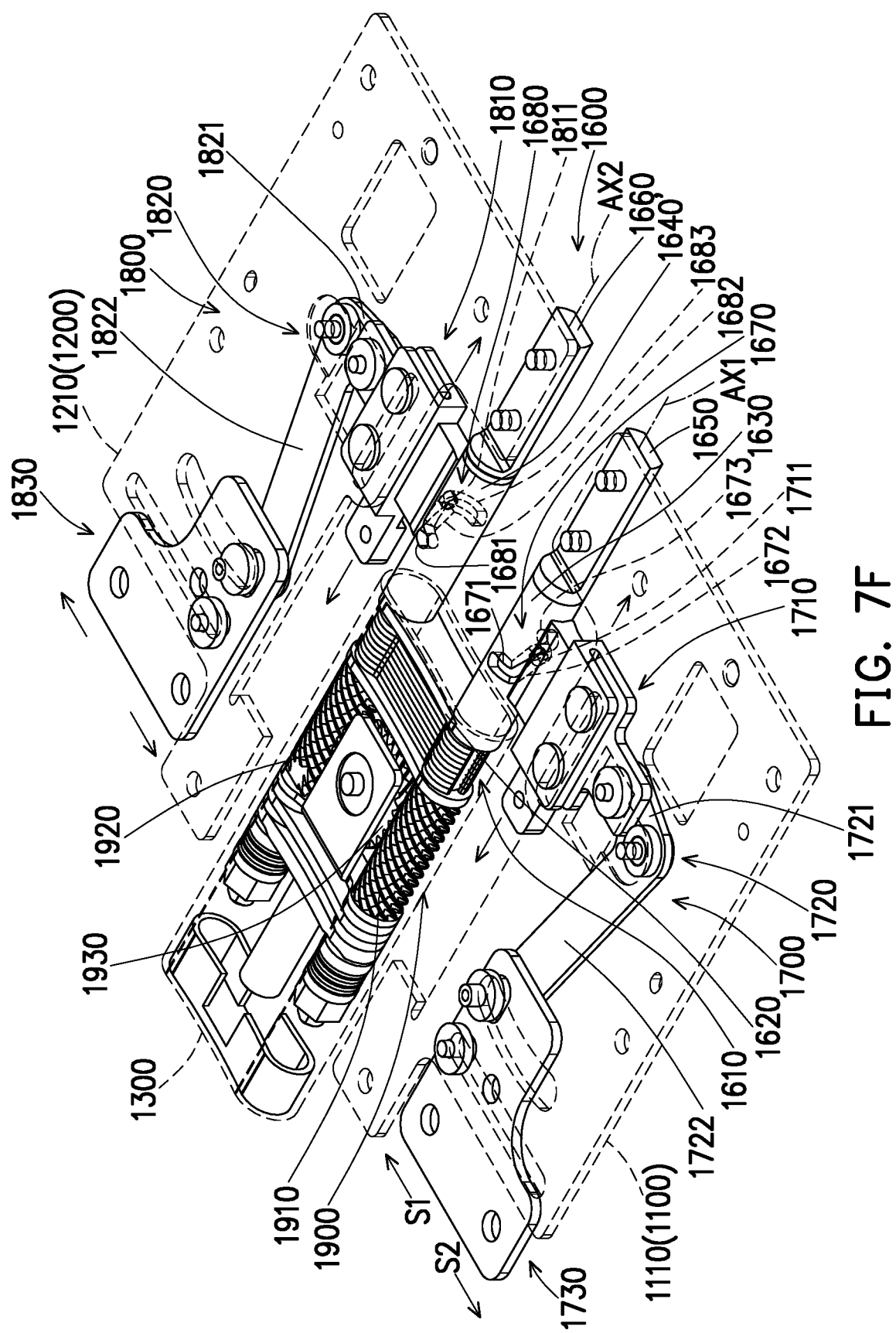
Figure 7G:
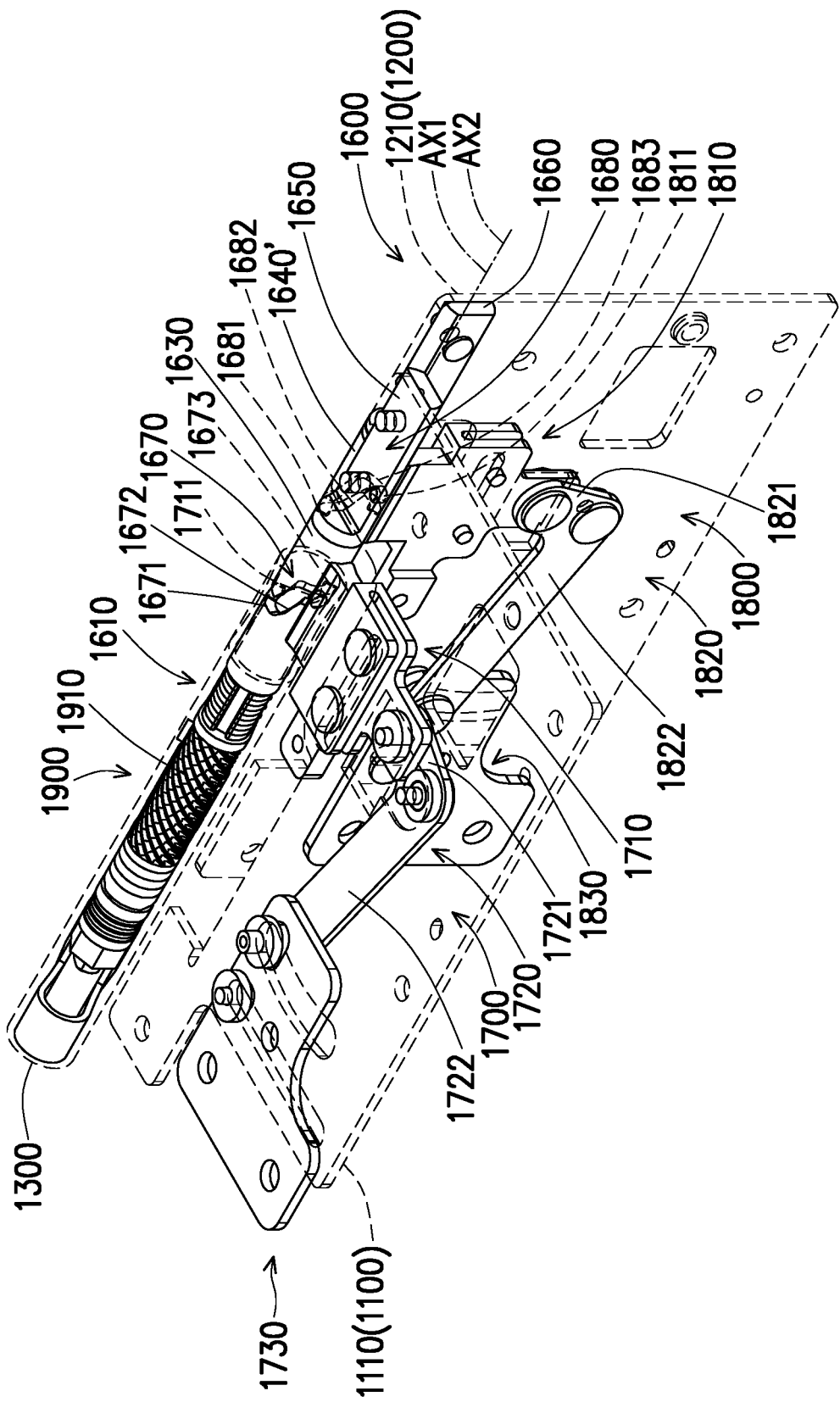
Figure 7H:
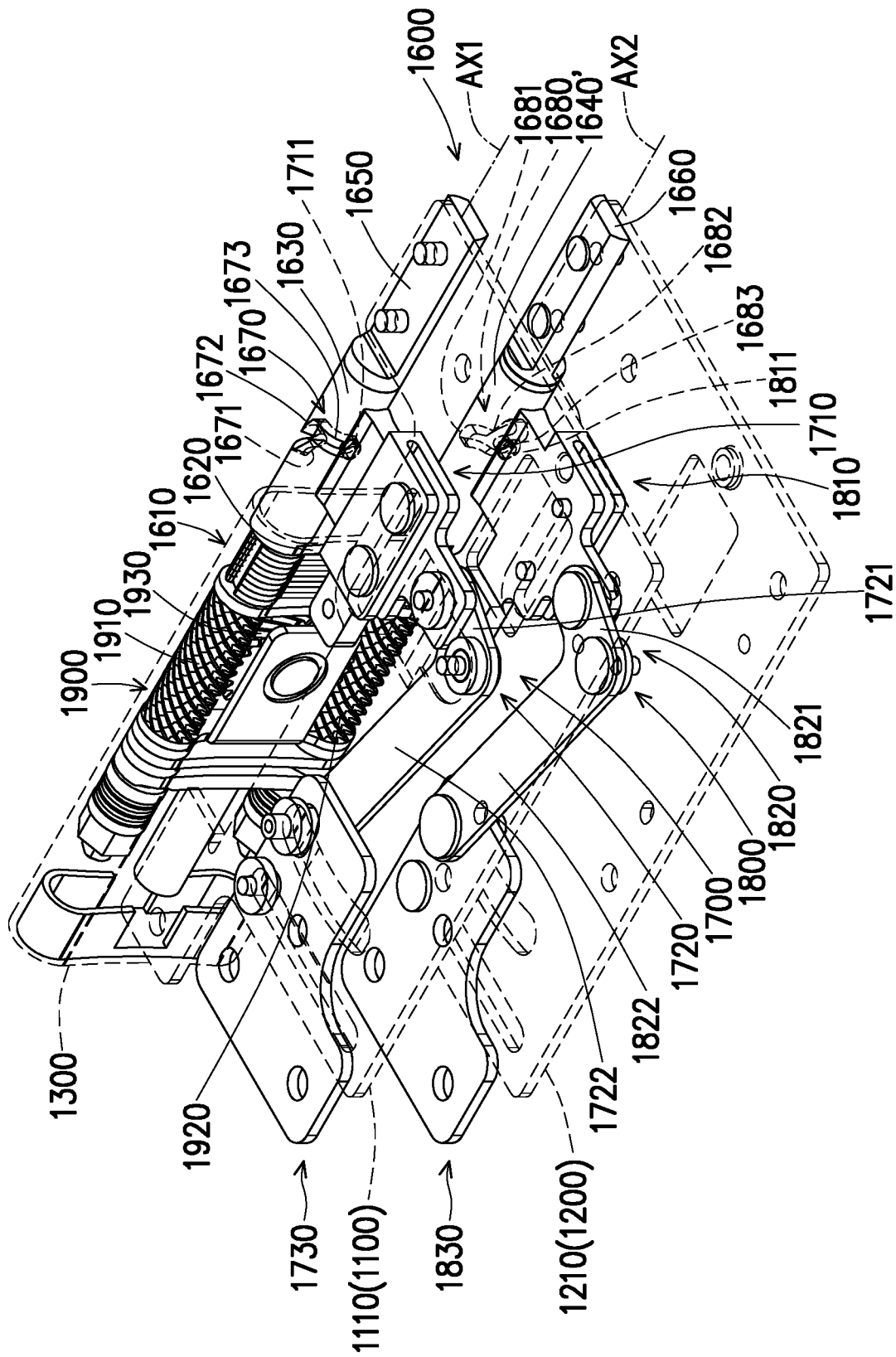

The difference between the components of FIG. 7A to FIG. 7H is that when the second body 1200 is unfolded relative to the first body 1100 from the state shown in FIG. 2 to the state shown in FIG. 3B, the state of the foldable electronic device 1000 under the condition corresponds to the state of the components shown in FIG. 7F. Under the condition, through the action of the first guiding portion 1670 and the first linkage mechanism 1700, the first object 1400 has slid toward the hinge cover 1300 and the dual-axis hinge module 1600, that is, the first object 1400 slides away from the first initial position relative to the first body 1100, and through the action of the second guiding portion 1680 and the second linkage mechanism 1800, the second object 1500 has also slid toward the hinge cover 1300 and the dual-axis hinge module 1600, that is, the second object 1500 also slides away from the second initial position relative to the second body 1200, such that the first object 1400 and the second object 1500 slide toward each other and abut against each other. Therefore, there is no gap between the first object 1400 and the second object 1500. In this way, the user can have a better viewing experience when viewing the first object 1400 and the second object 1500.

Figure 8A:
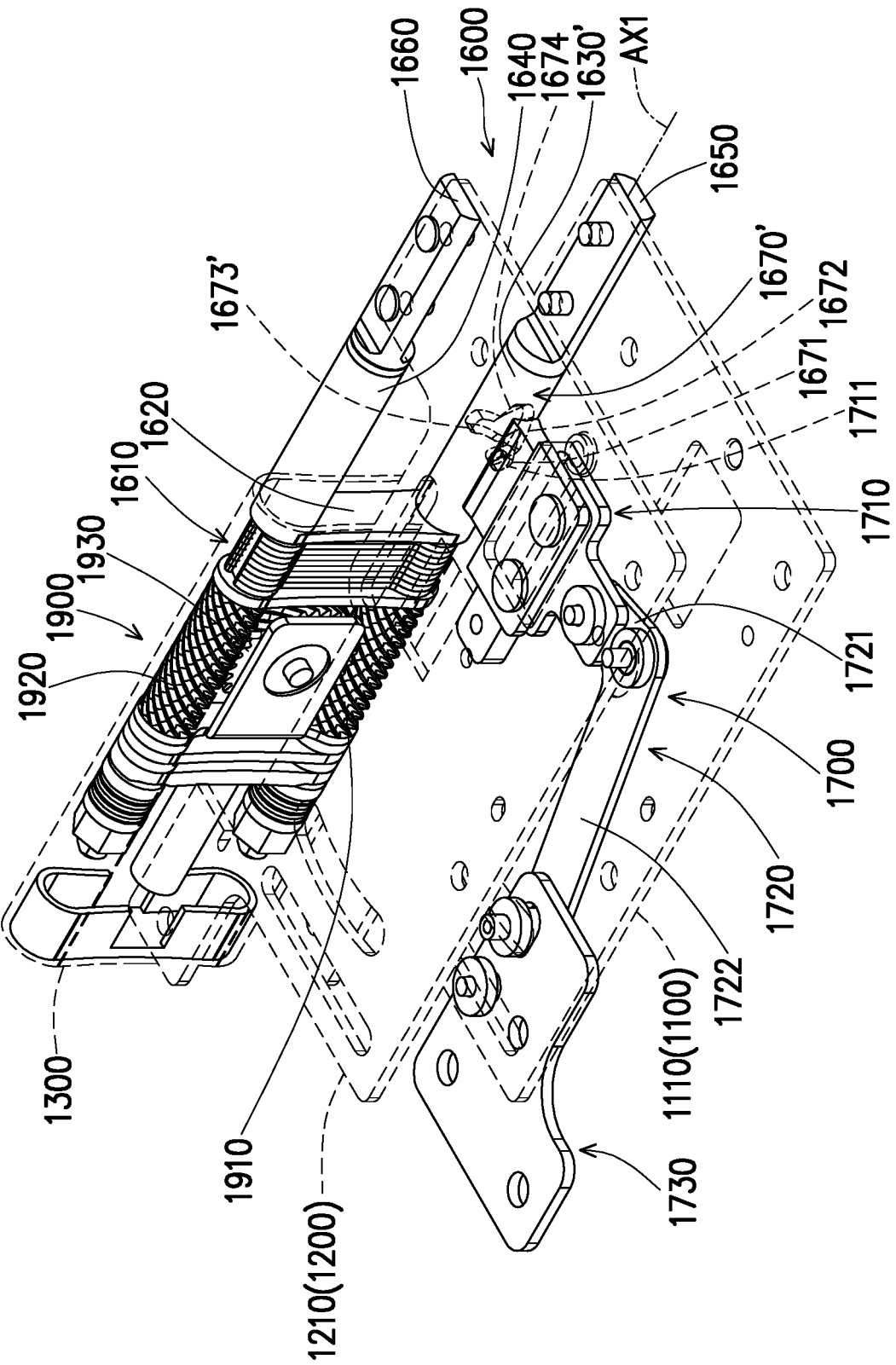
FIG. 8A is a perspective schematic view of the internal components of the foldable electronic device according to an embodiment of the disclosure.
Figure 8B:
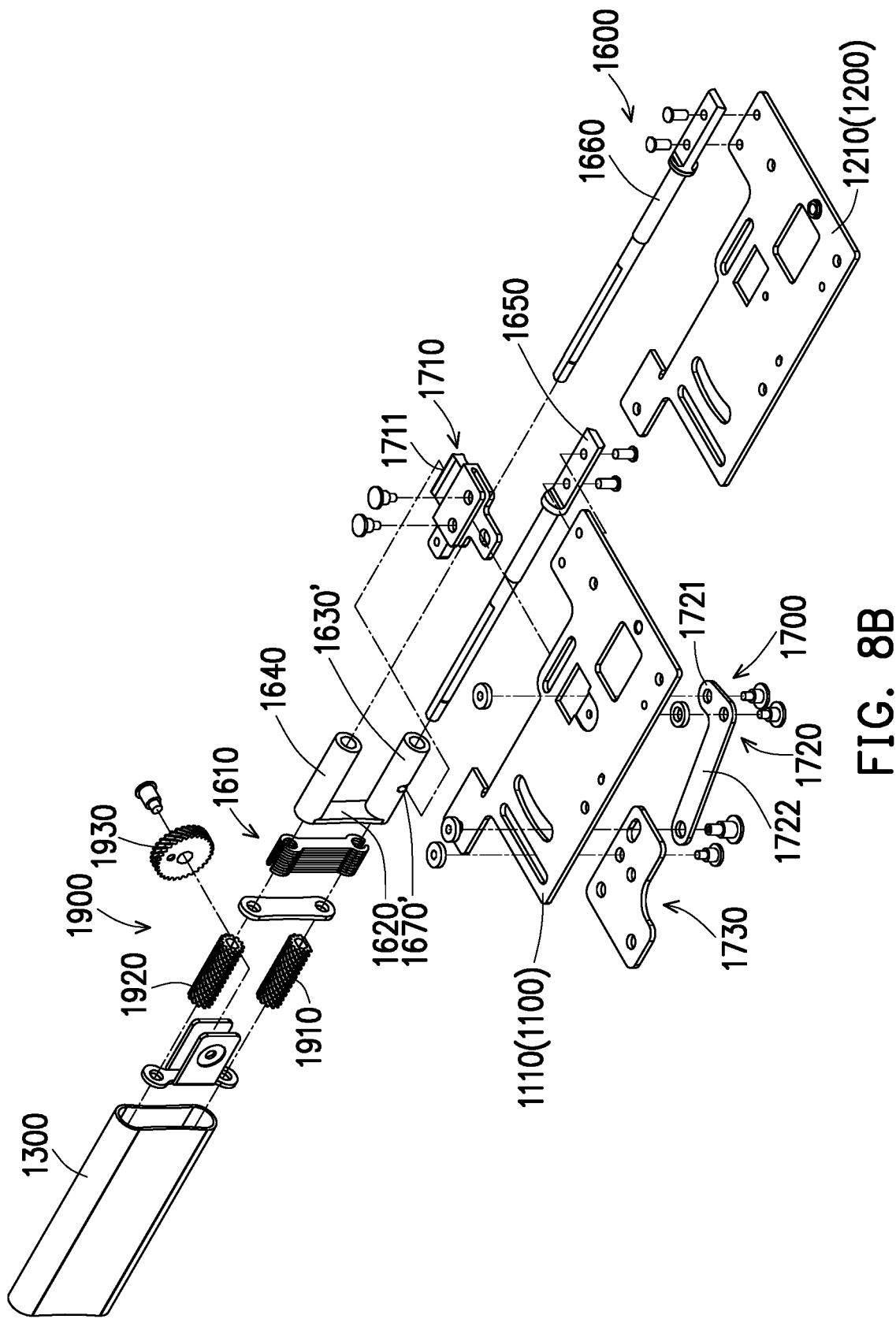
FIG. 8B is an exploded view of the components in FIG. 8A.
Figure 8D:
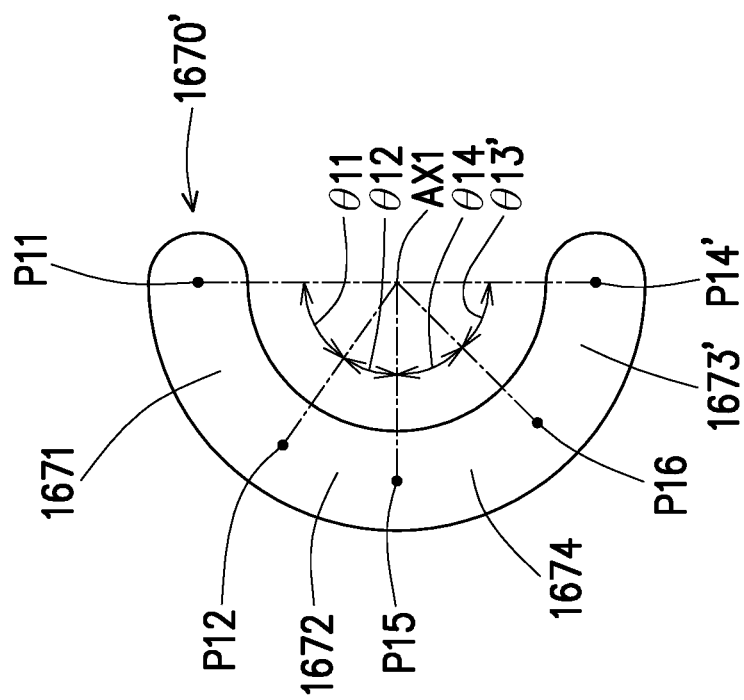
FIG. 8D is a schematic view of the design principle of the first guiding portion in FIG. 8C.
Figure 8C:
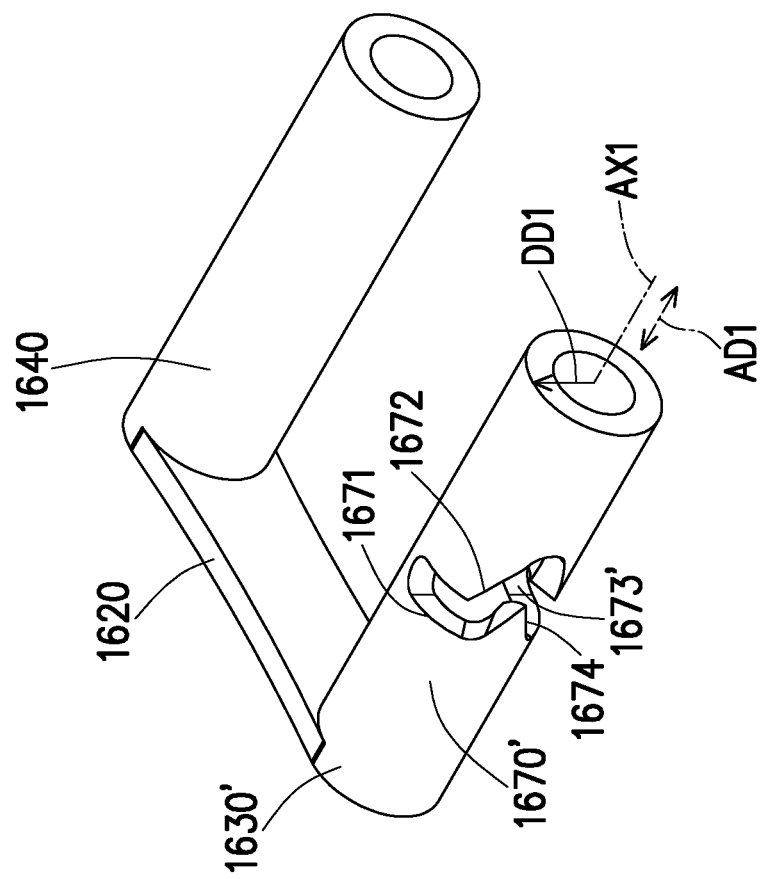
FIG. 8C illustrates a partial enlarged schematic view of the connecting portion, the first guiding portion, the first bushing and the second bushing in FIG. 8B from a different perspective.
Figure 8E:
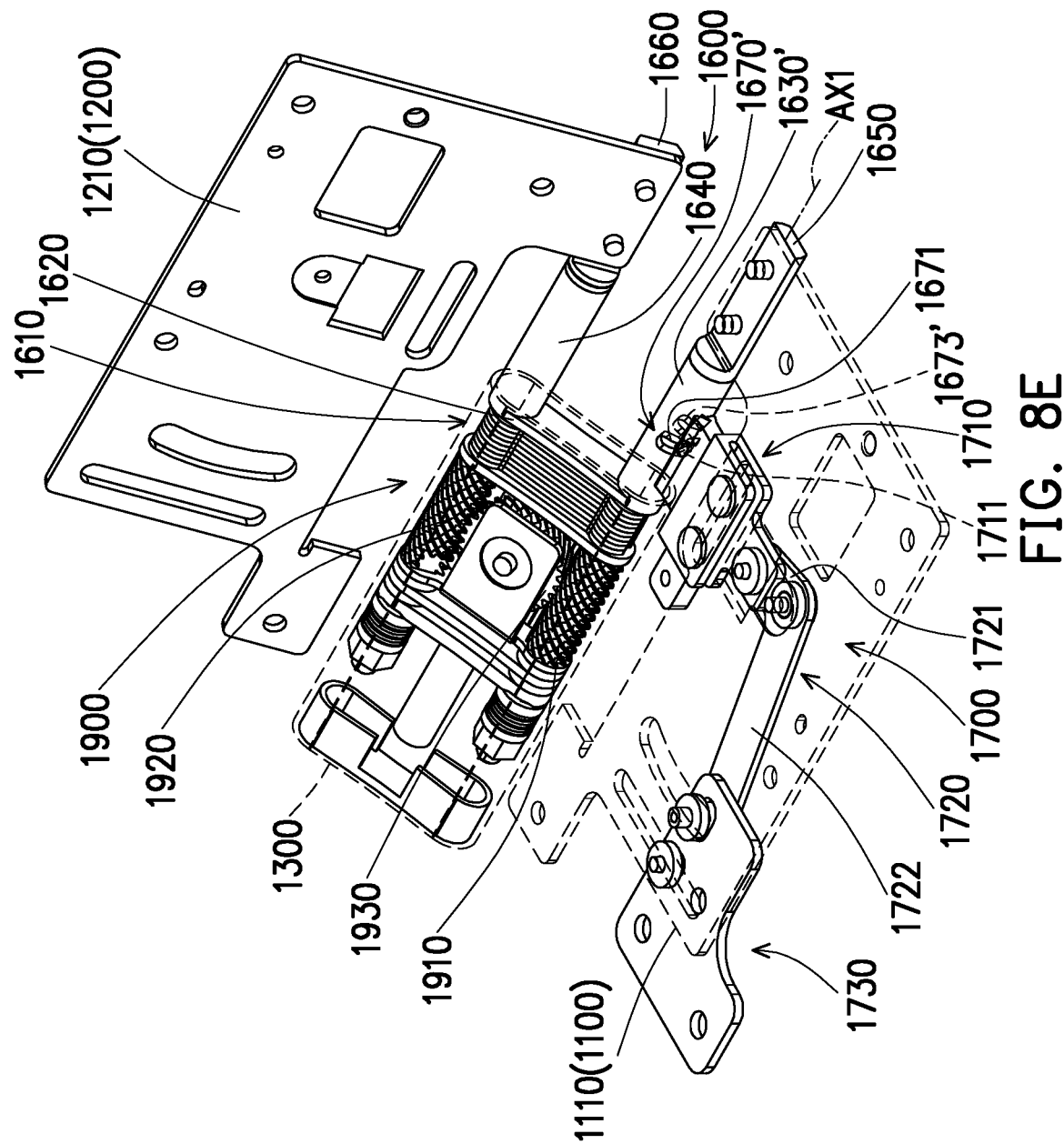
FIG. 8E to FIG. 8H are schematic views of different states of the components in FIG. 8A.
Figure 8F:
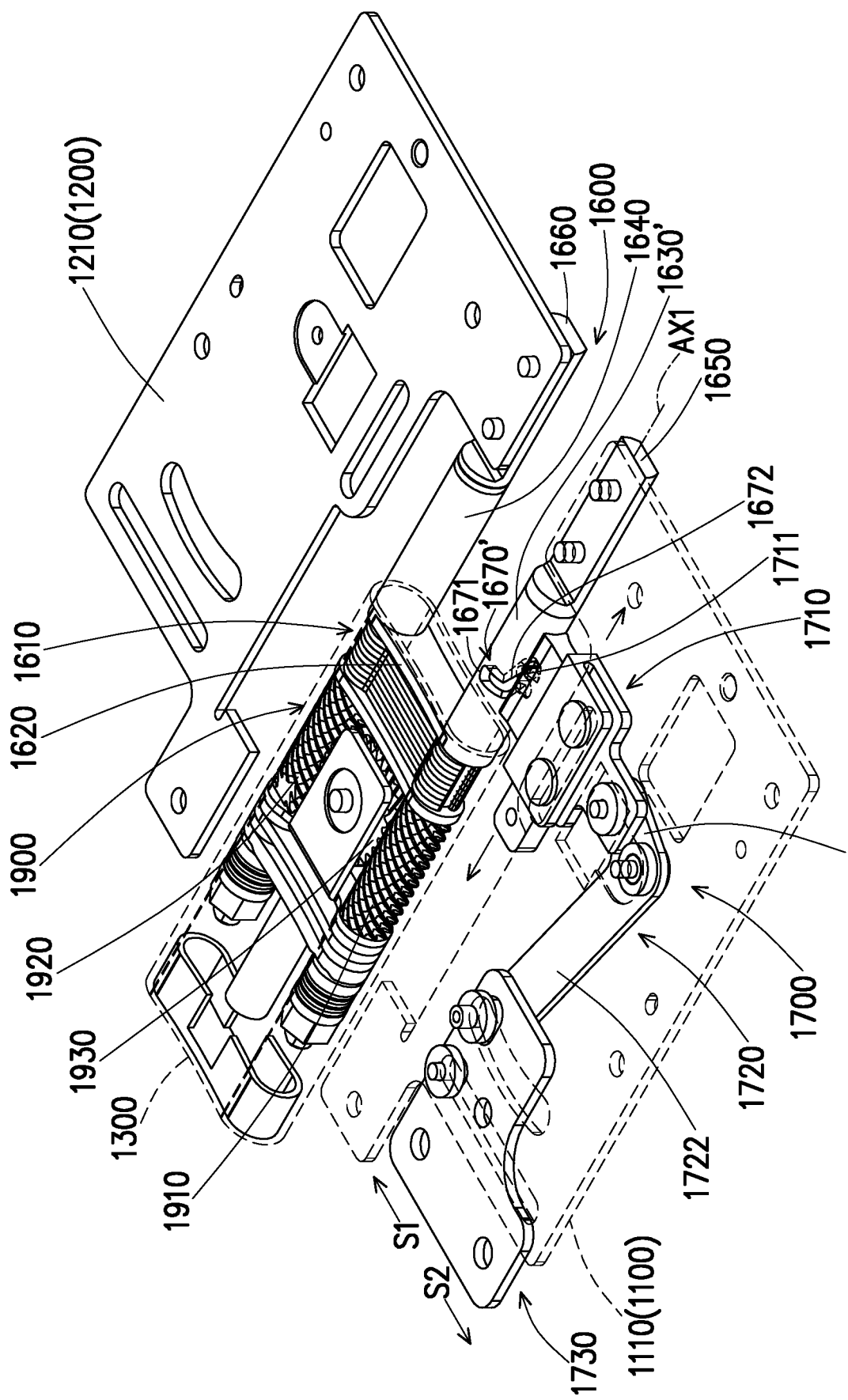
Figure 8G:
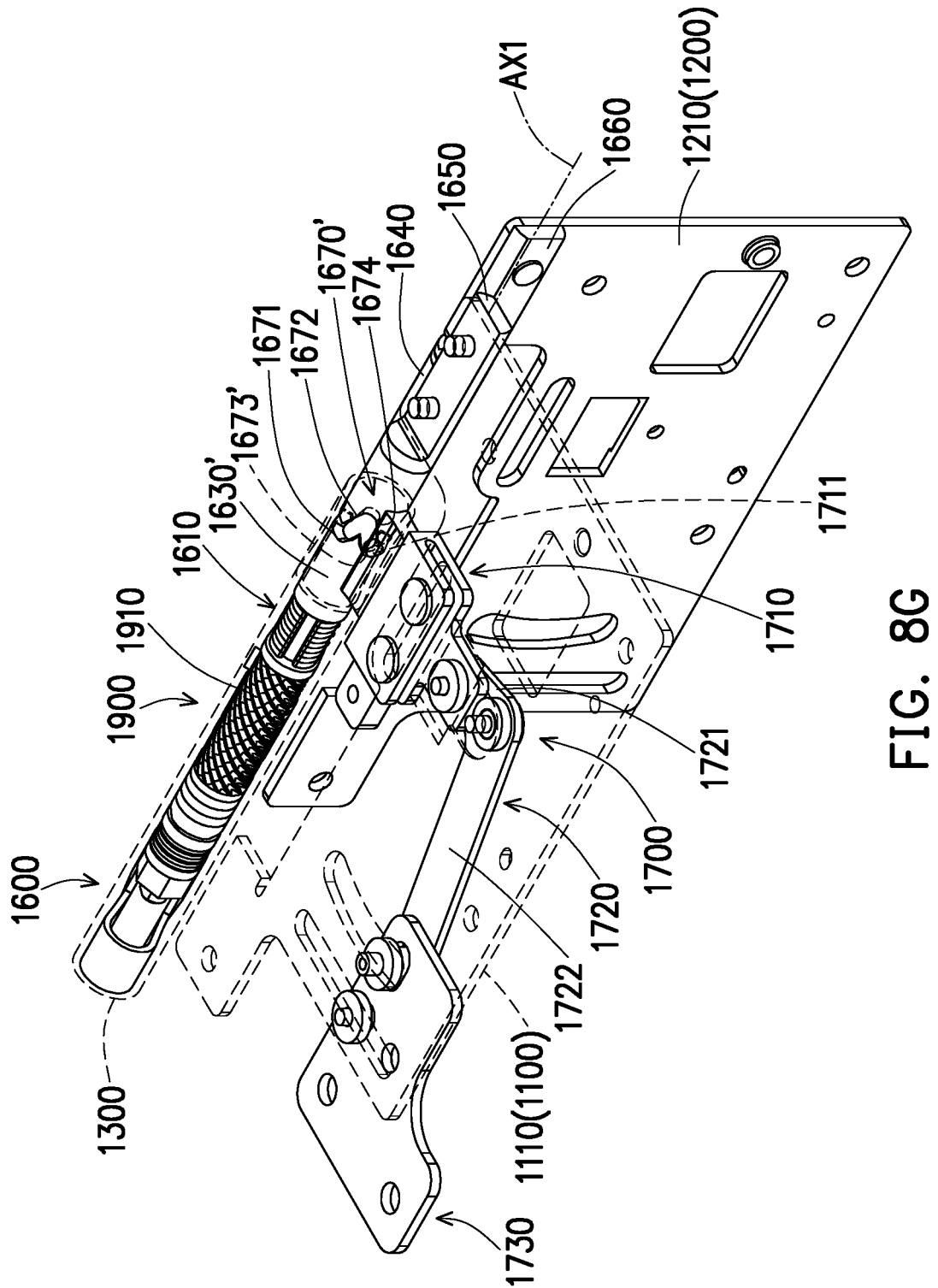
Figure 8H:
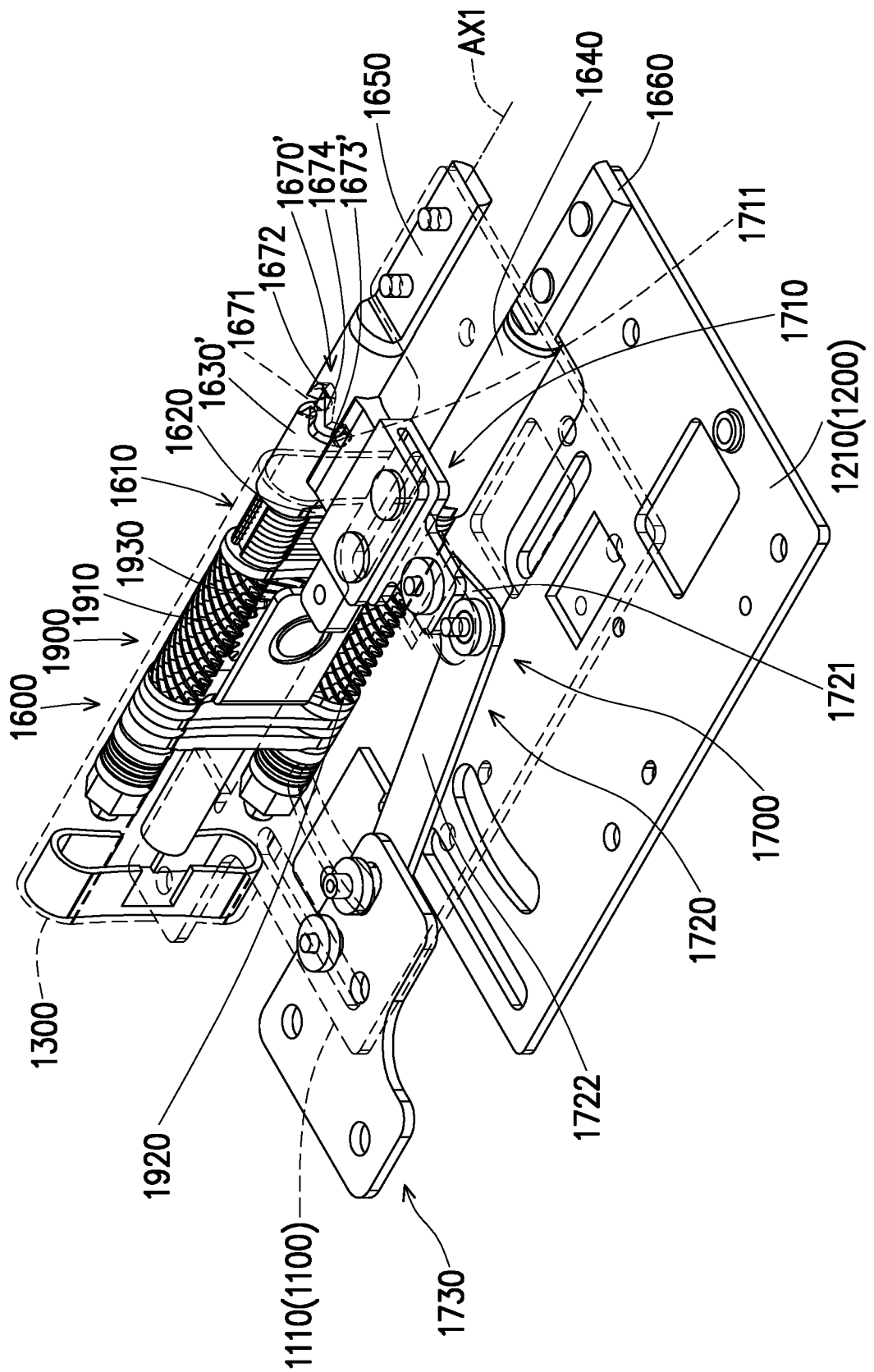

FIG. 8A is a perspective schematic view of the internal components of the foldable electronic device according to an embodiment of the disclosure. FIG. 8B is an exploded view of the components in FIG. 8A. FIG. 8C illustrates a partial enlarged schematic view of the connecting portion, the first guiding portion, the first bushing and the second bushing in FIG. 8B from a different perspective. FIG. 8D is a schematic view of the design principle of the first guiding portion in FIG. 8C. FIG. 8E to FIG. 8H are schematic views of different states of the components in FIG. 8A. For clarity of presentation and ease of description, a part of the structure is drawn in dashed lines in FIG. 8A, FIG. 8E to FIG. 8H. In an embodiment, by mounting the components in FIG. 8A to the inside of the hinge cover 1300, it is possible to make the foldable electronic device 1000 to achieve the changes shown in FIG. 1, FIG. 2, FIG. 3A, and FIG. 4A to FIG. 5C in sequence. The components shown in FIG. 8A to FIG. 8H and the components in the above-mentioned figures denoted by the same or similar symbols have the same or similar configurations and operation principles, and therefore repetition will not be narrated herein. The difference between the components shown in FIG. 8A to FIG. 8H is that in order to enable the first object 1400 to change from the state shown in FIG. 3A to the state shown in FIG. 4C, the first guiding portion 1670' not only includes the aforementioned first idle segment 1671 and the first driving segment 1672, but also includes a first restoring segment 1674 and a first stationary segment 1673'.

The first driving segment 1672 is connected between the first idle segment 1671 and the first restoring segment 1674. The first restoring segment 1674 is connected between the first driving segment 1672 and the first stationary segment 1673'. The first idle segment 1671 is circumferentially arranged outside the first bushing 1630' in the first diameter direction DD1 of the first bushing 1630', and the first stationary segment 1673' is also circumferentially arranged outside the first bushing 1630' in the first diameter direction DD1 of the first bushing 1630', and the first idle segment 1671 and the first stationary segment 1673' are located on the same cross section of the first bushing 1630'. The first driving segment 1672 is circumferentially arranged outside the first bushing 1630' in the first diameter direction DD1 and the first axis direction AD1 of the first bushing 1630', and the first restoring segment 1674 is circumferentially arranged outside the first bushing 1630' in the first diameter direction DD1 and the first axis direction AD1 of the first bushing 1630'. Both the first driving segment 1672 and the first restoring segment 1674 form an arrow shape.

Further, a first driving restoring point P15 is defined at the junction of the first driving segment 1672 and the first restoring segment 1674. A first restoring stationary point P16 is defined at the junction of the first restoring segment 1674 and the first stationary segment 1673'. A first stationary end point P14' far away from the first restoring segment 1674 is defined at the first stationary segment 1673'. A first driving center angle θ12 is defined at the first axis AX1, the first idle driving point P12, and the first driving restoring point P15. A first restoring center angle θ14 is defined at the first axis AX1, the first driving restoring point P15, and the first restoring stationary point P16. A first stationary center angle θ13' is defined at the first axis AX1, the first restoring stationary point P16, and the first stationary end point P14'. The widths of the first guiding portion 1670' from the first idle end point P11, the first idle driving point P12, the first driving restoring point P15, the first restoring stationary point P16 to the first stationary end point P14' are all the same.

When the foldable electronic device 1000 is in the state shown in FIG. 3A, the first linkage portion 1711 is coupled to the first driving restoring point P15. When the second body 1200 is unfolded relative to the first body 1100 from the state shown in FIG. 3A to the state shown in FIG. 4C, the second body 1200 is, for example but not limited to, further unfolded by 90 degrees relative to the first body 1100 from the state shown in FIG. 3A. Under the condition, the foldable electronic device 1000 corresponds to the state of the components of FIG. 8G Similarly, through the action of the synchronization mechanism 1900, the first rotating shaft 1650 is, for example but not limited to, further rotated by 45 degrees, and the second rotating shaft 1660 is, for example but not limited to, further rotated by 45 degrees. Under the condition, the first linkage portion 1711 is coupled to the first restoring stationary point P16, and with the guidance of the first restoring segment 1674, the first linkage portion 1711 drives the first sliding block 1710 to slide in a direction parallel to the first axis AX1. The first sliding block 1710 drives the first driven end 1721 to swing, the first driven end 1721 drives the first swinging end 1722 to swing, and the first swinging end 1722 drives the first sliding member 1730 to slide relatively away from the hinge cover 1300 and the dual-axis hinge module 1600 along the second sliding direction S2. Since the first object 1400 is fixed at the first sliding member 1730, the first object 1400 will slide relatively away from the hinge cover 1300 and the dual-axis hinge module 1600 along with the first sliding member 1730, such that the first object 1400 will slide to the aforementioned first initial position. In other words, the first linkage portion 1711 moves in the first restoring segment 1674 by an angle of the first restoring center angle θ14. The angle of the first restoring center angle θ14 is, for example but not limited to 45 degrees.

When the second body 1200 is unfolded relative to the first body 1100 from the state shown in FIG. 4C to the state shown in FIG. 5C, the second body 1200 is, for example but not limited to, further unfolded by 90 degrees relative to the first body 1100 from the state shown in FIG. 4C. Under the condition, the state of the foldable electronic device 1000 corresponds to the state of the components in FIG. 8H. Similarly, through the action of the synchronization mechanism 1900, the first rotating shaft 1650 is, for example but not limited to, further rotated by 45 degrees, and the second rotating shaft 1660 is, for example but not limited to, further rotated by 45 degrees. Under the condition, the first linkage portion 1711 is coupled to the first stationary end point P14', and therefore the first sliding member 1730 and the first object 1400 are still relatively far away from the hinge cover 1300 and the dual-axis hinge module 1600 and located at the aforementioned first initial position. In other words, the first linkage portion 1711 moves in the first stationary segment 1673' by an angle of the first stationary center angle θ13'. The angle of the first stationary center angle θ13' is, for example but not limited to 45 degrees. Through the action of the synchronization mechanism 1900, in order to enable the second body 1200 to be unfolded by 360 degrees relative to the first body 1100, the sum of the first idle center angle θ11, the first driving center angle θ12, the first restoring center angle θ14, and the first stationary center angle θ13' is equal to 180 degrees. It should be noted that by adjusting the angles of the first idle center angle θ11, the first driving center angle θ12, the first restoring center angle θ14, and the first stationary center angle θ13', the time point at which the first linkage portion 1711 drives the first sliding block 1710 can be adjusted, thereby adjusting the time point at which the first object 1400 slides relative to the first body 1100.

Figure 9A:
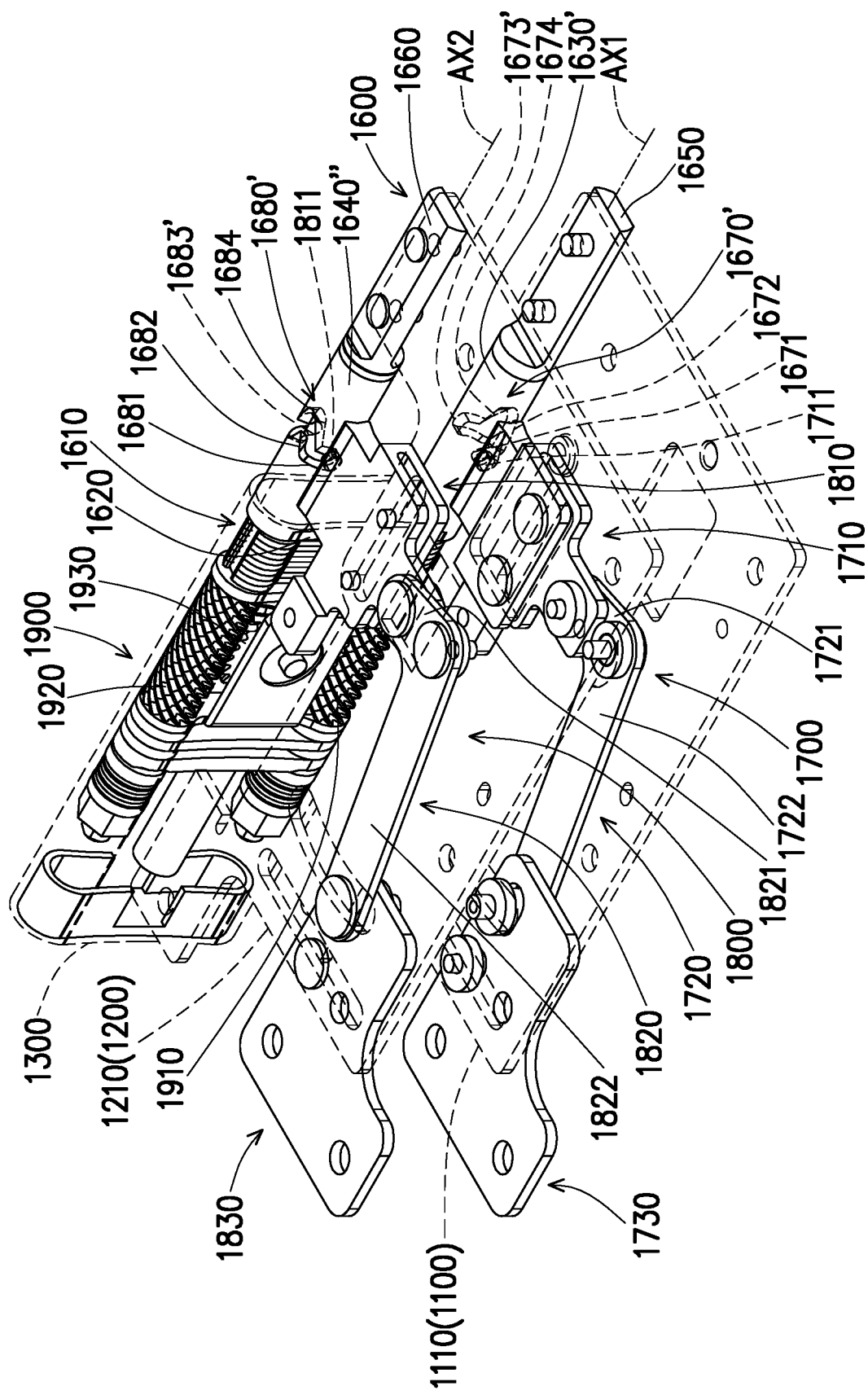
FIG. 9A is a perspective schematic view of the internal components of the foldable electronic device according to an embodiment of the disclosure.
Figure 9B:
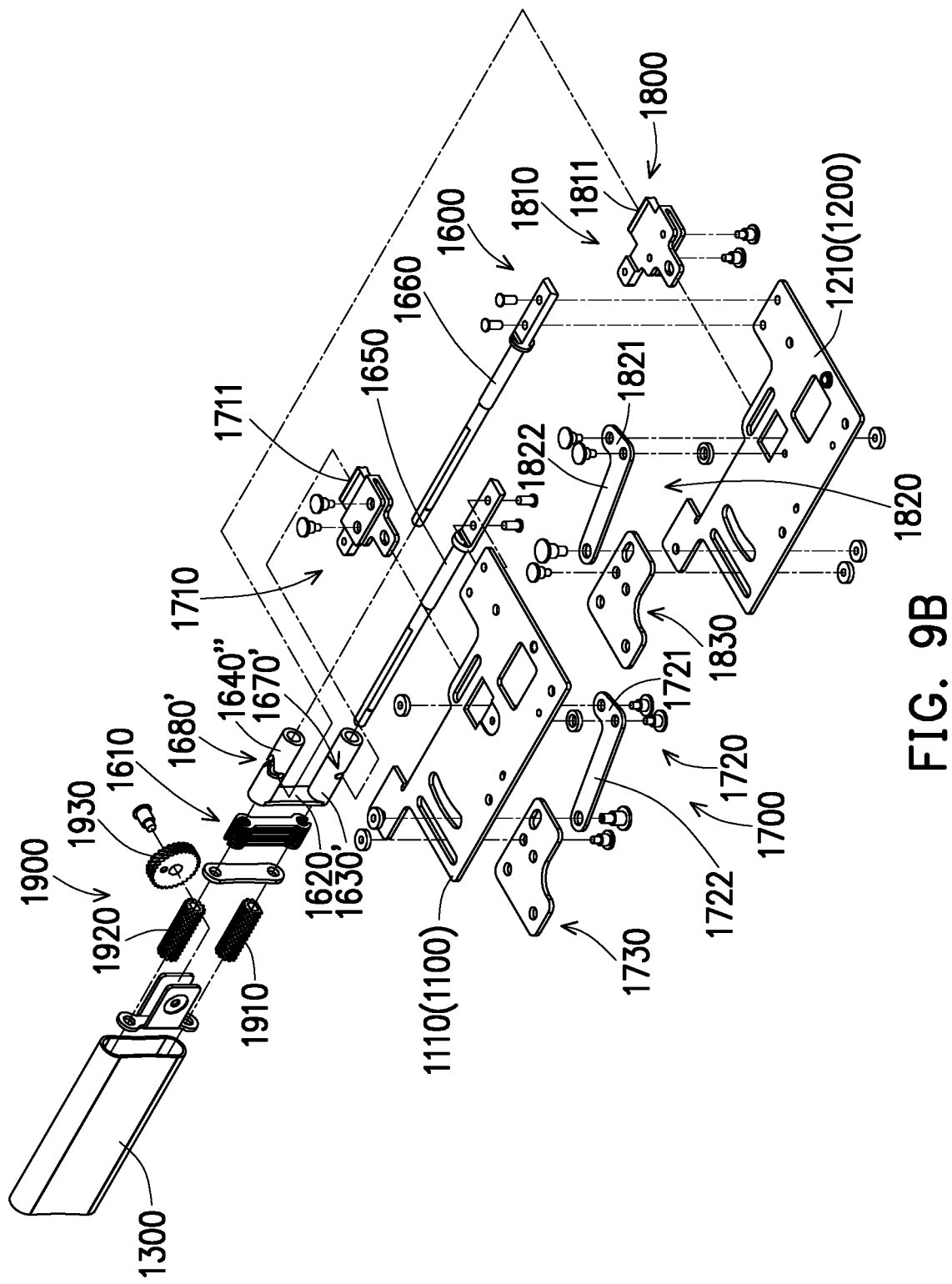
FIG. 9B is an exploded view of the components in FIG. 9A.
Figure 9E:
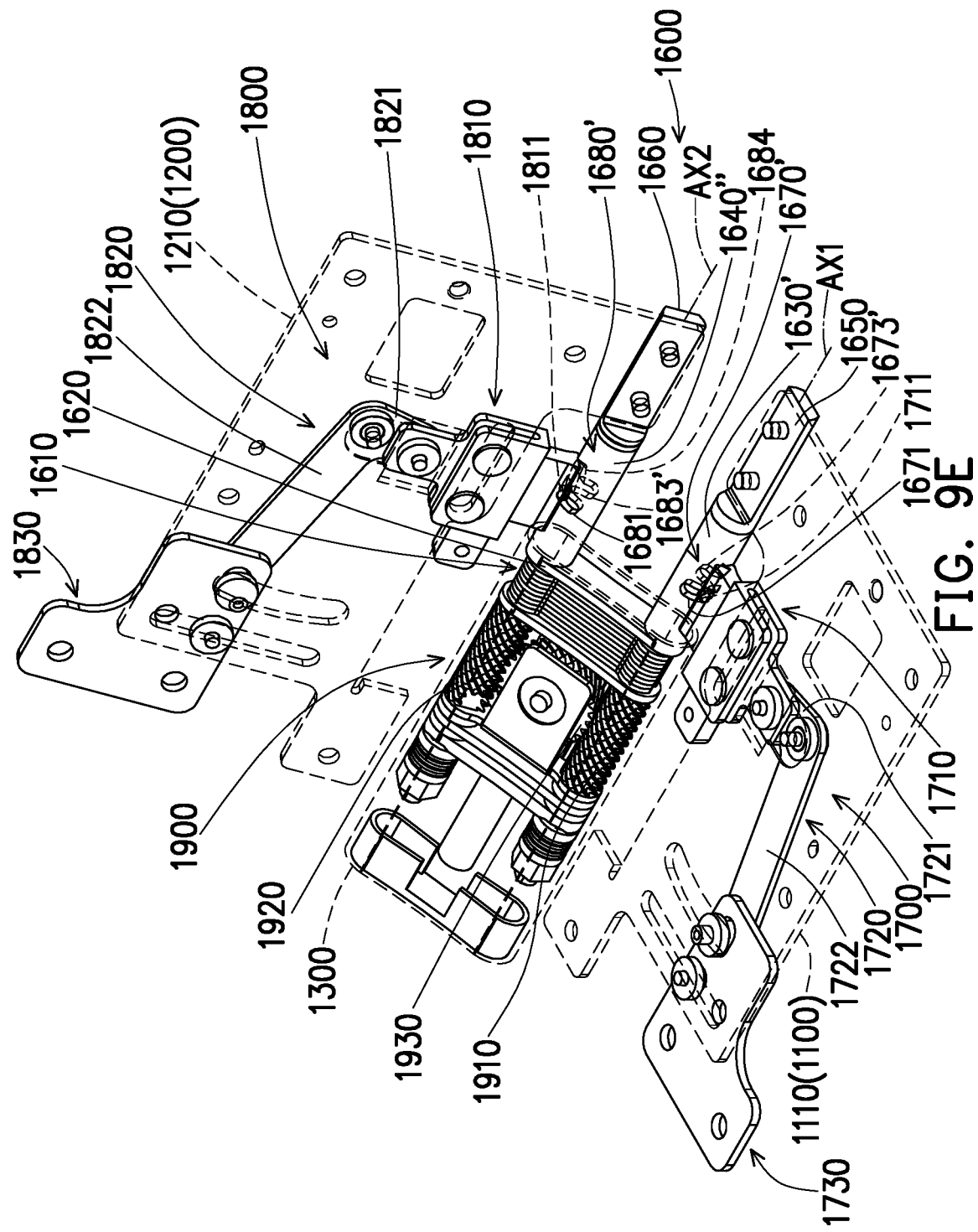
FIG. 9E to FIG. 9H are schematic views of different states of the components in FIG. 9A.
Figure 9F:
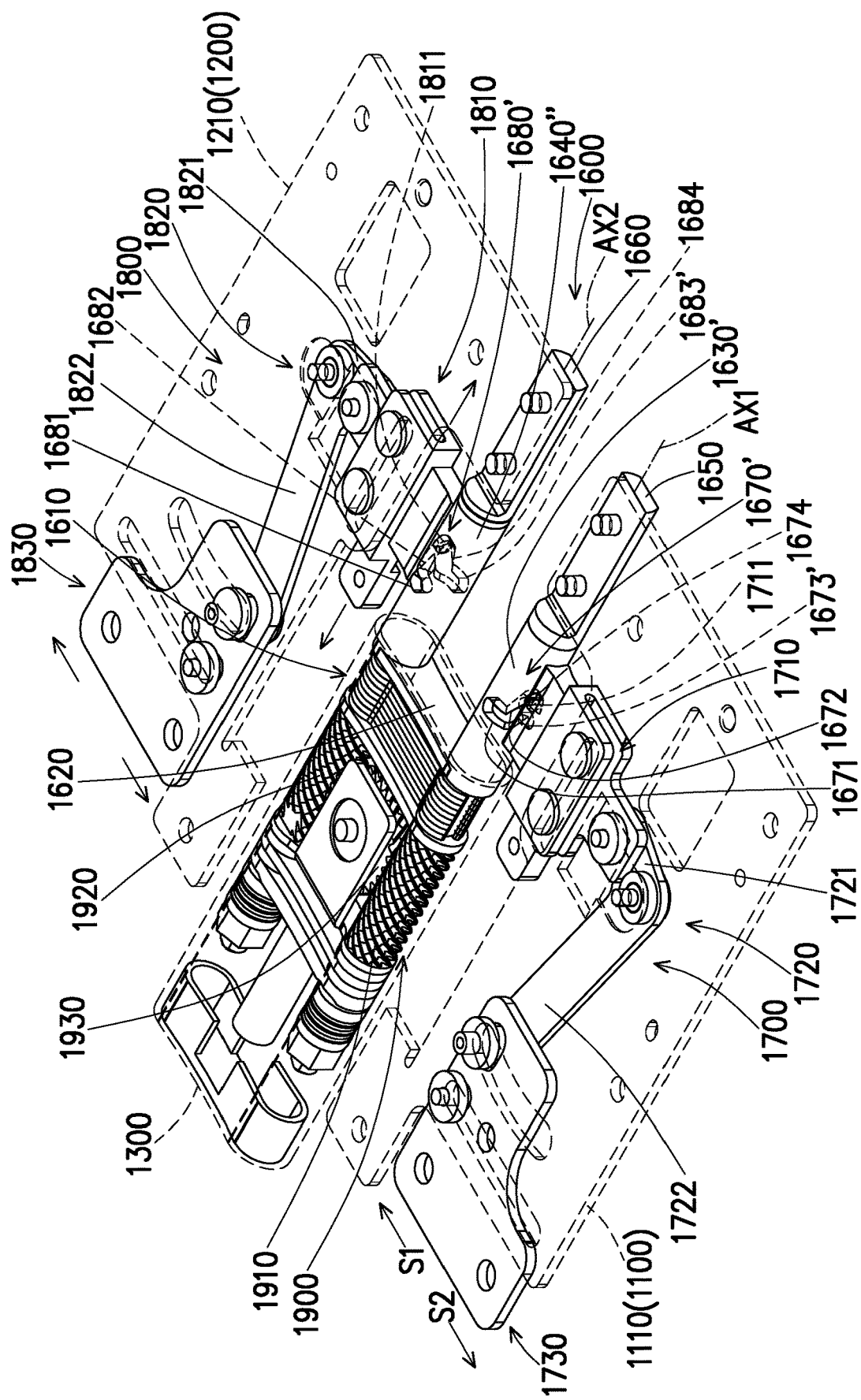
Figure 9G:
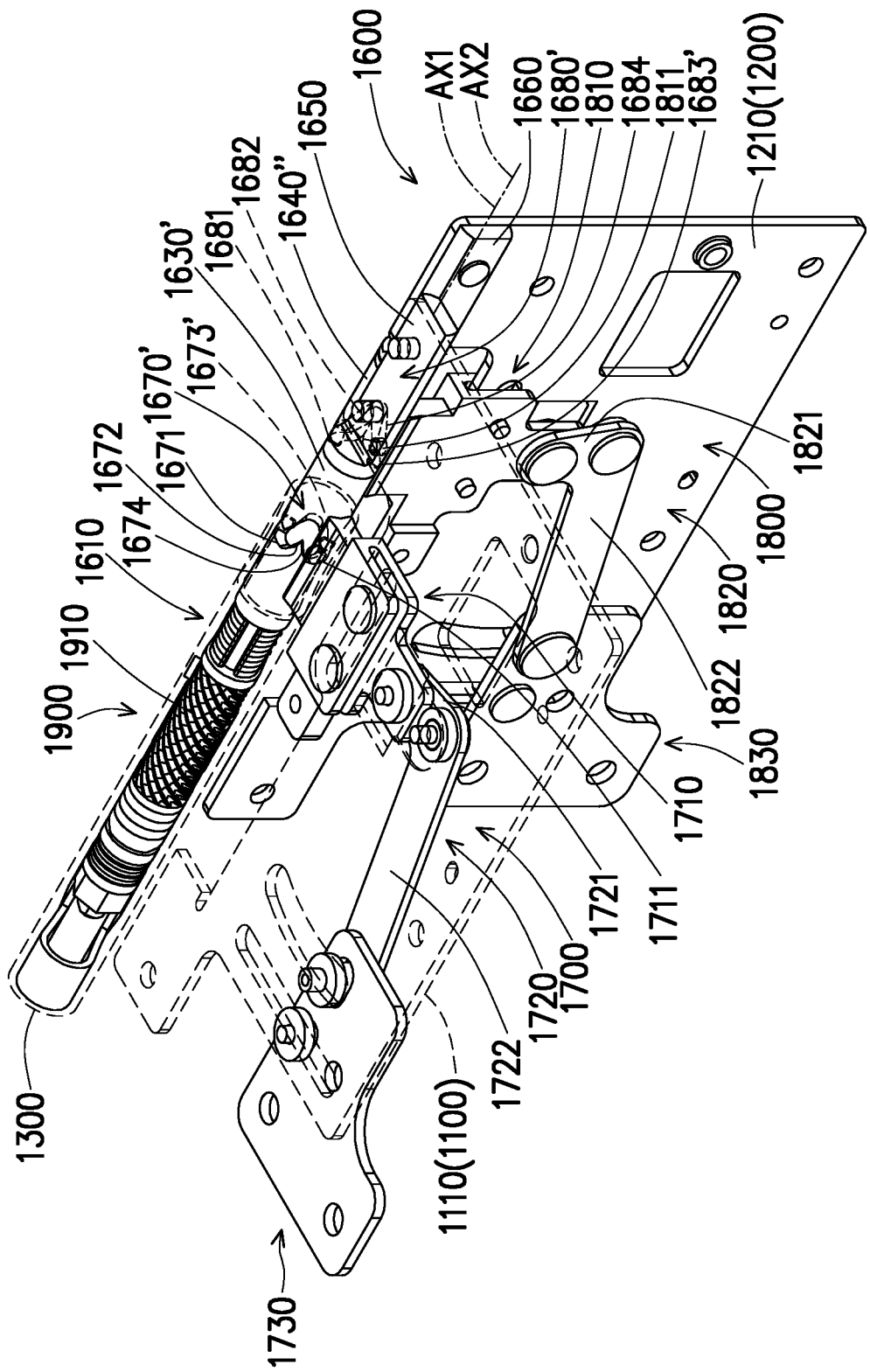
Figure 9H:
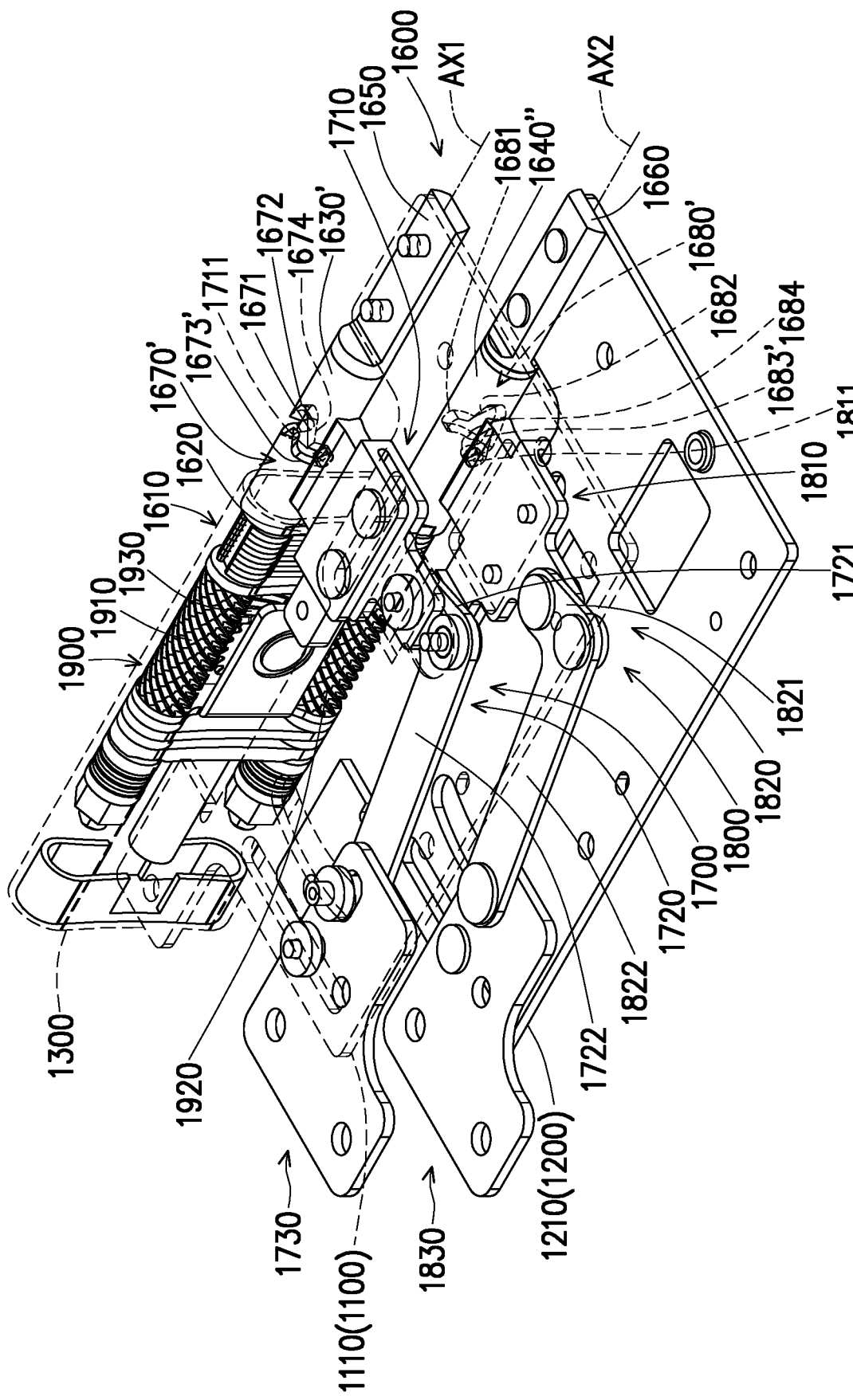

FIG. 9A is a perspective schematic view of the internal components of the foldable electronic device according to an embodiment of the disclosure. FIG. 9B is an exploded view of the components in FIG. 9A. FIG. 9C illustrates a partial enlarged schematic view of the connecting portion, the first guiding portion, the second guiding portion, the first bushing and the second bushing in FIG. 9B from a different perspective. FIG. 9D is a schematic view of the design principle of the first guiding portion in FIG. 9C. FIG. 9E to FIG. 9H are schematic views of different states of the components in FIG. 9A. For clarity of presentation and ease of description, a part of the structure is drawn in dashed lines in FIG. 9A, FIG. 9E to FIG. 9H. In an embodiment, by mounting the components in FIG. 9A to the inside of the hinge cover 1300, it is possible to make the foldable electronic device 1000 to achieve the changes shown in FIG. 1, FIG. 2, FIG. 3B, and FIG. 4C to FIG. 5C in sequence. The components shown in FIG. 9A to FIG. 9H and the components shown in the above figures denoted by the same or similar symbols have the same or similar configuration and operation principle, and therefore repetition will not be narrated herein. In addition, among the components shown in FIG. 9A to FIG. 9H, the configuration and operation principle of the second bushing 1640", the second guiding portion 1680', the second stationary segment 1683', the second restoring segment 1684, the second stationary end point P24', the second driving restoring point P25, the second restoring stationary point P26, the second stationary center angle θ23' and the second restoring center angle θ24 are the same as or similar to the configuration and operation principle of the first bushing 1630', the first guiding portion 1670', the first stationary segment 1673', the first restoring segment 1674, the first stationary end point P14', the first driving restoring point P15, the first restoring stationary point P16, the first stationary center angle θ13' and the first restoring center angle θ14 in FIG. 8A to FIG. 8H, and therefore no repetition is narrated herein. The difference between the components shown in FIG. 9A to FIG. 9H is that, through the cooperation of two guiding portions (i.e., the first guiding portion 1670' and the second guiding portion 1680') and two linkage mechanisms (i.e., the first linkage mechanism 1700 and the second linkage mechanism 1800), it is possible to enable both of the first object 1400 and the second object 1500 to slide, and the first object 1400 can change from the state shown in FIG. 3B to the state shown in FIG. 4C. As such, when the second body 1200 is unfolded relative to the first body 1100 from the state shown in FIG. 3B to the state shown in FIG. 4C, the first object 1400 is far away from the hinge cover 1300 and the dual-axis hinge module 1600, and the second object 1500 is far away from the hinge cover 1300 and dual-axis hinge module 1600. In other words, the first object 1400 is at the first initial position relative to the first body 1100, and the second object 1500 is at the second initial position relative to the second body 1200.

In the foldable electronic device 1000, the second body 1200 can be unfolded synchronously relative to the first body 1100. The following is an example showing the second body 1200 not being unfolded in synchronization with the first body 1100.

Figure 10:
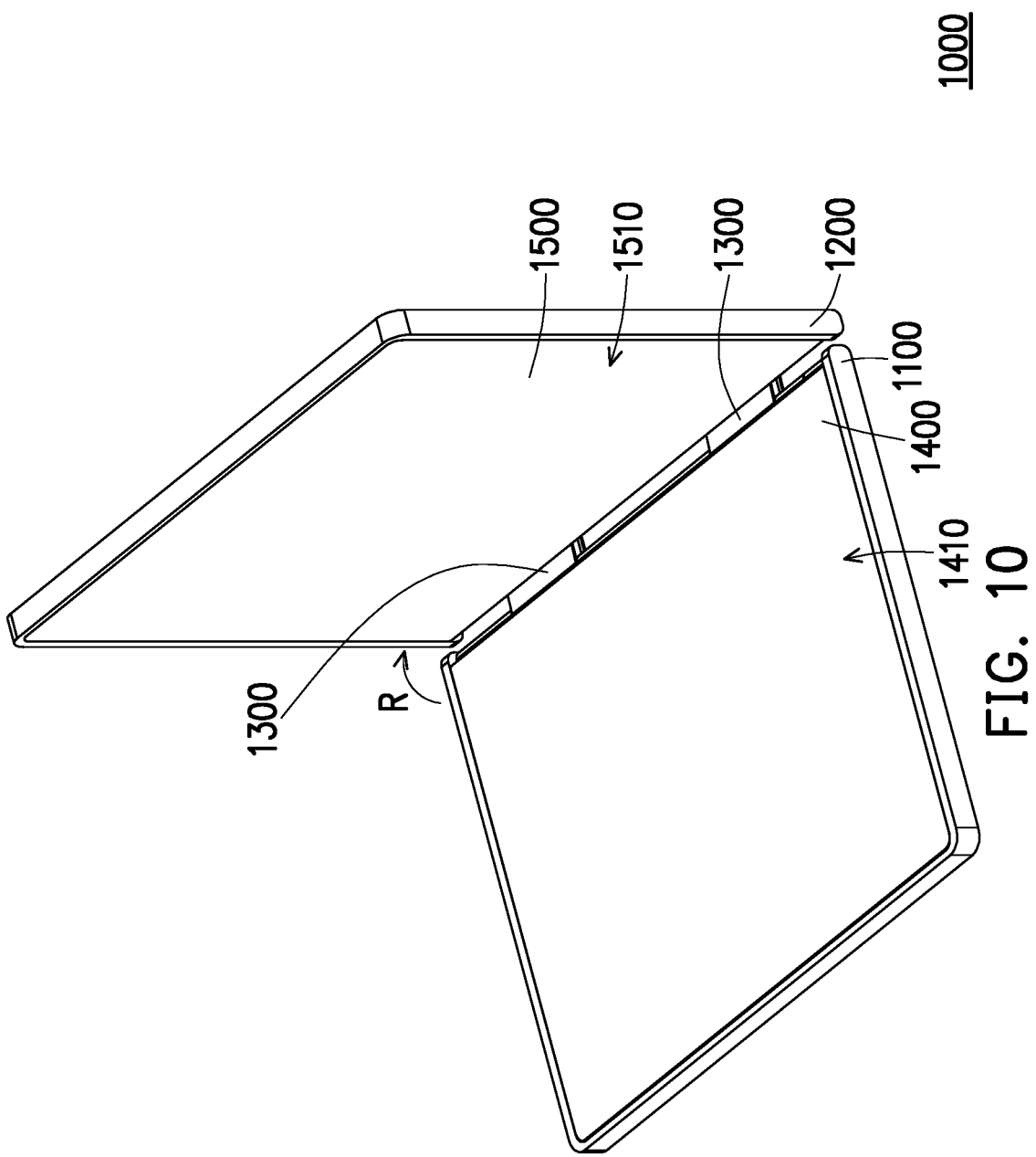
FIG. 10 is a perspective schematic view showing that the first body and the second body of the foldable electronic device have a first included angle relative to each other according to an embodiment of the disclosure.

FIG. 10 is a perspective schematic view showing that the first body and the second body of the foldable electronic device have a first included angle relative to each other according to an embodiment of the disclosure. In an embodiment, the foldable electronic device 1000 in the state shown in FIG. 1 can be unfolded to the state shown in FIG. 10. When the second body 1200 is unfolded relative to the first body 1100 along the unfolding direction R to the state shown in FIG. 10, only the hinge cover 1300 is rotated relative to the first body 1100 under the condition. The relative positional relationship between the hinge cover 1300 and the second body 1200 remains unchanged. There is a first included angle between the first body 1100 and the second body 1200, and the second top surface 1510 has a first included angle as being unfolded relative to the first top surface 1410. In the state shown in FIG. 10, the second top surface 1510 is, for example but not limited to, unfolded by 90 degrees relative to the first top surface 1410, that is, the first included angle is, for example but not limited to 90 degrees. That is to say, the second top surface 1510 is, for example but not limited to, inclined by 90 degrees relative to the first top surface 1410.

In an embodiment, the foldable electronic device 1000 in the state shown in FIG. 1 and FIG. 10 can be further unfolded to the state shown in FIG. 3A.

In an embodiment, in the process where the second body 1200 in the foldable electronic device 1000 in the state shown in FIG. 1 is unfolded by 90 degrees relative to the first body 1100, it may be that only the second body 1200 is rotated relative to the hinge cover 1300, and the relative positional relationship between the hinge cover 1300 and the first body 1100 remains unchanged.

Figure 11A:
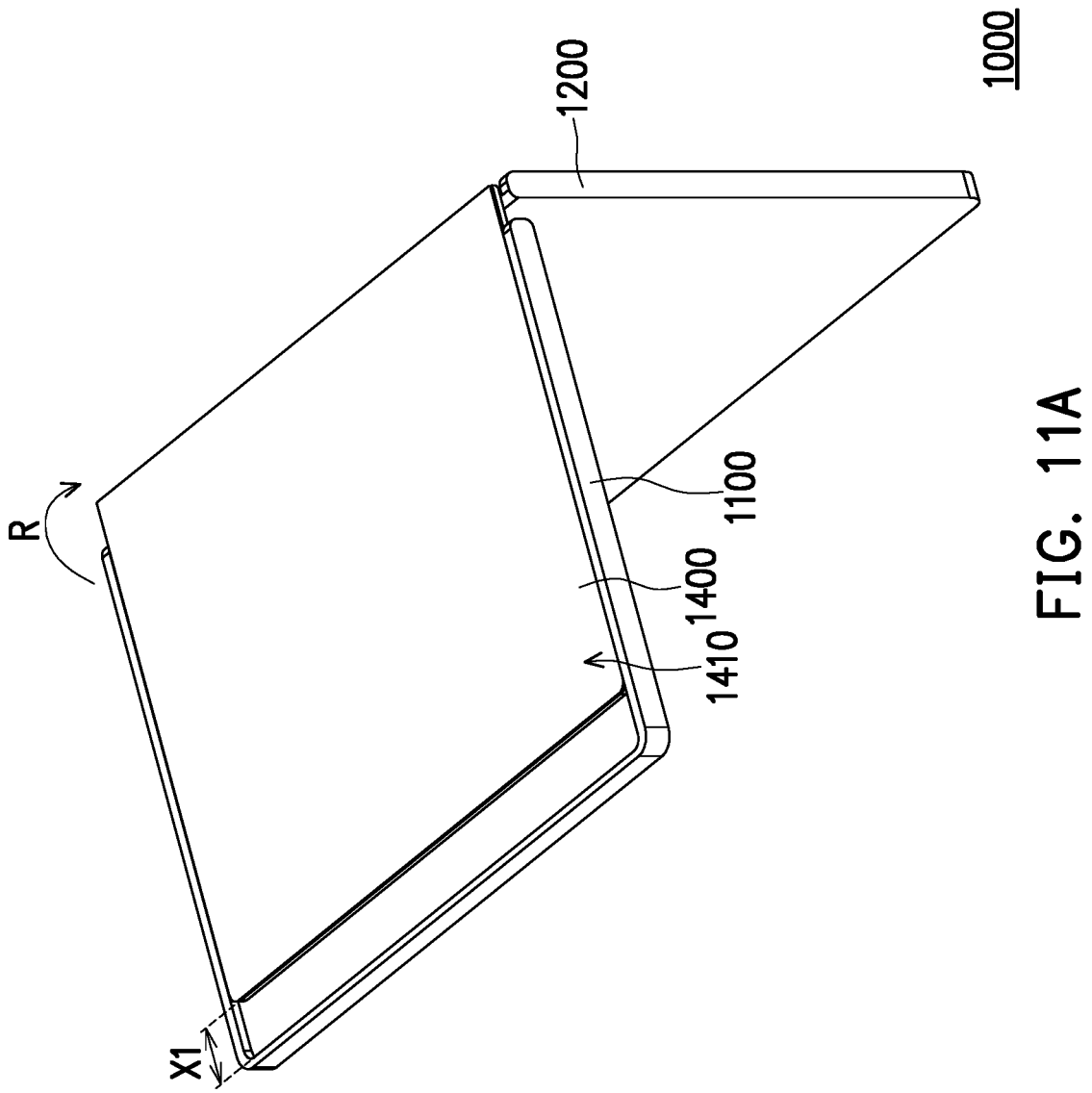
FIG. 11A is a perspective schematic view showing that the first body and the second body of the foldable electronic device have a fourth included angle relative to each other according to an embodiment of the disclosure.

FIG. 11A is a perspective schematic view showing that the first body and the second body of the foldable electronic device have a fourth included angle relative to each other according to an embodiment of the disclosure. In an embodiment, the foldable electronic device 1000 in the state shown in FIG. 1, FIG. 10 and FIG. 3A can be further unfolded to the state shown in FIG. 11A. When the second body 1200 is unfolded relative to the first body 1100 along the unfolding direction R from the state shown in FIG. 3A to the state shown in FIG. 11A, only the second body 1200 is rotated relative to the hinge cover 1300 under the condition. The relative positional relationship between the first body 1100 and the hinge cover 1300 remains unchanged, and the second top surface 1510 is unfolded by a larger angle relative to the first top surface 1410. In the state shown in FIG. 11A, there is a fourth included angle between the first body 1100 and the second body 1200, and the second top surface 1510 has a fourth included angle as being unfolded relative to the first top surface 1410. The fourth included angle is, for example but not limited to 270 degrees. In other words, the second top surface 1510 is, for example but not limited to, inclined by 270 degrees relative to the first top surface 1410. Under the condition, the first object 1400 does not slide at all, and therefore the relative positions of the first object 1400 and the first body 1100 remain unchanged. That is to say, the first object 1400 still slides relative to the first body 1100 by the first displacement X1 and is relatively close to the hinge cover 1300 and away from the first initial position.

In an embodiment, the foldable electronic device 1000 in the state shown in FIG. 1 and FIG. 10 can be further unfolded to the state shown in FIG. 3B.

Figure 11B:
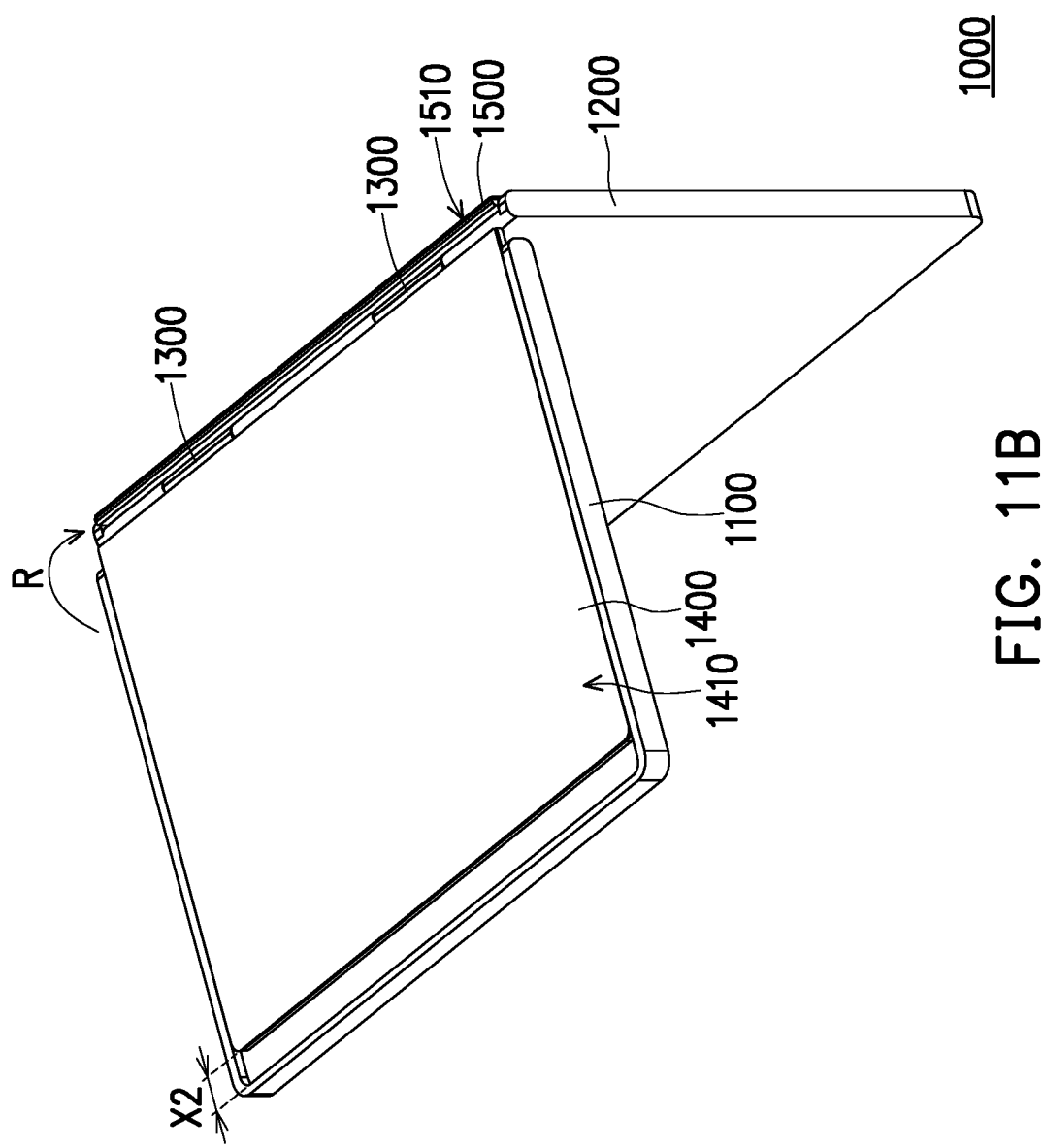
FIG. 11B is a perspective schematic view showing that the first body and the second body of the foldable electronic device have a fourth included angle relative to each other according to an embodiment of the disclosure.

FIG. 11B is a perspective schematic view showing that the first body and the second body of the foldable electronic device have a fourth included angle relative to each other according to an embodiment of the disclosure. In an embodiment, the foldable electronic device 1000 in the state shown in FIG. 1, FIG. 10, and FIG. 3B can be further unfolded to the state shown in FIG. 11B. When the second body 1200 is unfolded relative to the first body 1100 along the unfolding direction R from the state shown in FIG. 3B to the state shown in FIG. 11B, only the second body 1200 is rotated relative to the hinge cover 1300 under the condition. The relative positional relationship between the first body 1100 and the hinge cover 1300 remains unchanged, and the second top surface 1510 is unfolded by a larger angle relative to the first top surface 1410. In the state shown in FIG. 11B, there is a fourth included angle between the first body 1100 and the second body 1200, and the second top surface 1510 has a first included angle as being unfolded relative to the first top surface 1410. The fourth included angle is, for example but not limited to 270 degrees. In other words, the second top surface 1510 is, for example but not limited to, inclined by 270 degrees relative to the first top surface 1410. Under the condition, the first object 1400 and the second object 1500 does not slide at all, and therefore the relative positions of the first object 1400 and the first body 1100 remain unchanged, and the relative positions of the second object 1500 and the second body 1200 remain unchanged. In other words, the first object 1400 still slides relative to the first body 1100 by the second displacement X2 and is relatively close to the hinge cover 1300, and the second object 1500 still slides relative to the second body 1200 by the third displacement X3 and is relatively close to the hinge cover 1300 and away from the first initial position.

Figure 11C:
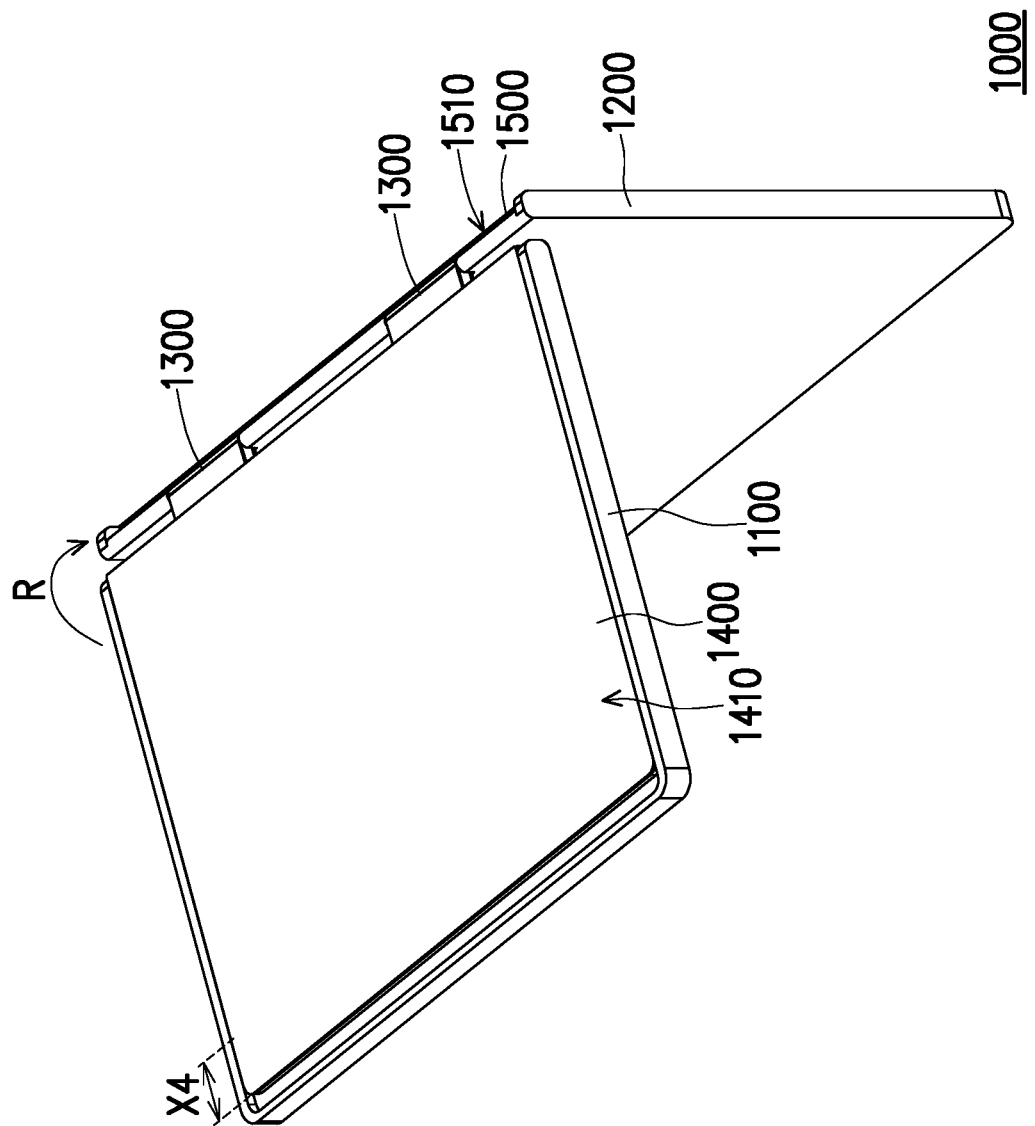
FIG. 11C is a perspective schematic view showing that the first body and the second body of the foldable electronic device have a fourth included angle relative to each other according to an embodiment of the disclosure.

FIG. 11C is a perspective schematic view showing that the first body and the second body of the foldable electronic device have a fourth included angle relative to each other according to an embodiment of the disclosure. In an embodiment, the foldable electronic device 1000 in the state shown in FIG. 1, FIG. 10 and FIG. 3A can be further unfolded to the state shown in FIG. 11C. When the second body 1200 is unfolded relative to the first body 1100 along the unfolding direction R from the state shown in FIG. 3A to the state shown in FIG. 11C, there is a fourth included angle between the first body 1100 and the second body 1200, and the second top surface 1510 has a fourth included angle as being unfolded relative to the first top surface 1410. In the state shown in FIG. 11C, the second top surface 1510 is, for example but not limited to, unfolded by a total of 270 degrees relative to the first top surface 1410, that is, the fourth included angle is, for example but not limited to 270 degrees. In other words, the second top surface 1510 is inclined by 270 degrees relative to the first top surface 1410. In addition, the first object 1400 automatically slides in a second sliding direction S2 opposite to the first sliding direction S1, so that the first object 1400 slides by a fourth displacement X4 relative to the first body 1100 but does not slide to the first initial position. In other words, the first object 1400 automatically slide in a direction opposite to the hinge cover 1300, but does not completely slide to a position relatively far from the hinge cover 1300.

Figure 11D:
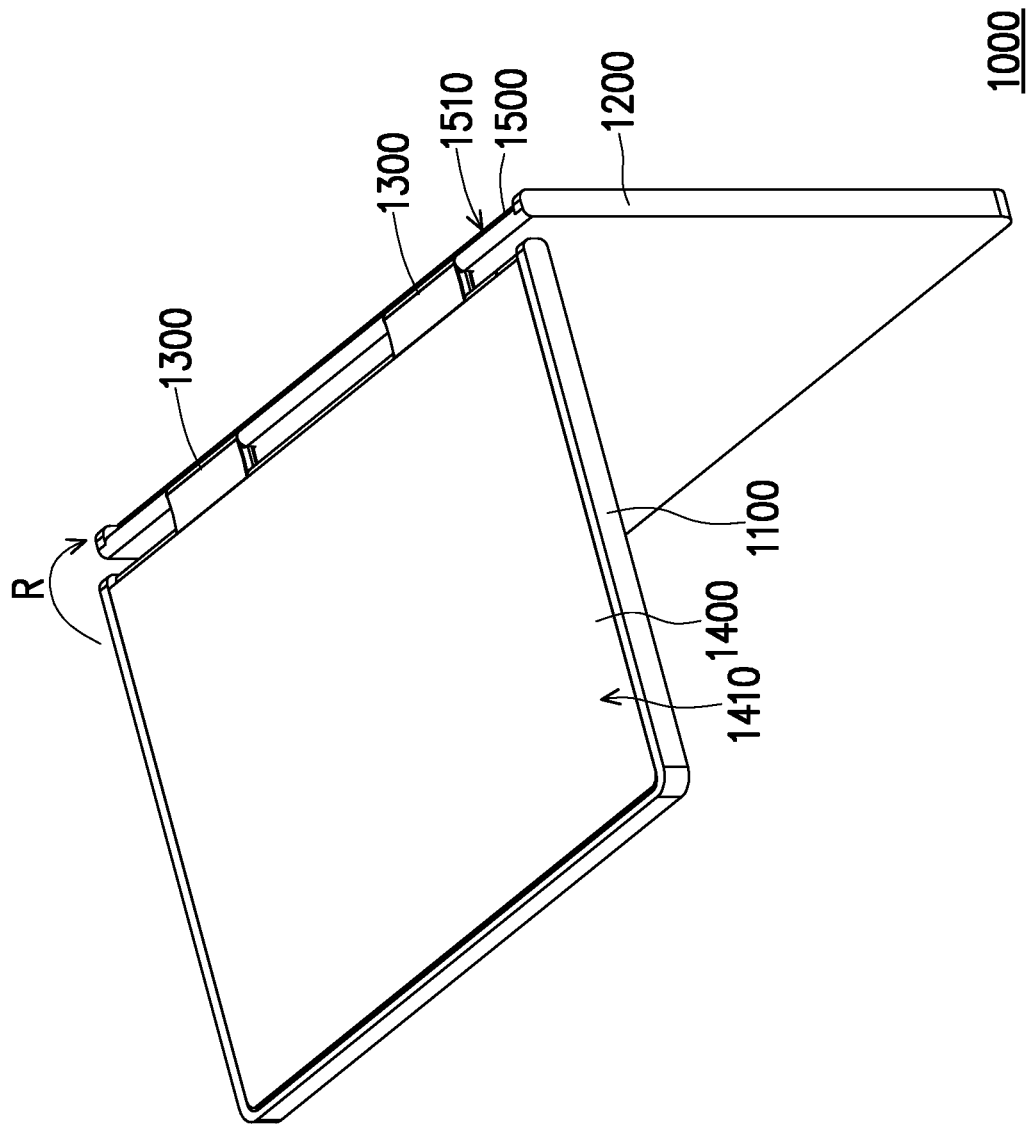
FIG. 11D is a perspective schematic view showing that the first body and the second body of the foldable electronic device have a fourth included angle relative to each other according to an embodiment of the disclosure.

FIG. 11D is a perspective schematic view showing that the first body and the second body of the foldable electronic device have a fourth included angle relative to each other according to an embodiment of the disclosure. In an embodiment, the foldable electronic device 1000 in the state shown in FIG. 1, FIG. 10 and FIG. 3B can be further unfolded to the state shown in FIG. 11D. When the second body 1200 is unfolded relative to the first body 1100 along the unfolding direction R from the state shown in FIG. 3B to the state shown in FIG. 11D, there is a fourth included angle between the first body 1100 and the second body 1200, and the second top surface 1510 has a first included angle as being unfolded relative to the first top surface 1410. In the state shown in FIG. 11D, the second top surface 1510 is, for example but not limited to, unfolded by a total of 270 degrees relative to the first top surface 1410, that is, the fourth included angle is, for example but not limited to 270 degrees. In other words, the second top surface 1510 is inclined by 270 degrees relative to the first top surface 1410. In addition, the first object 1400 automatically slides in a second sliding direction S2 opposite to the first sliding direction S1, so that the first object 1400 slides to the first initial position relative to the first body 1100. Furthermore, the second object 1500 automatically slides in the first sliding direction S1 opposite to the second sliding direction S2, so that the second object 1500 slides to the second initial position relative to the second body 1200. In other words, the first object 1400 automatically slides in a direction opposite to the hinge cover 1300 and is relatively away from the hinge cover 1300, and the second object 1500 automatically slides in a direction opposite to the hinge cover 1300 and is relatively away from the hinge cover 1300.

In an embodiment, the foldable electronic device 1000 in the state shown in FIG. 1, FIG. 10, FIG. 3A, and FIG. 11A can be further unfolded to the state shown in FIG. 5A.

In an embodiment, the foldable electronic device 1000 in the state shown in FIG. 1, FIG. 10, FIG. 3B, and FIG. 11B can be further unfolded to the state shown in FIG. 5B.

Figure 12:
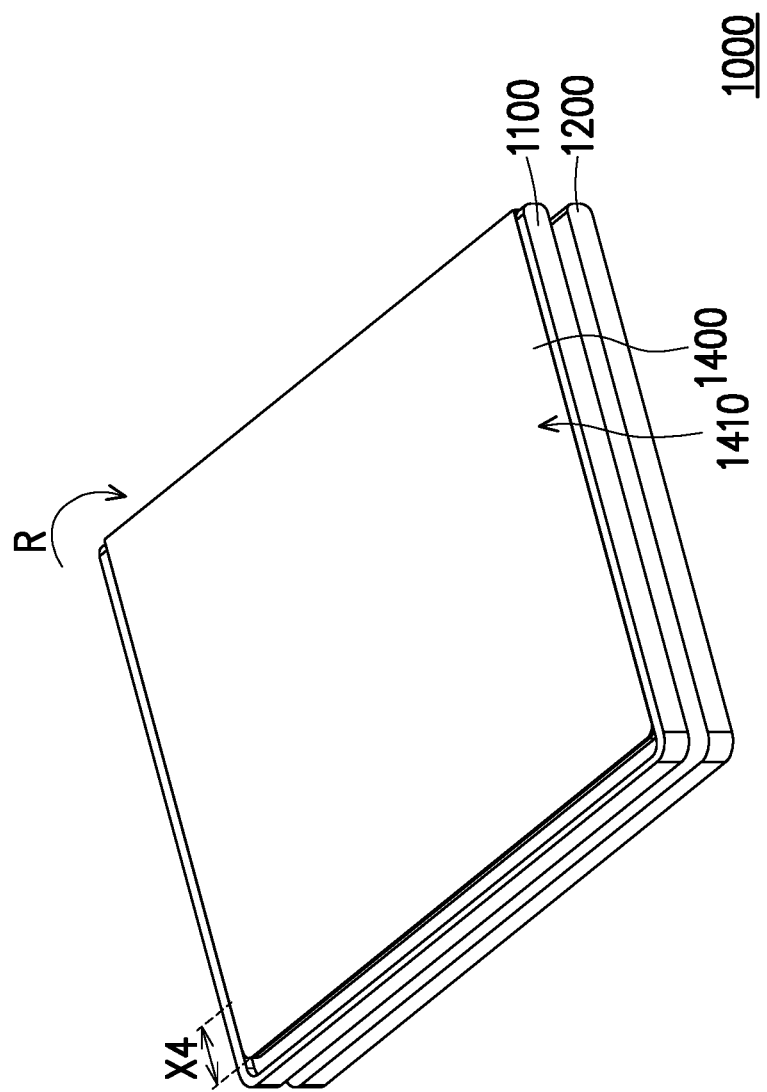
FIG. 12 is a perspective schematic view showing that the first body and the second body of the foldable electronic device have a third included angle relative to each other according to an embodiment of the disclosure.

FIG. 12 is a perspective schematic view showing that the first body and the second body of the foldable electronic device have a third included angle relative to each other according to an embodiment of the disclosure. In an embodiment, the foldable electronic device 1000 in the state shown in FIG. 1, FIG. 10, FIG. 3A, and FIG. 11C can be further unfolded to the state shown in FIG. 12. When the second body 1200 is unfolded relative to the first body 1100 along the unfolding direction R from the state shown in FIG. 11C to the state shown in FIG. 12, there is a third included angle between the first body 1100 and the second body 1200, and the second top surface 1510 and the first top surface 1410 have a third included angle therebetween as being unfolded relative to each other. In the state shown in FIG. 12, the second top surface 1510 is, for example but not limited to, unfolded by a total of 360 degrees relative to the first top surface 1410, that is, the third included angle is, for example but not limited to 360 degrees. Under the condition, the first object 1400 is maintained at a state of not completely sliding to a position relatively far away from the hinge cover 1300, that is, the first object 1400 does not slide to the first initial position.

In an embodiment, the foldable electronic device 1000 in the state shown in FIG. 1, FIG. 10, FIG. 3B, and FIG. 11D can be further unfolded to the state shown in FIG. 5C.

Figure 13A:
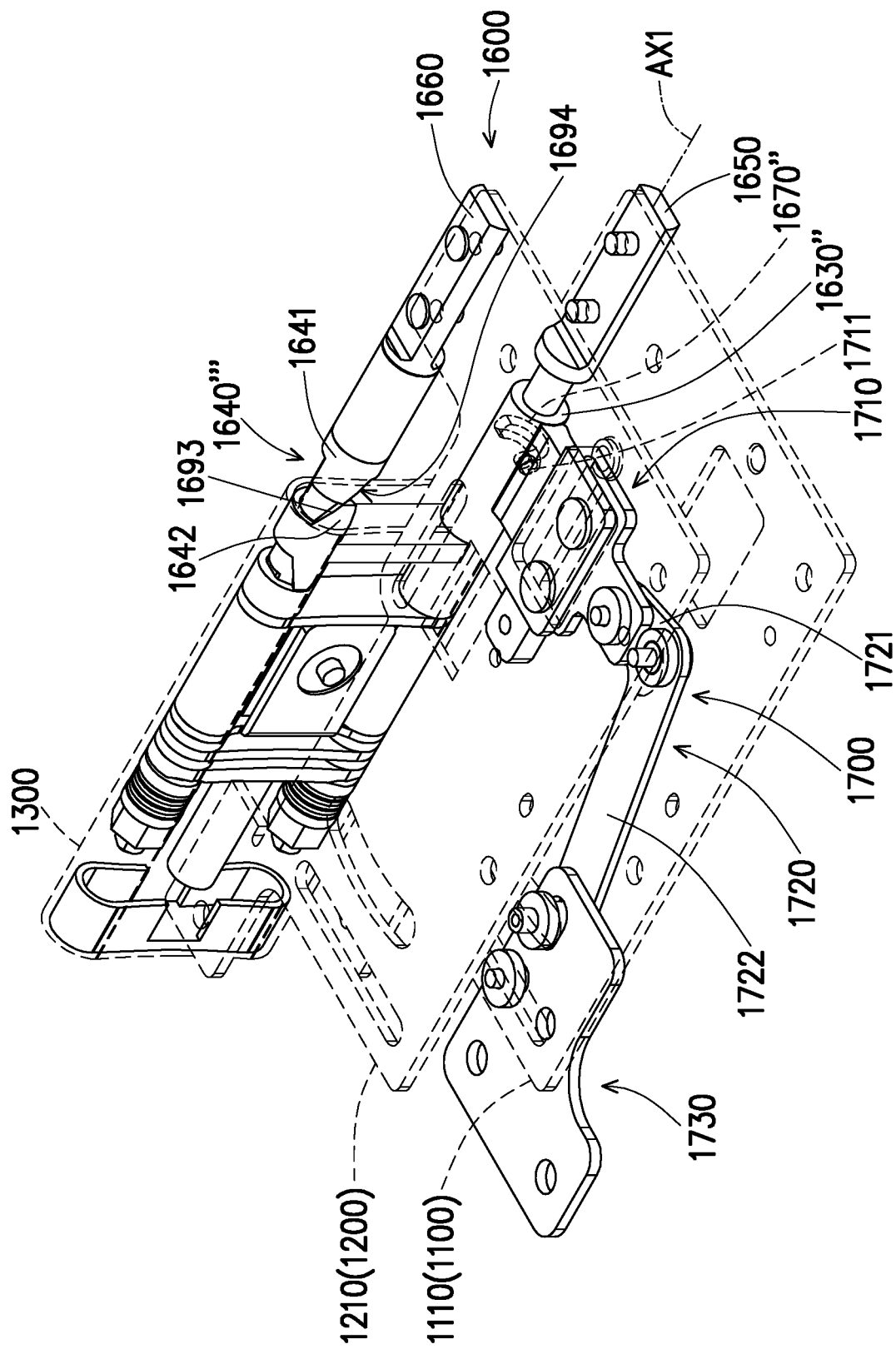
FIG. 13A is a perspective schematic view of the internal components of the foldable electronic device according to an embodiment of the disclosure.
Figure 13B:
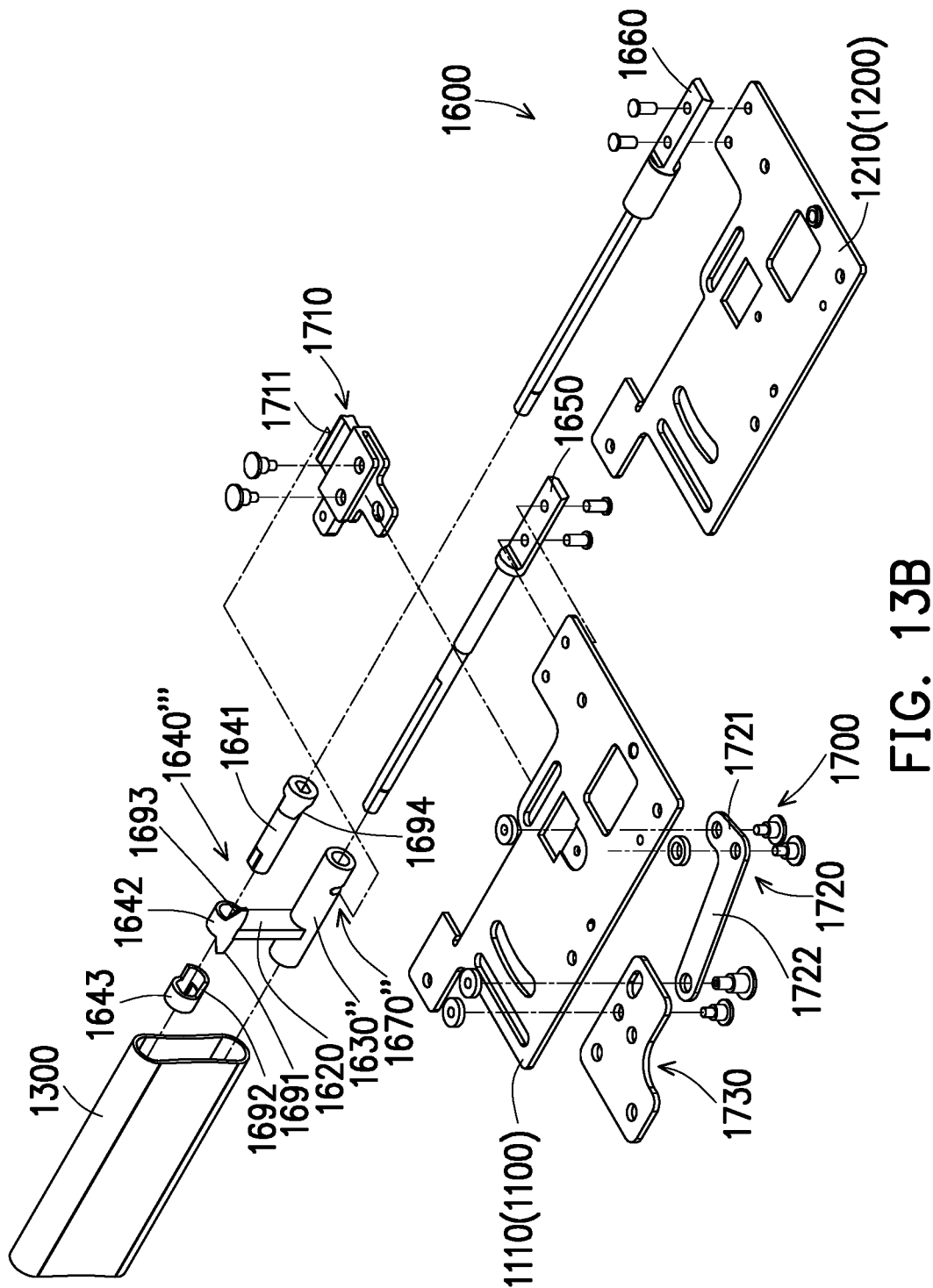
FIG. 13B is an exploded view of the components in FIG. 13A.
Figure 13C:
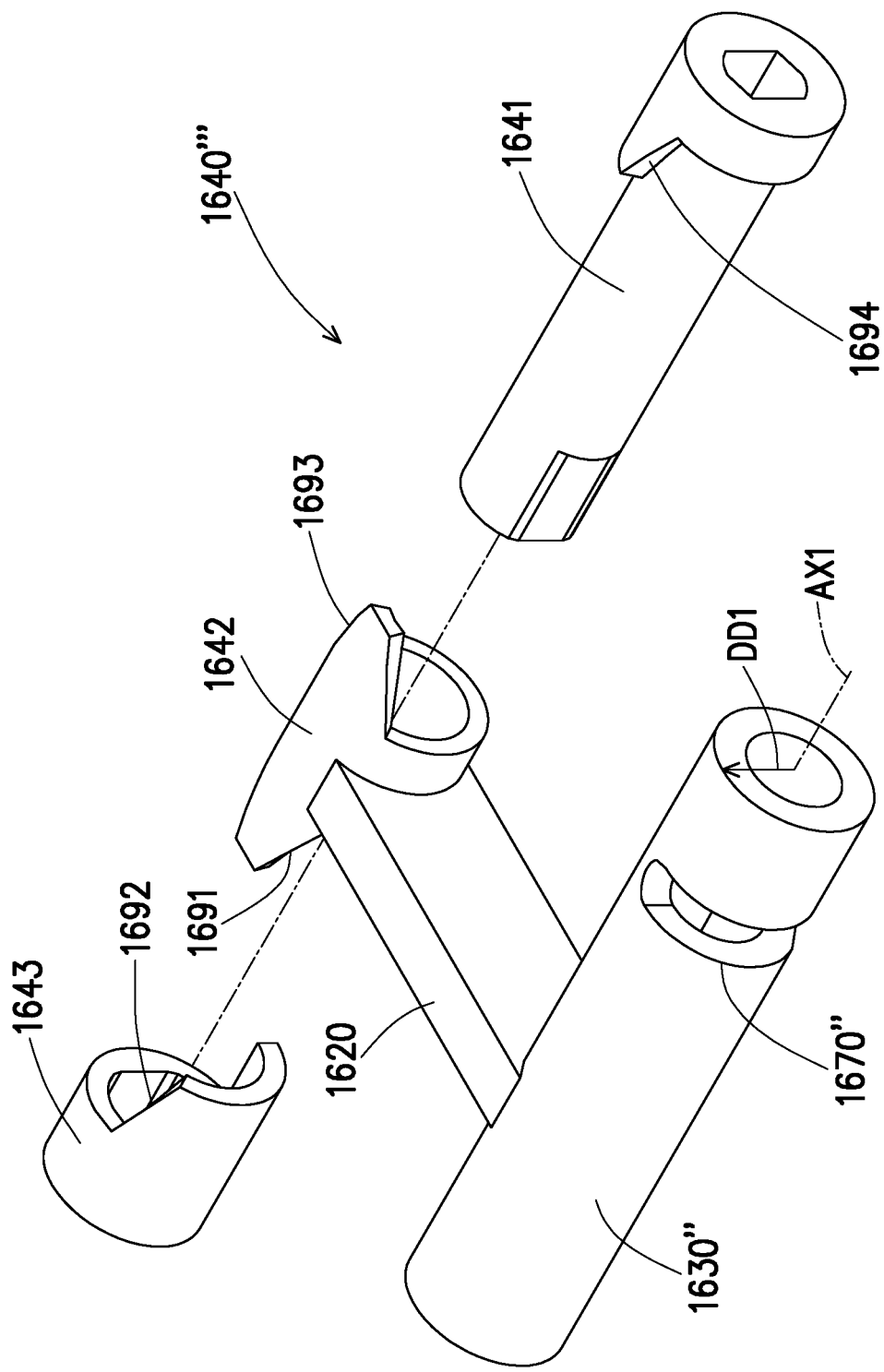
FIG. 13C illustrates a partial enlarged schematic view of the connecting portion, the first bushing and the second bushing in FIG. 13B from a different perspective.
Figure 13D:
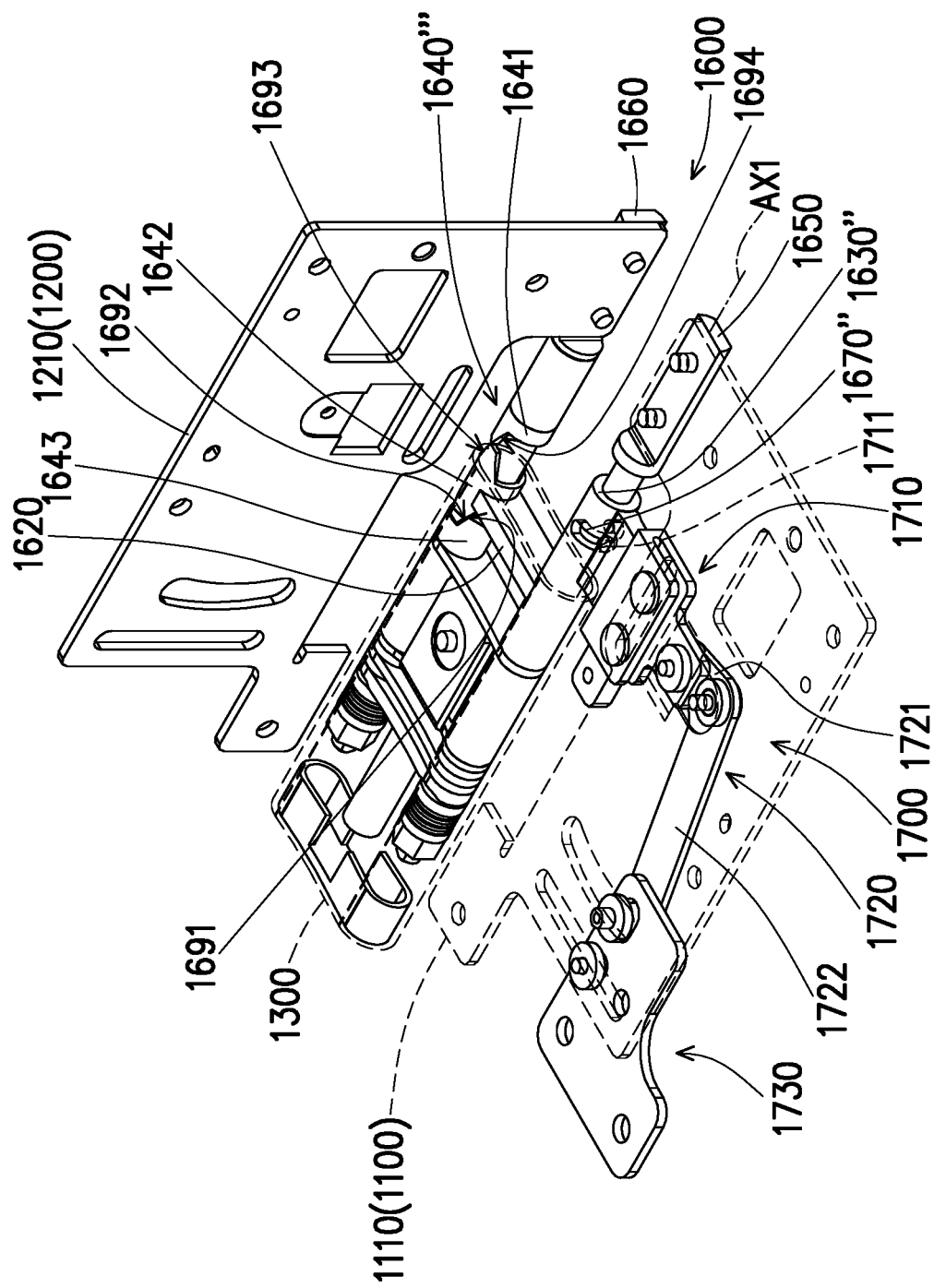
FIG. 13D to FIG. 13G are schematic views of different states of the components in FIG. 13A.
Figure 13E:
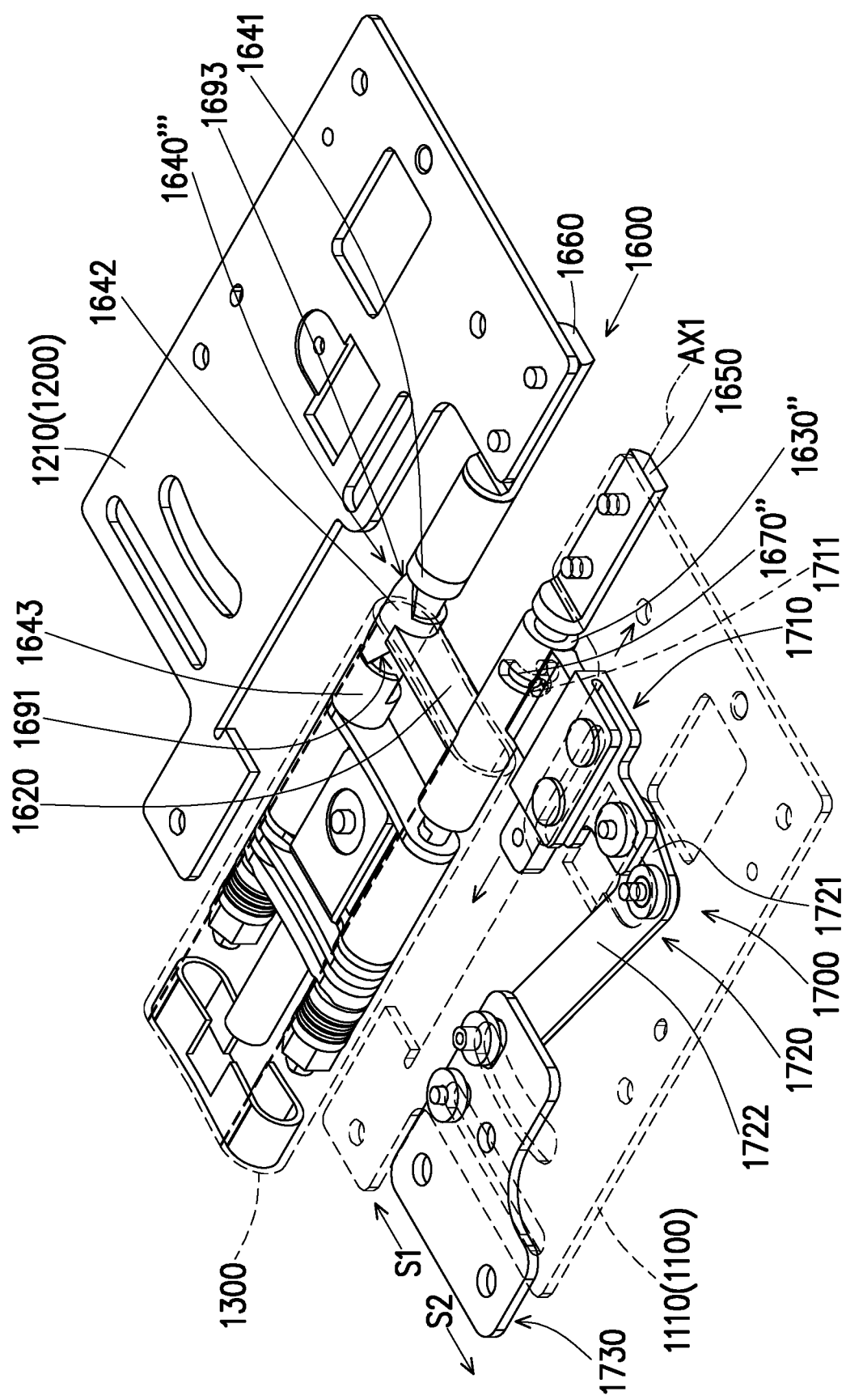
Figure 13F:
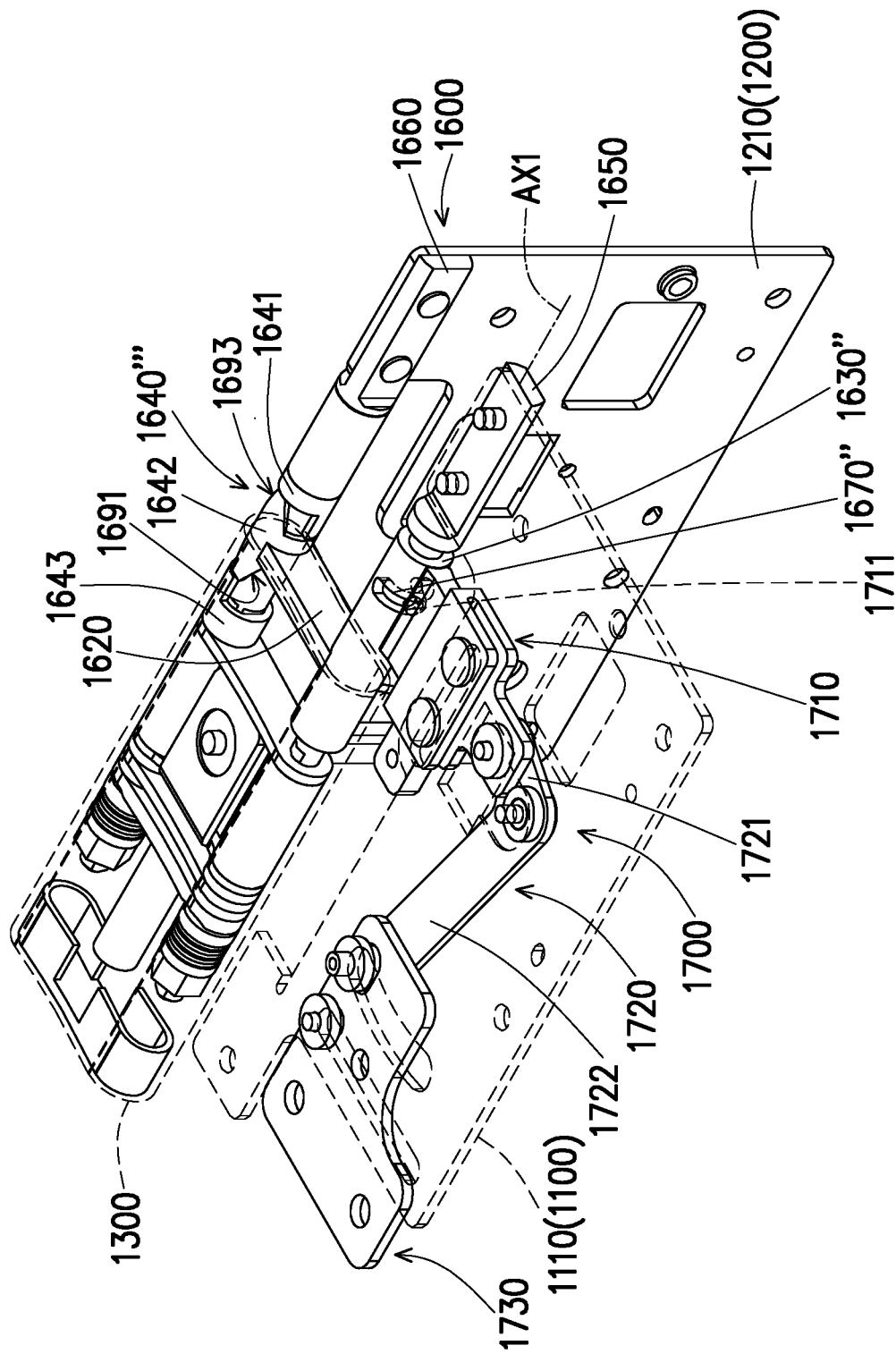
Figure 13G:
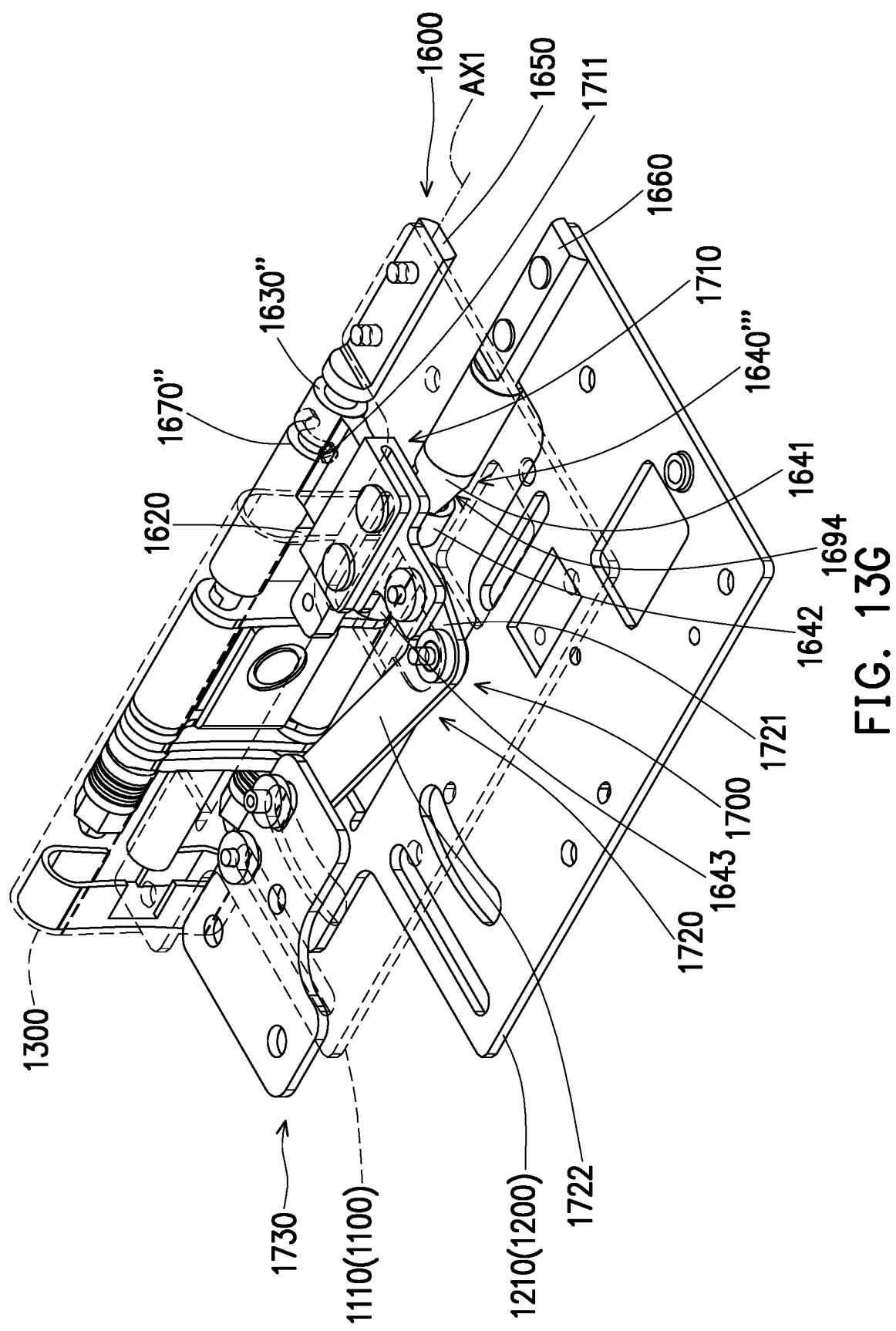

FIG. 13A is a perspective schematic view of the internal components of the foldable electronic device according to an embodiment of the disclosure. FIG. 13B is an exploded view of the components in FIG. 13A. FIG. 13C illustrates a partial enlarged schematic view of the connecting portion, the first bushing and the second bushing in FIG. 13B from a different perspective. FIG. 13D to FIG. 13G are schematic views of different states of the components in FIG. 13A. For clarity and ease of description, a part of the structure is drawn with dashed lines in FIG. 13A, FIG. 13D to FIG. 13G. In an embodiment, by mounting the components in FIG. 13A to the inside of the hinge cover 1300, it is possible to make the foldable electronic device 1000 to achieve the changes shown in FIG. 1, FIG. 10, FIG. 3A, and FIG. 11A to FIG. 5A in sequence. The components shown in FIG. 8A to FIG. 8G and the components shown in the above figures denoted by the same or similar symbols have the same or similar configuration and operation principle, and therefore repetition will not be narrated herein. The difference between the components shown in FIG. 13A to FIG. 13G is that the first bushing 1630" is slidably disposed on the first rotating shaft 1650. The second bushing 1640''' includes a first sleeve 1641, a second sleeve 1642, and a third sleeve 1643 arranged in sequence. The first sleeve 1641 is sleeved on the second rotating shaft 1660 and engaged with the second rotating shaft 1660, so that the first sleeve 1641 can pivot in synchronization with the second rotating shaft 1660. The second sleeve 1642 is slidably and rotatably sleeved on the first sleeve 1641, and the second sleeve 1642 is connected to the connecting portion 1620, and the connecting portion 1620 is connected to the first bushing 1630". In other words, the second sleeve 1642 is connected to the first bushing 1630" through the connecting portion 1620, so the second sleeve 1642 can slide in synchronization with the first bushing 1630". The third sleeve 1643 is sleeved on the first sleeve 1641 and is engaged with the first sleeve 1641, so the third sleeve 1643 can pivot in synchronization with as the first sleeve 1641.

The dual-axis hinge module 1600 further includes a first guiding portion 1670", a first pushing portion 1691, a second pushing portion 1692, a third pushing portion 1693, and a fourth pushing portion 1694. The first guiding portion 1670" is circumferentially arranged outside the first bushing 1630" in the first diameter direction DD1 of the first bushing 1630". The first linkage portion 1711 is coupled to the first guiding portion 1670", so the first linkage portion 1711 can be driven by the first guiding portion 1670". The first pushing portion 1691 and the third pushing portion 1693 are disposed on the second sleeve 1642. The second pushing portion 1692 is disposed on the third sleeve 1643. The third pushing portion 1693 is disposed on the first sleeve 1641. The first pushing portion 1691 can cooperate with the second pushing portion 1692, and the third pushing portion 1693 can cooperate with the fourth pushing portion 1694, so that the second sleeve 1642 can slide. The first pushing portion 1691, the second pushing portion 1692, the third pushing portion 1693, and the fourth pushing portion 1694 are, for example but not limited to slopes.

When the foldable electronic device 1000 is in the state shown in FIG. 1, the foldable electronic device 1000 under the condition corresponds to the state of the components of FIG. 13A. The first pushing portion 1691 and the second pushing portion 1692 abut against each other. The third pushing portion 1693 and the fourth pushing portion 1694 are separated from each other.

When the second body 1200 is unfolded relative to the first body 1100 from the state shown in FIG. 1 to the state shown in FIG. 10, the second body 1200 is, for example but not limited to, unfolded relative to the first body 1100 by 90 degrees from the state shown in FIG. 1. The foldable electronic device 1000 under the condition corresponds to the state of the components shown in FIG. 13D. During this process, only the first bushing 1630" is rotated relative to the first rotating shaft 1650, and the first bushing 1630" does not slide at all. The first linkage portion 1711 is only changed in its position in the first guiding portion 1670", and therefore the first sliding block 1710 does not slide at all, and the first linkage mechanism 1700 does not drive the first object 1400.

When the second body 1200 is unfolded relative to the first body 1100 from the state shown in FIG. 10 to the state shown in FIG. 3A, the second body 1200 is, for example but not limited to, further unfolded by 90 degrees relative to the first body 1100 from the state shown in FIG. 3A. The state of the foldable electronic device 1000 under the condition corresponds to the state of the components shown in FIG. 13E. During this process, the second rotating shaft 1660 is rotated relative to the second sleeve 1642, and the third sleeve 1643 is rotated along with the second rotating shaft 1660. As a result, during the rotation of the third sleeve 1643, the second pushing portion 1692 and the first pushing portion 1691 cooperate with each other, so that the second sleeve 1642 slides toward the first sleeve 1641 and the fourth pushing portion 1694. Finally, the second pushing portion 1692 and the first pushing portion 1691 separate from each other. Since the second sleeve 1642, the connecting portion 1620 and the first bushing 1630" are an integral component, the second sleeve 1642, the connecting portion 1620 and the first bushing 1630" will slide toward the first sleeve 1641 and the fourth pushing portion 1694, so that the first guiding portion 1670" can drive the first linkage portion 1711 to slide toward the first sleeve 1641 and the fourth pushing portion 1694. That is, the first linkage mechanism 1700 drives the first object 1400 to slide toward the dual-axis hinge module 1600 and move away from the first initial position. Moreover, among the components in the state shown in FIG. 11A, the operation of the first linkage mechanism 1700 is driven by the second rotating shaft 1660 instead. On the contrary, by operating the second rotating shaft 1660 to rotate in the reverse direction, the third pushing portion 1693 can be pushed by the fourth pushing portion 1694, so that the second sleeve 1642 slides toward the third sleeve 1643, and finally the third pushing portion 1693 and the fourth pushing portion 1694 are separated from each other.

When the second body 1200 is unfolded relative to the first body 1100 from the state shown in FIG. 3A to the state shown in FIG. 11A, the second body 1200 is, for example but not limited to, further unfolded by 90 degrees relative to the first body 1100 from the state shown in FIG. 3A. The state of the foldable electronic device 1000 under the condition corresponds to the state of the components shown in FIG. 13F. During this process, the second rotating shaft 1660 is rotated relative to the second sleeve 1642. Since the first pushing portion 1691 and the second pushing portion 1692 have been separated from each other, the third sleeve 1643 cannot drive the second sleeve 1642, and the second sleeve 1642 does not slide at all.

When the second body 1200 is unfolded relative to the first body 1100 from the state shown in FIG. 11A to the state shown in FIG. 5A, the second body 1200 is, for example but not limited to, further unfolded by 90 degrees relative to the first body 1100 from the state shown in FIG. 11A. The state of the foldable electronic device 1000 under the condition corresponds to the state of the components shown in FIG. 13G. During this process, only the first bushing 1630" is rotated relative to the first rotating shaft 1650, and the first bushing 1630" does not slide at all. The first linkage portion 1711 is only changed in its position in the first guiding portion 1670", and therefore the first sliding block 1710 does not slide at all, and the first linkage mechanism 1700 does not drive the first object 1400.

Figure 14A:
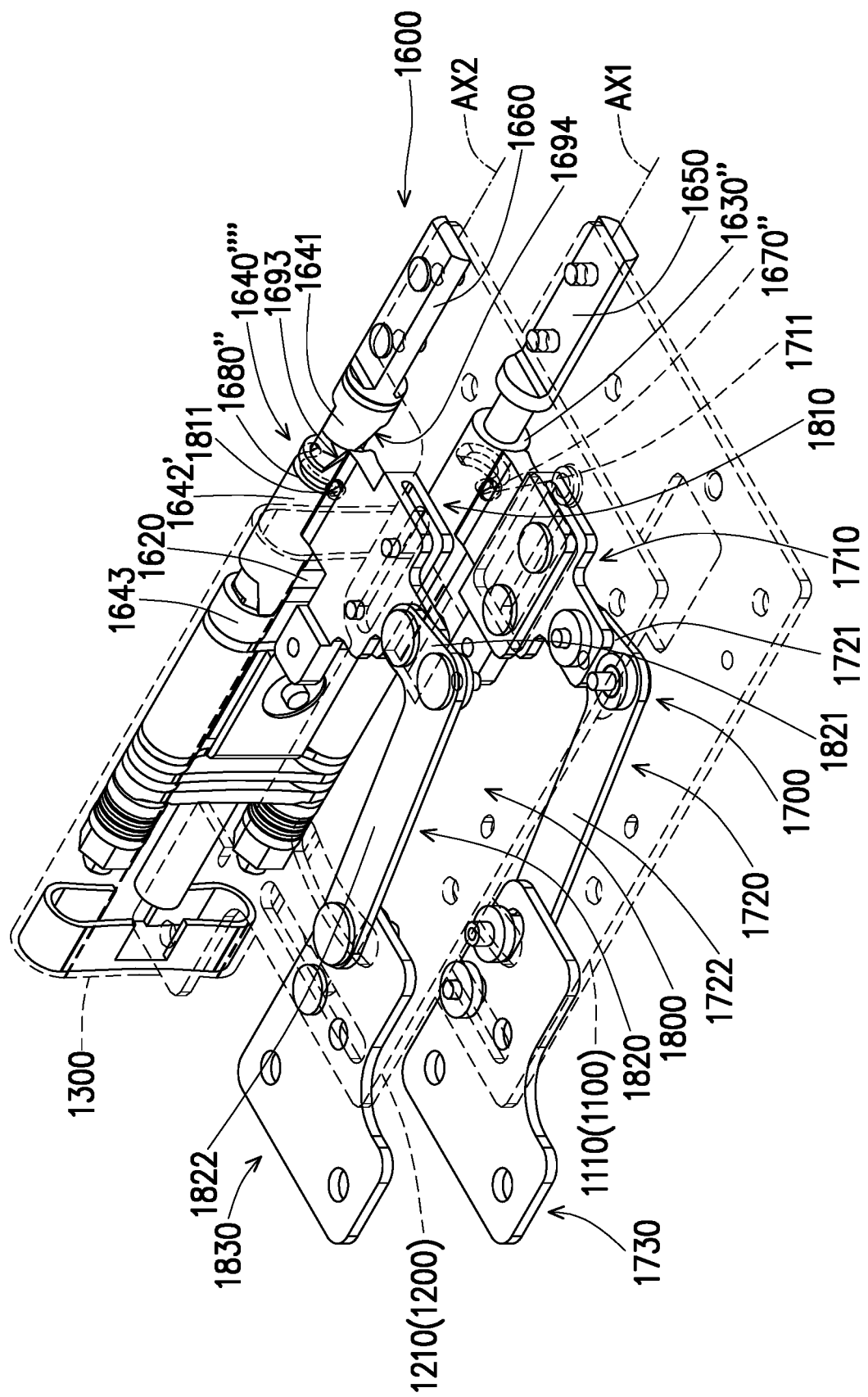
FIG. 14A is a perspective schematic view of the internal components of the foldable electronic device according to an embodiment of the disclosure.
Figure 14B:
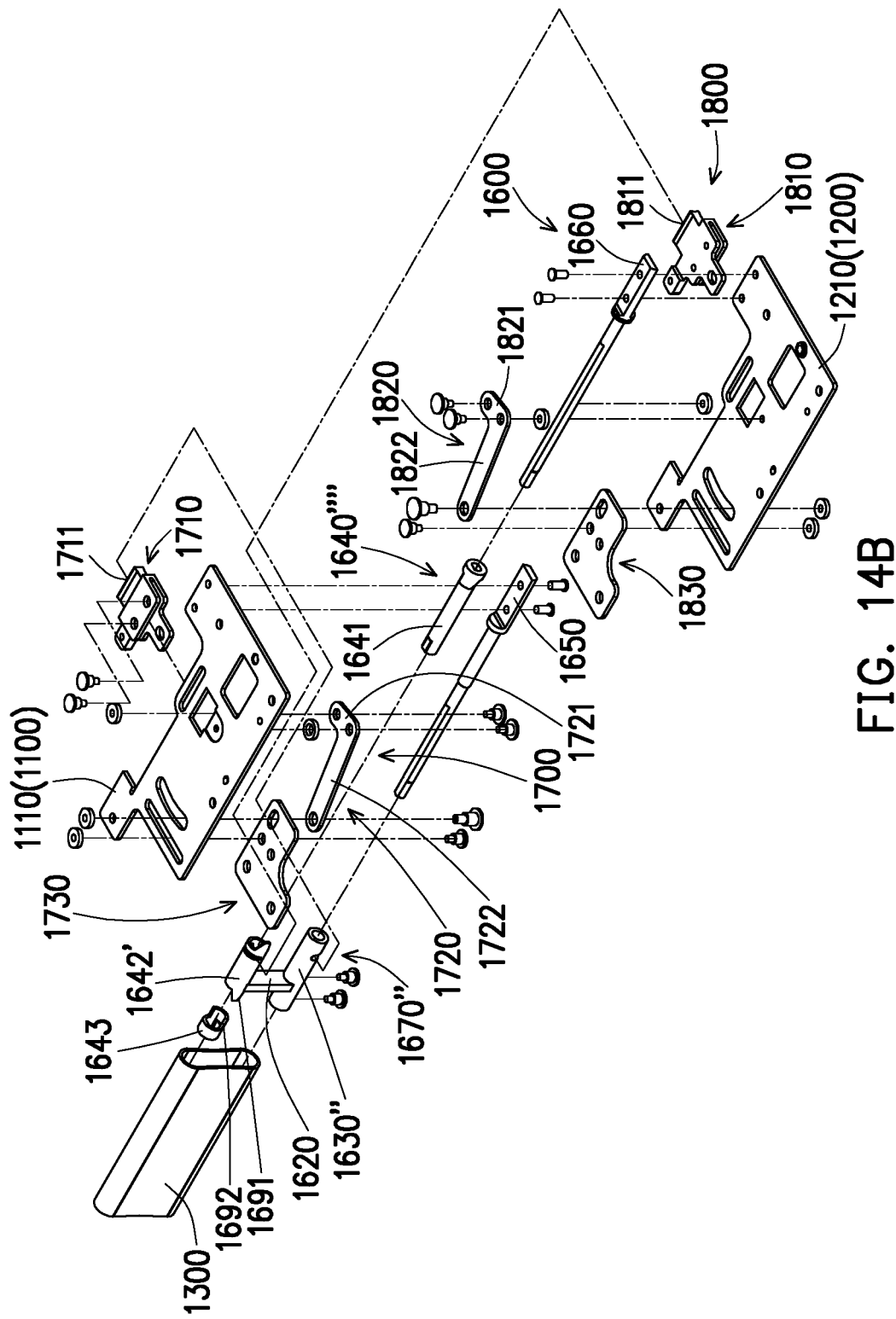
FIG. 14B is an exploded view of the components in FIG. 14A.
Figure 14C:
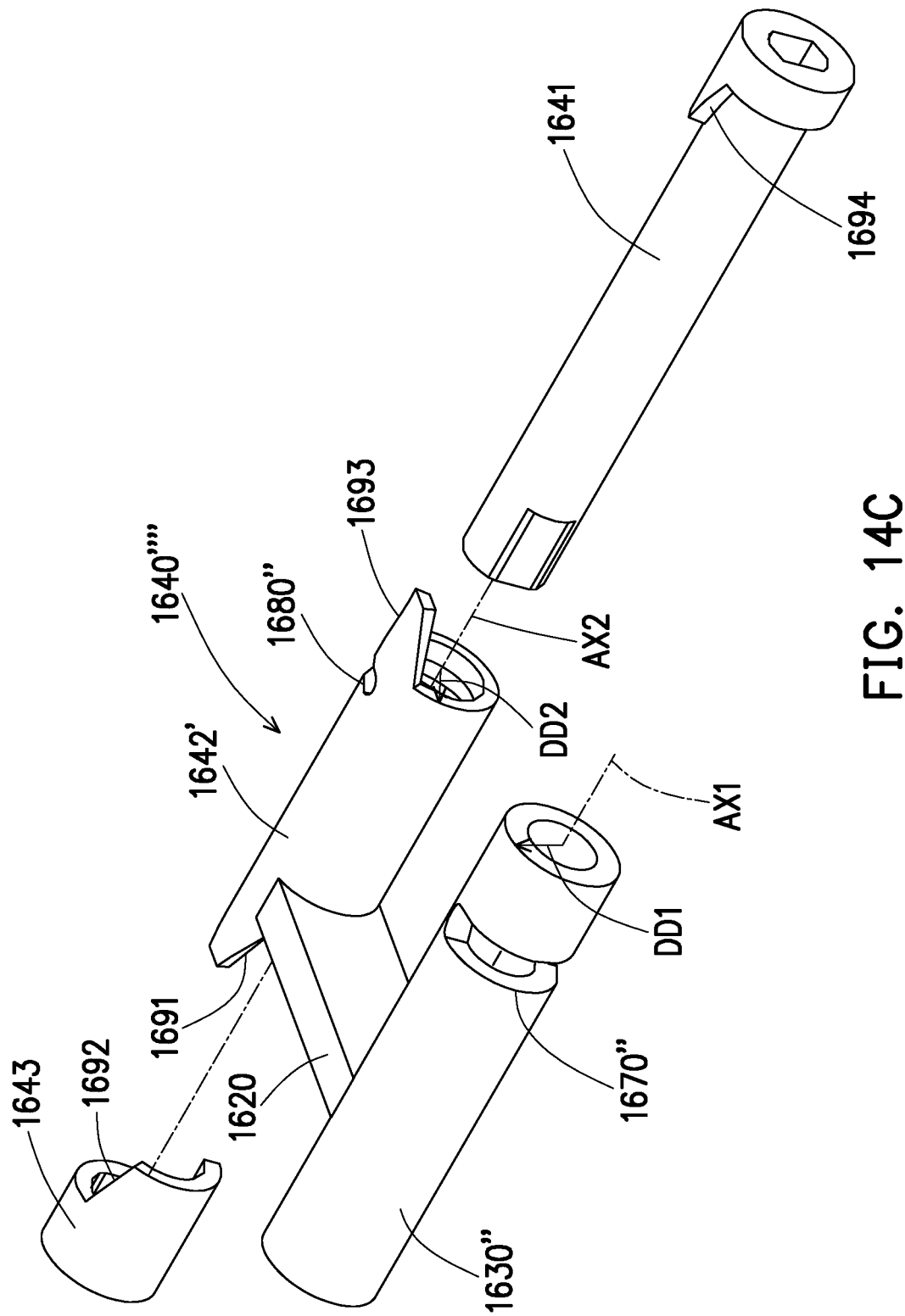
FIG. 14C illustrates a partial enlarged schematic view of the connecting portion, the first bushing and the second bushing in FIG. 14B from a different perspective.
Figure 14D:
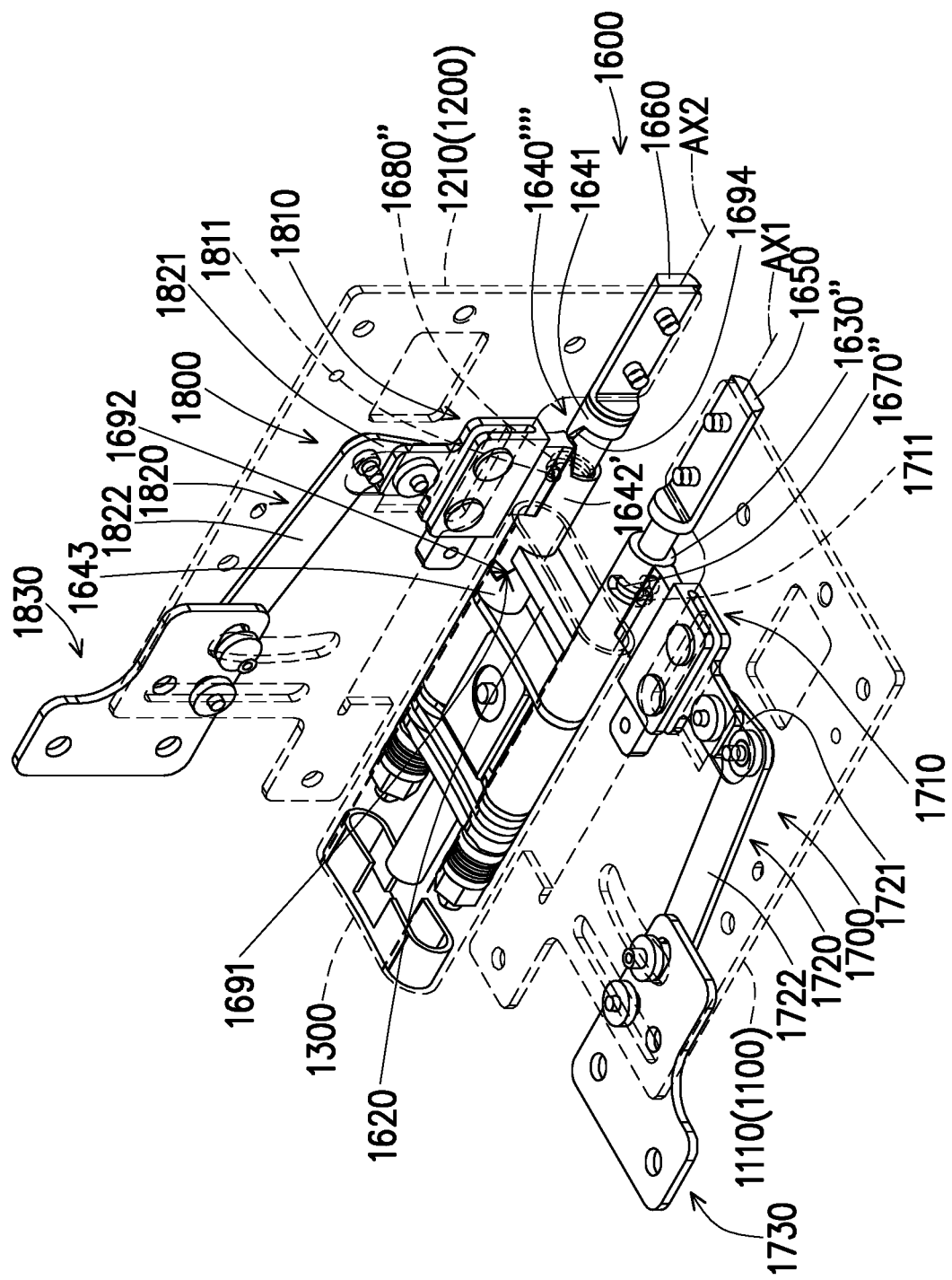
FIG. 14D to FIG. 14G are schematic views of different states of the components in FIG. 14A.
Figure 14E:
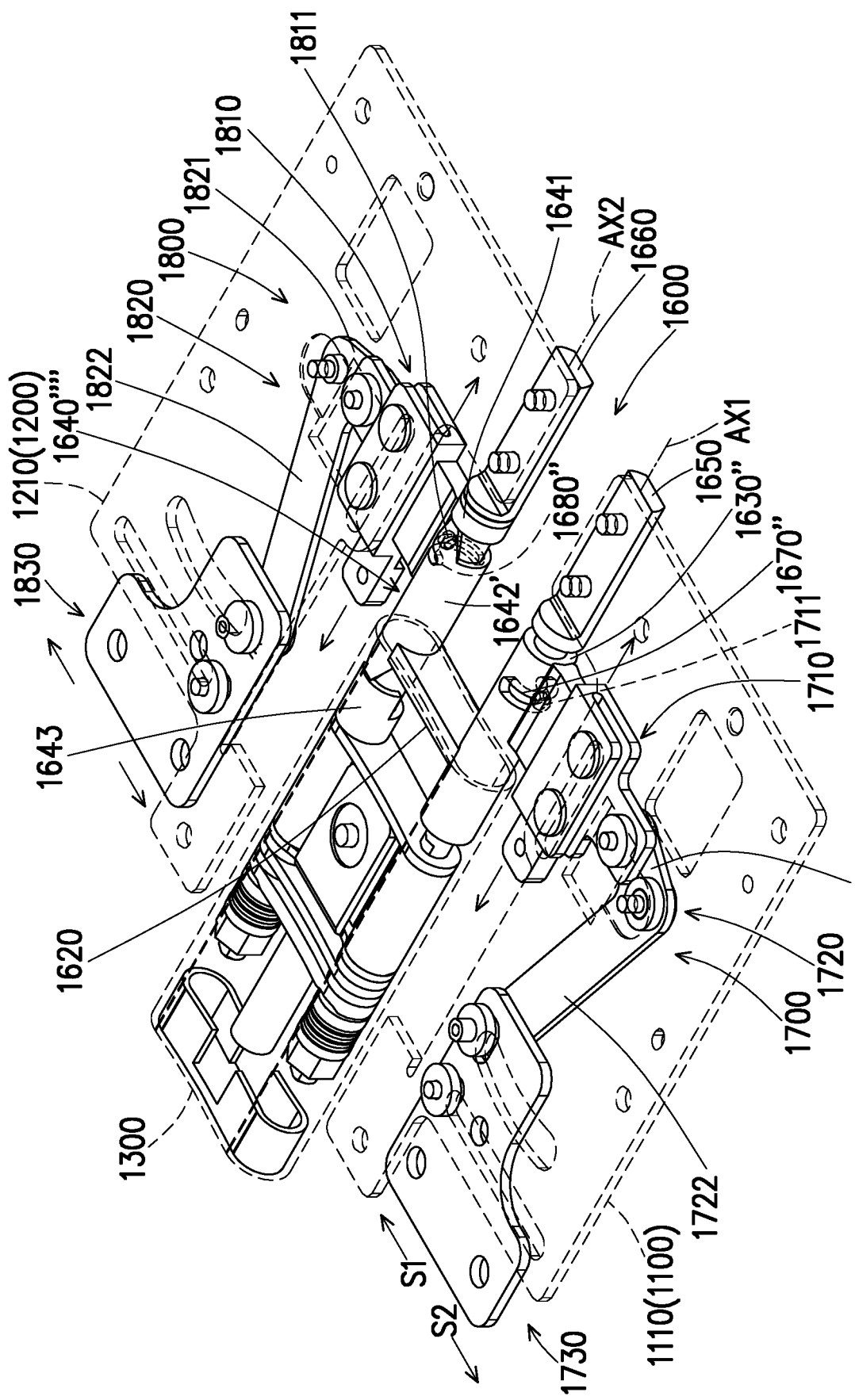
Figure 14F:
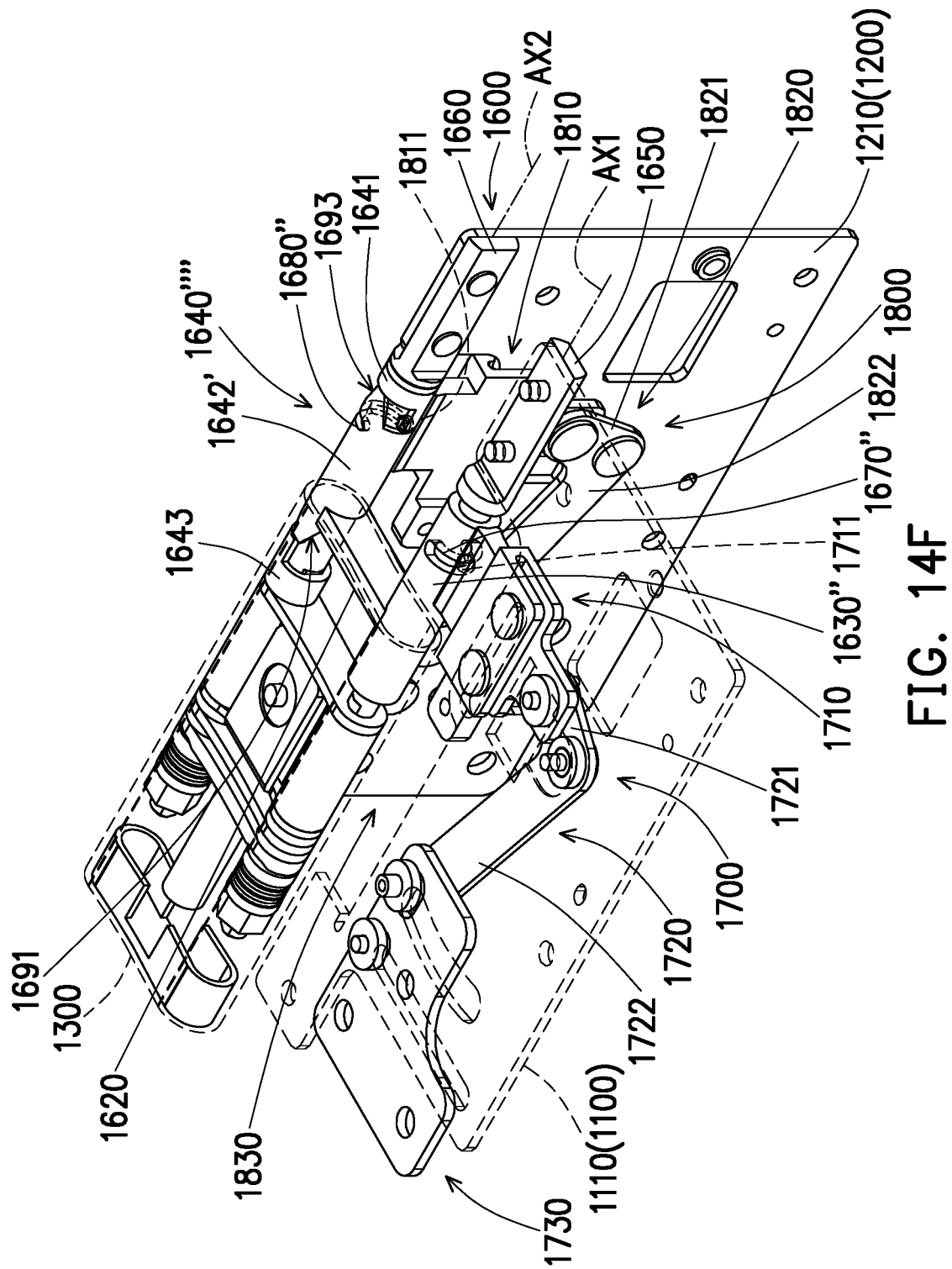
Figure 14G:
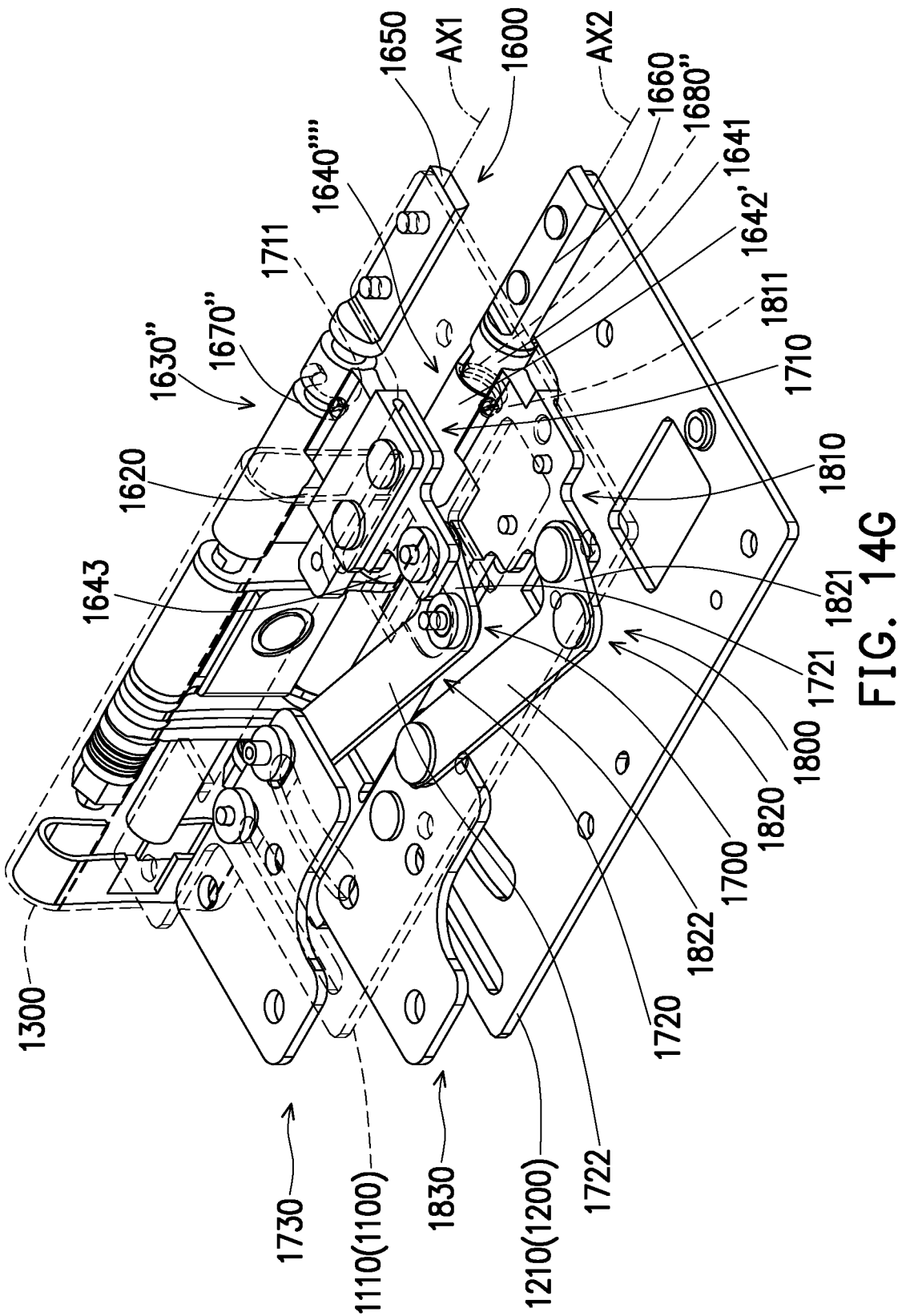

FIG. 14A is a perspective schematic view of the internal components of the foldable electronic device according to an embodiment of the disclosure. FIG. 14B is an exploded view of the components in FIG. 14A. FIG. 14C illustrates a partial enlarged schematic view of the connecting portion, the first bushing and the second bushing in FIG. 14B from a different perspective. FIG. 14D to FIG. 14G are schematic views of different states of the components in FIG. 14A. For clarity and ease of description, a part of the structure is drawn in dashed lines in FIG. 14A, FIG. 14D to FIG. 14G. The components shown in FIG. 14A to FIG. 14G and the components shown in the above figures denoted by the same or similar symbols have the same or similar configuration and operation principle, and therefore repetition will not be narrated herein. In addition, among the components shown in FIG. 14A to FIG. 14G, the configuration and operation principle of the second bushing 1640"", the second sleeve 1642', and the second guiding portion 1680" are the same as or similar to the configuration and operation principle of the first bushing 1630", the second sleeve 1642, and the first guiding portion 1670" shown in FIG. 13A to FIG. 13G, and therefore repetition will not be narrated herein. In an embodiment, by mounting the components in FIG. 14A to the inside of the hinge cover 1300, it is possible to make the foldable electronic device 1000 to achieve the changes shown in FIG. 1, FIG. 10, FIG. 3B, and FIG. 11B to FIG. 5B in sequence.

Figure 15A:
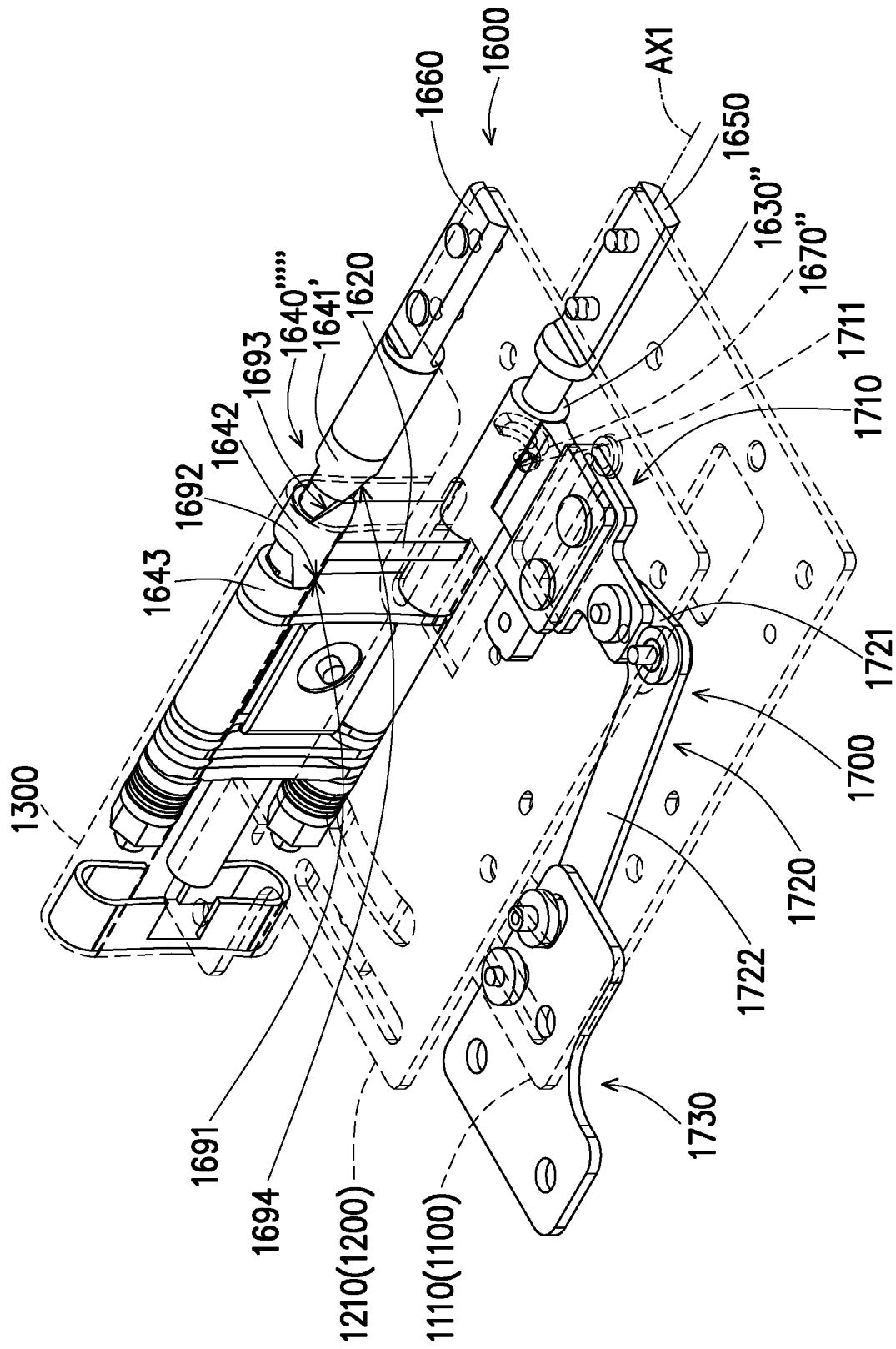
FIG. 15A is a perspective schematic view of the internal components of the foldable electronic device according to an embodiment of the disclosure.
Figure 15B:
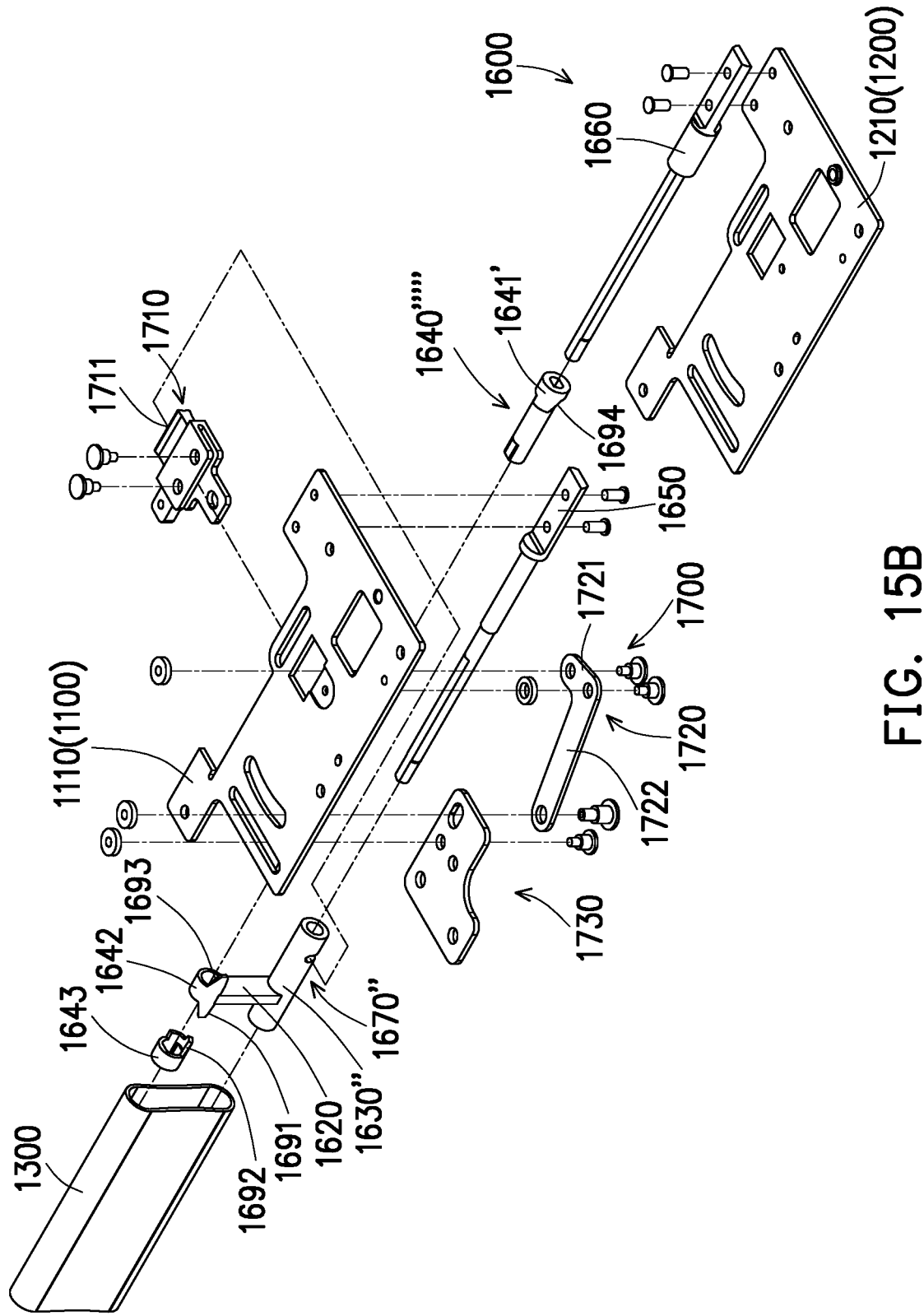
FIG. 15B is an exploded view of the components in FIG. 15A.
Figure 15C:
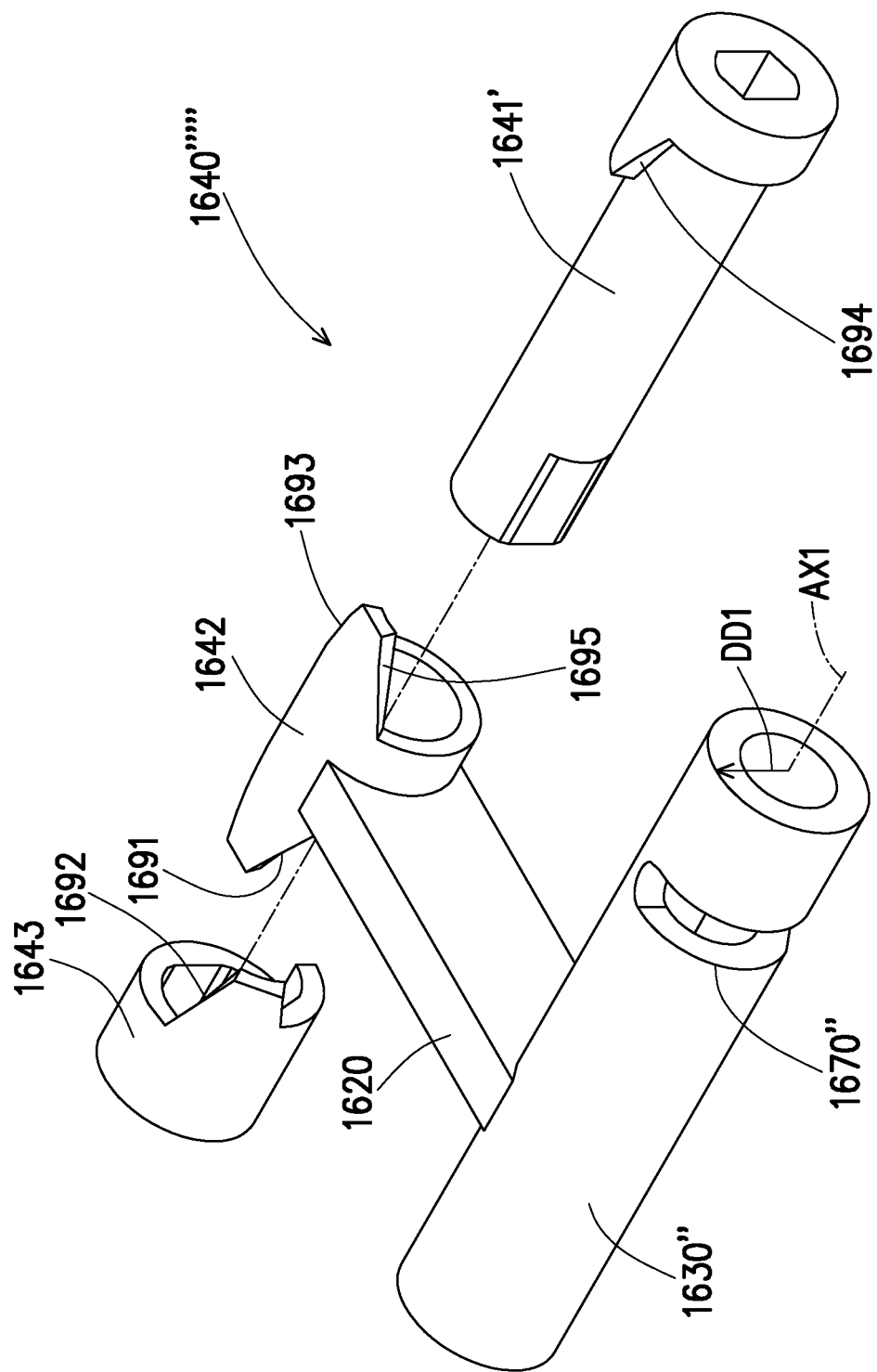
FIG. 15C illustrates a partial enlarged schematic view of the connecting portion, the first bushing and the second bushing in FIG. 15B from a different perspective.
Figure 15D:
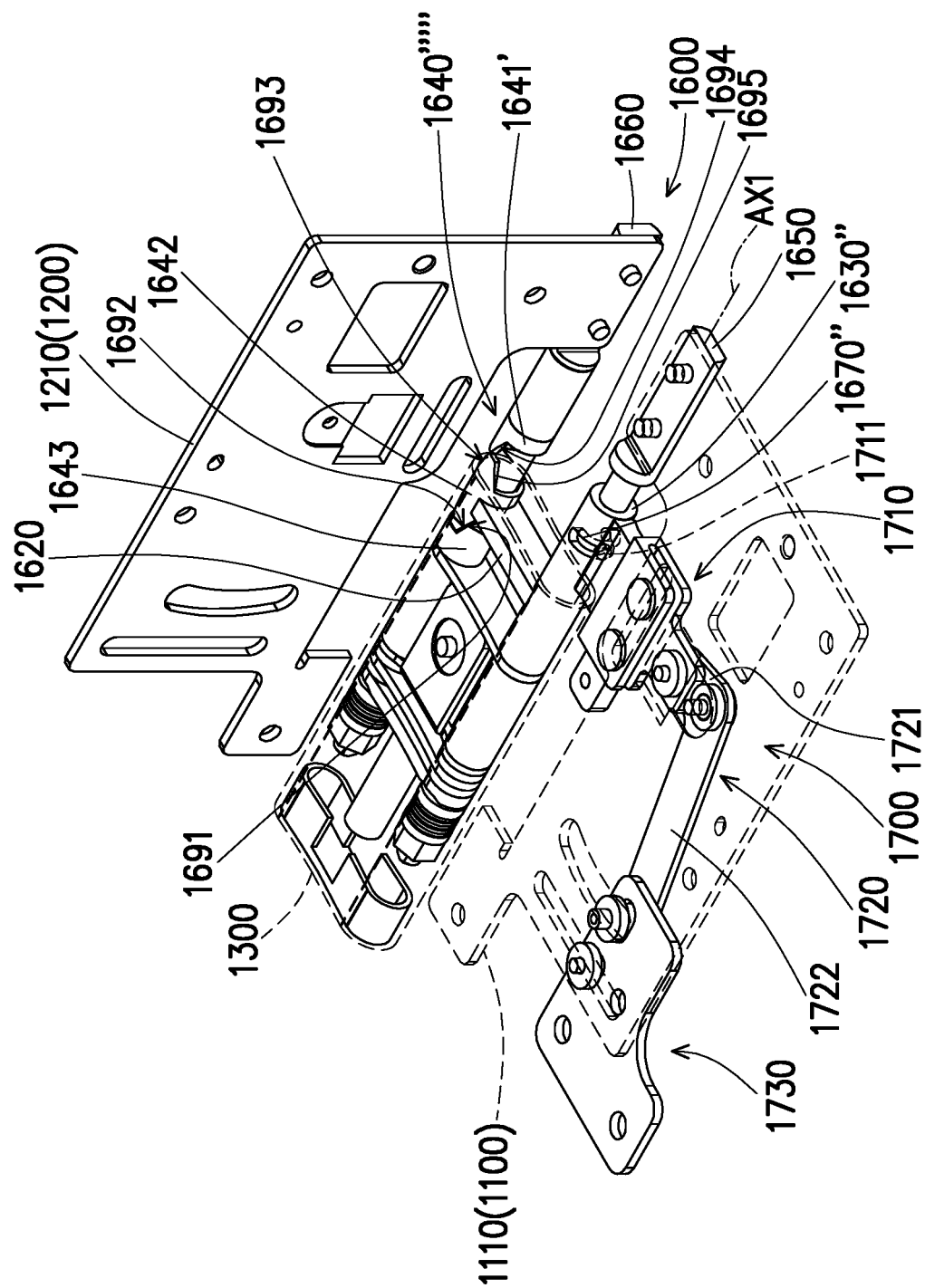
FIG. 15D to FIG. 15G are schematic views of different states of the components in FIG. 15A.
Figure 15E:
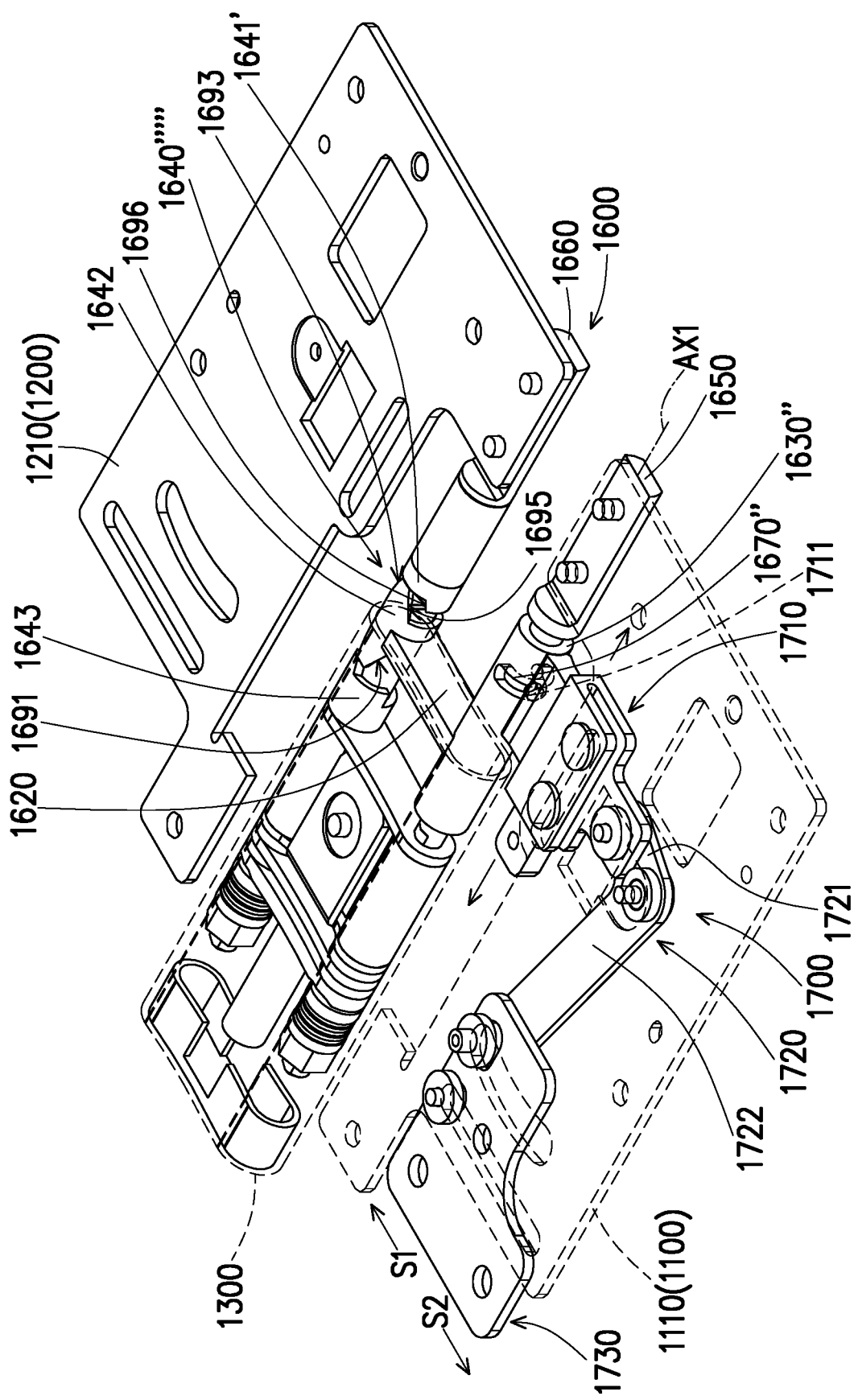
Figure 15F:
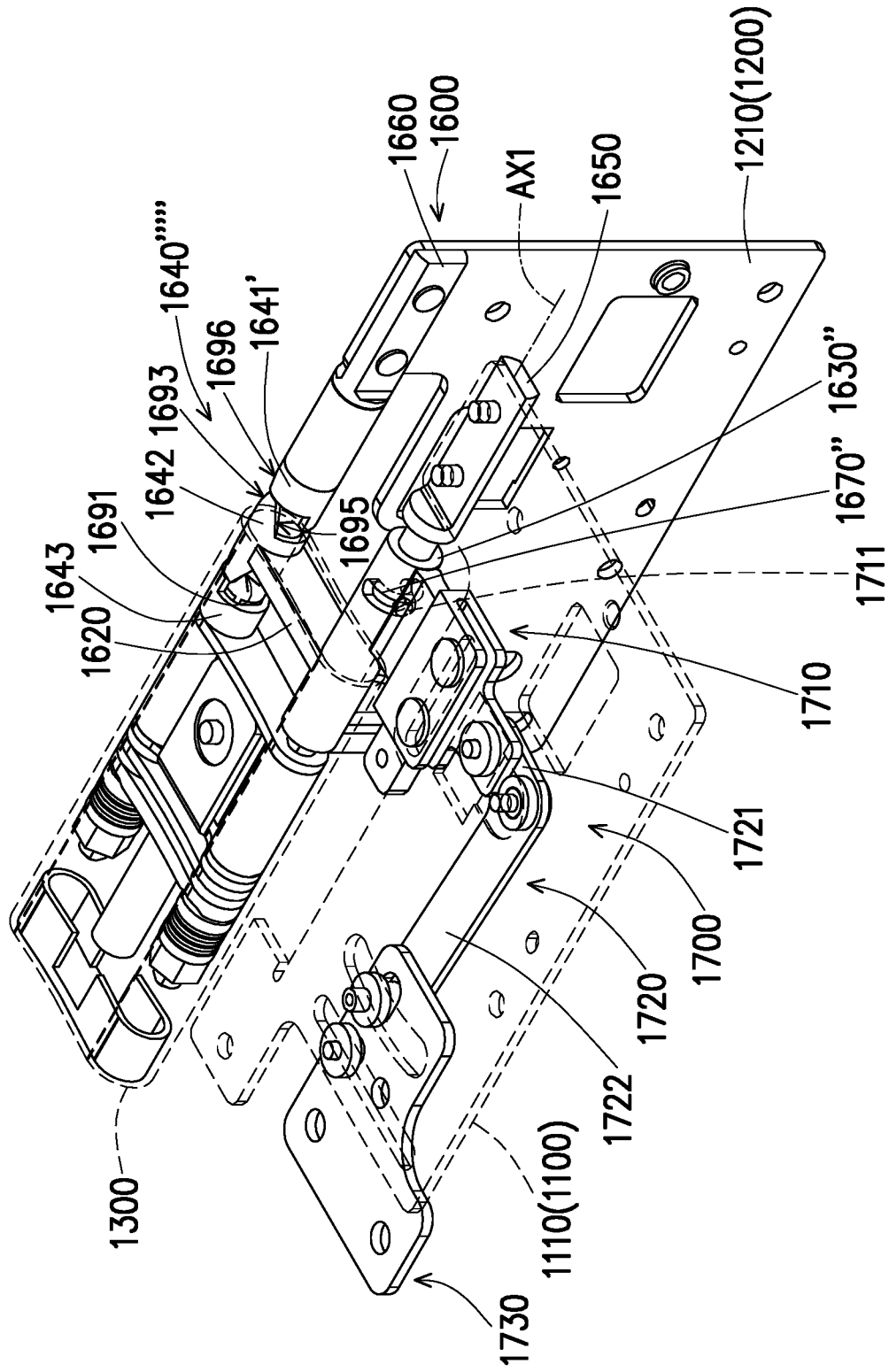
Figure 15G:
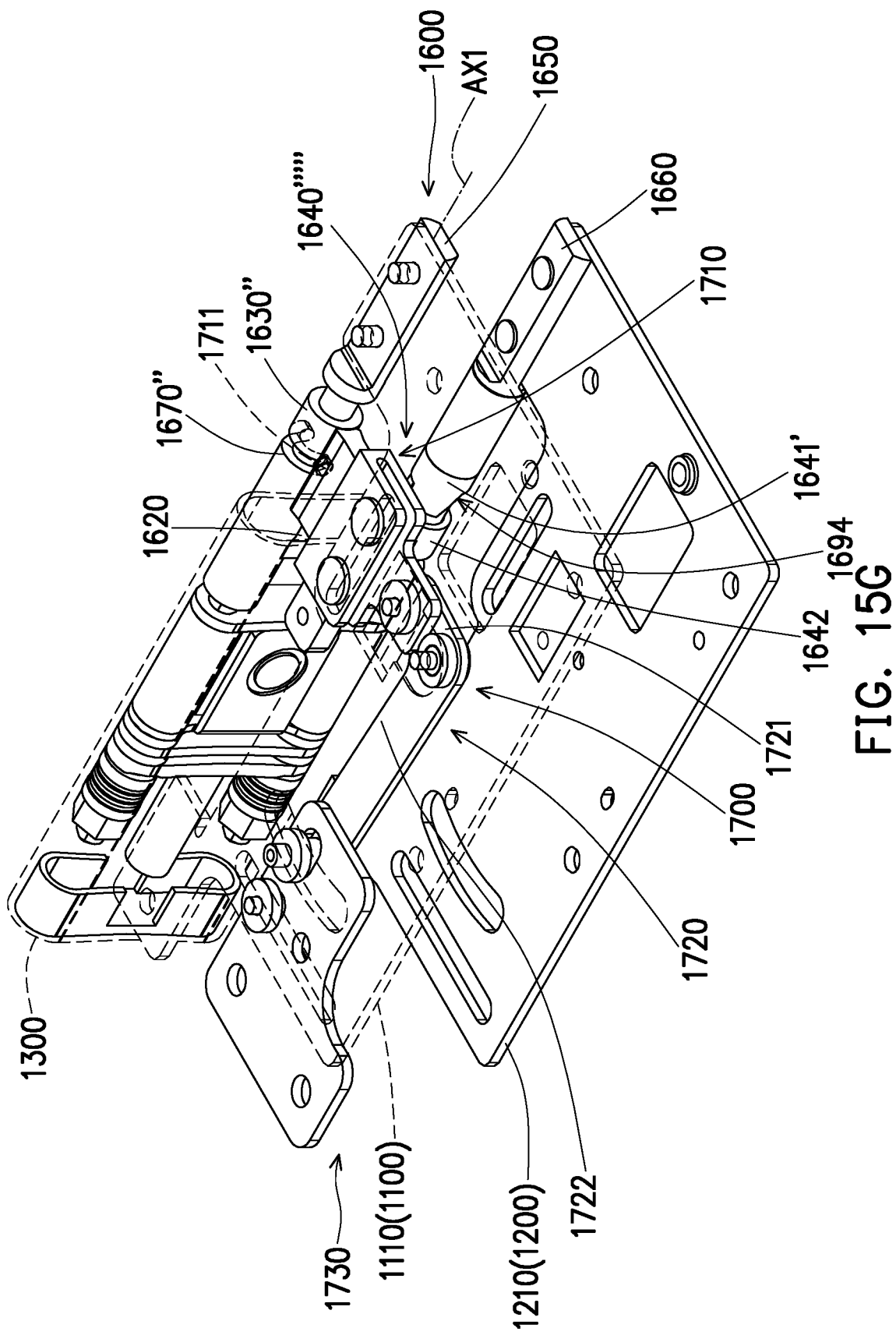

FIG. 15A is a perspective schematic view of the internal components of the foldable electronic device according to an embodiment of the disclosure. FIG. 15B is an exploded view of the components in FIG. 15A. FIG. 15C illustrates a partial enlarged schematic view of the connecting portion, the first bushing and the second bushing in FIG. 15B from a different perspective. FIG. 15D to FIG. 15G are schematic views of different states of the components in FIG. 15A. For clarity and ease of description, a part of the structure is drawn in dashed lines in FIG. 15A, FIG. 15D to FIG. 15G. In an embodiment, by mounting the components in FIG. 15A to the inside of the hinge cover 1300, it is possible to make the foldable electronic device 1000 to achieve the changes shown in FIG. 1, FIG. 10, FIG. 3A, and FIG. 11C to FIG. 12 in sequence. The components shown in FIG. 15A to FIG. 15G and the components shown in the above figures denoted by the same or similar symbols have the same or similar configuration and operation principle, and therefore repetition will not be narrated herein. The difference between the components shown in FIG. 15A to FIG. 15G is that the dual-axis hinge module 1600 further includes a fifth pushing portion 1695 and a sixth pushing portion 1696. The fifth pushing portion 1695 is disposed on the second sleeve 1642. The sixth pushing portion 1696 is disposed on the first sleeve 1641'. The sixth pushing portion 1696 can cooperate with the fifth pushing portion 1695. When the second body 1200 is unfolded relative to the first body 1100 from the state shown in FIG. 3A to the state shown in FIG. 11C, the second body 1200 corresponds to the state shown in FIG. 15E to FIG. 15F. During this process, the second rotating shaft 1660 is rotated relative to the second sleeve 1642, and the sixth pushing portion 1696 abuts against the fifth pushing portion 1695. Through the cooperation of the sixth pushing portion 1696 and the fifth pushing portion 1695, the second sleeve 1642 slides toward the third sleeve 1643. It should be noted that by adjusting the length of the inclined surface of the sixth pushing portion 1696, the sliding distance of the first object 1400 relative to the first body 1100 can finally be adjusted.

Figure 16A:
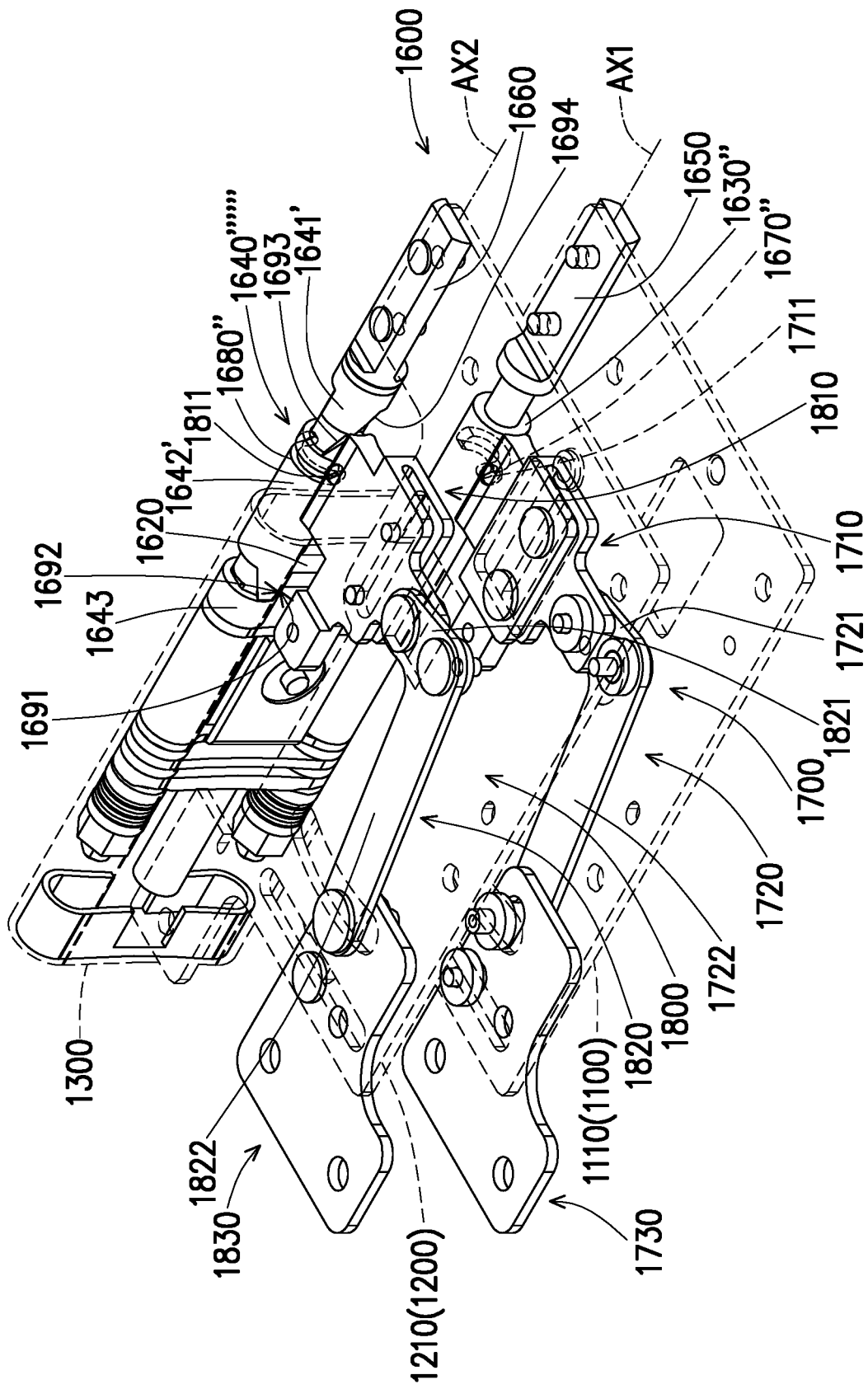
FIG. 16A is a perspective schematic view of the internal components of the foldable electronic device according to an embodiment of the disclosure.
Figure 16B:
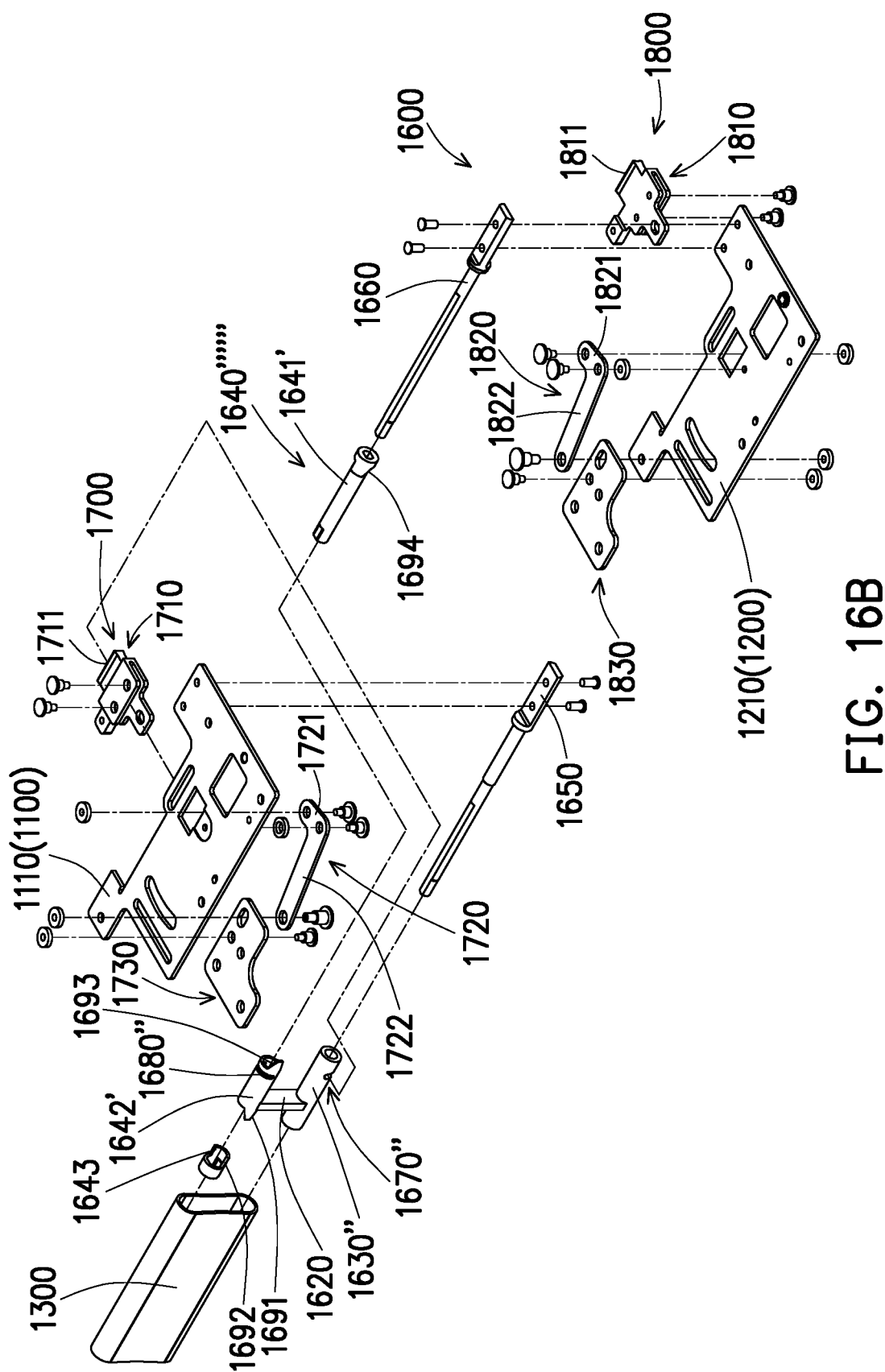
FIG. 16B is an exploded view of the components in FIG. 16A.
Figure 16C:
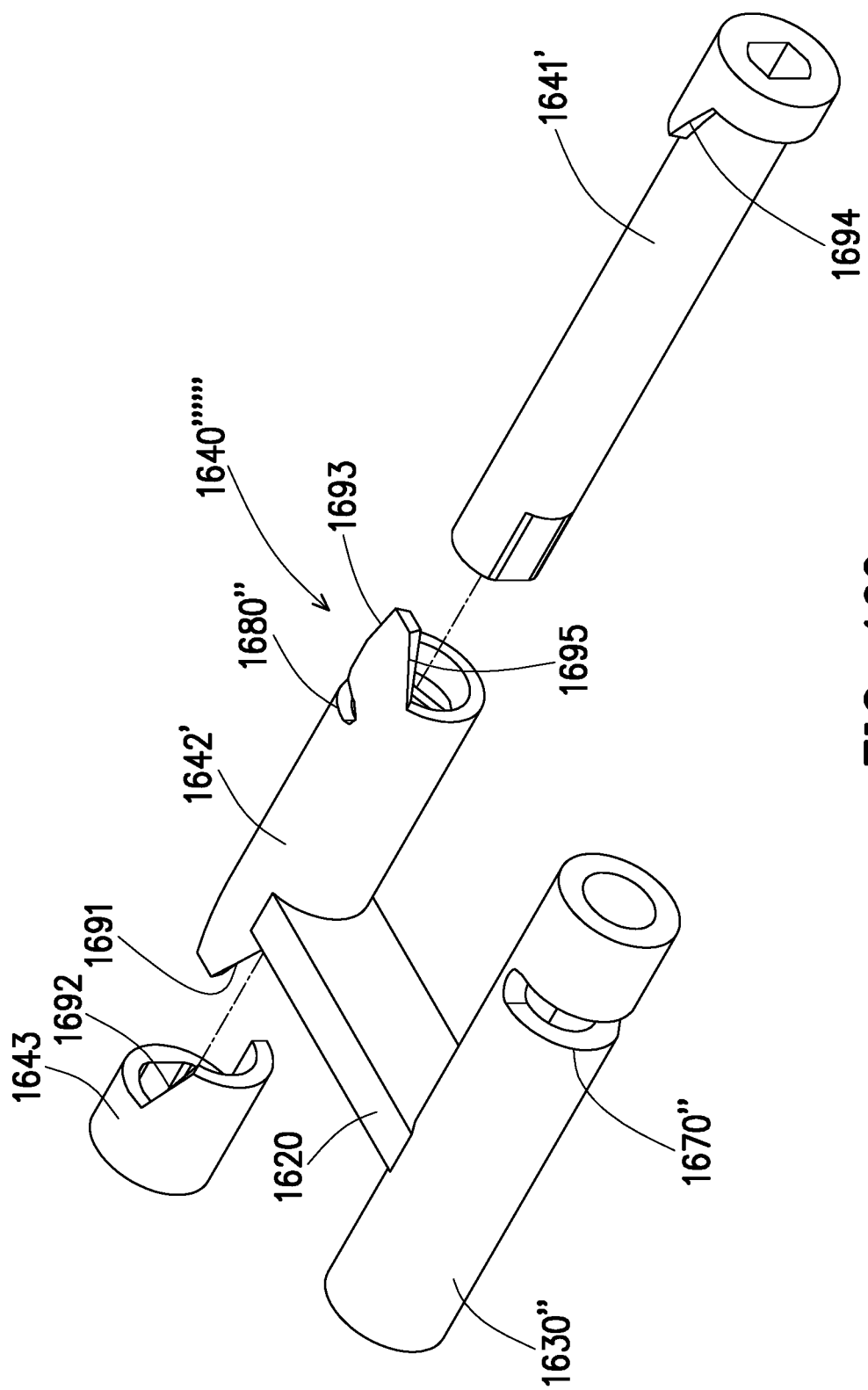
FIG. 16C illustrates a partial enlarged schematic view of the connecting portion, the first bushing and the second bushing in FIG. 16B from a different perspective.
Figure 16D:
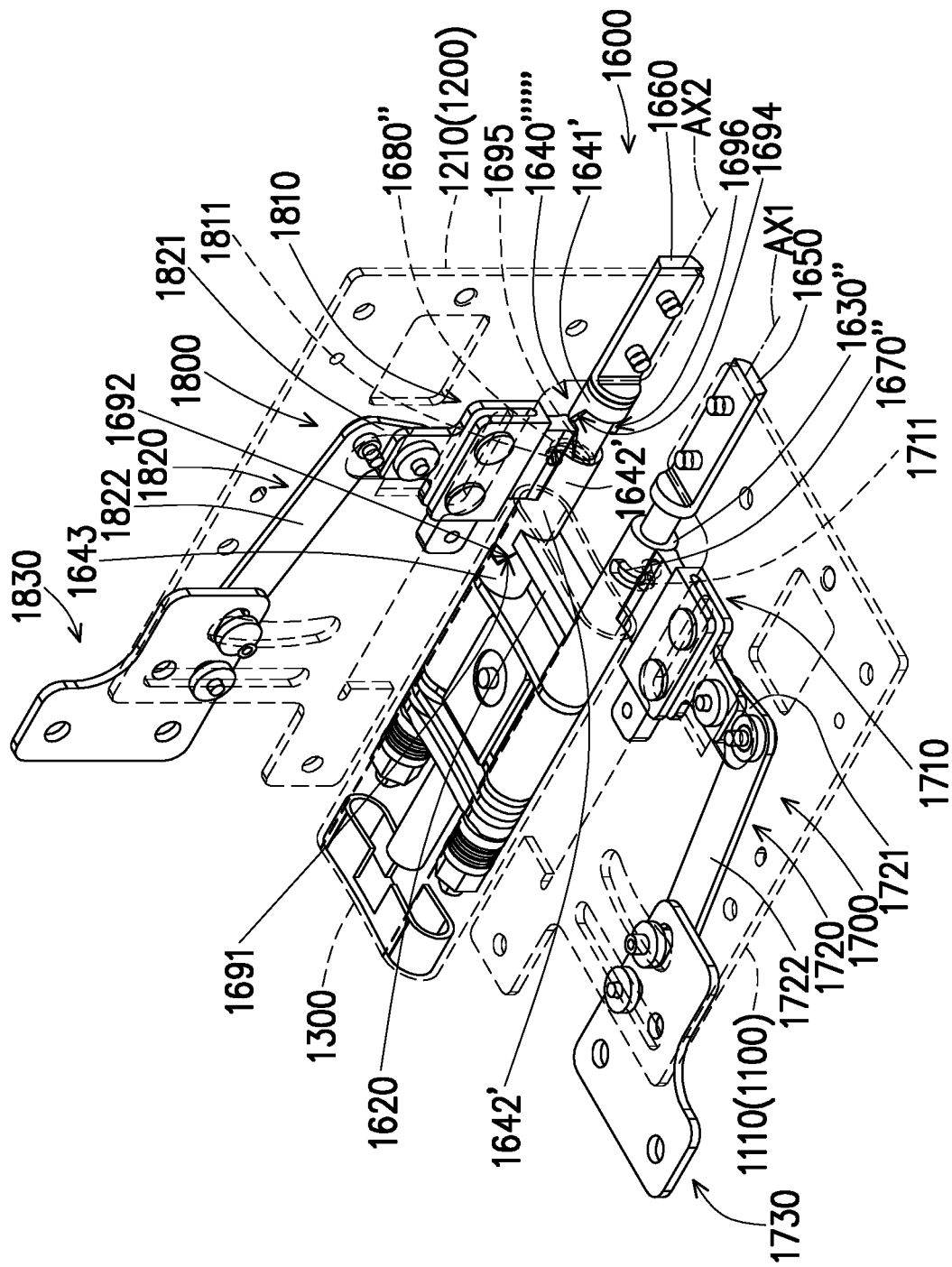
FIG. 16D to FIG. 16G are schematic views of different states of the components in FIG. 16A.
Figure 16E:
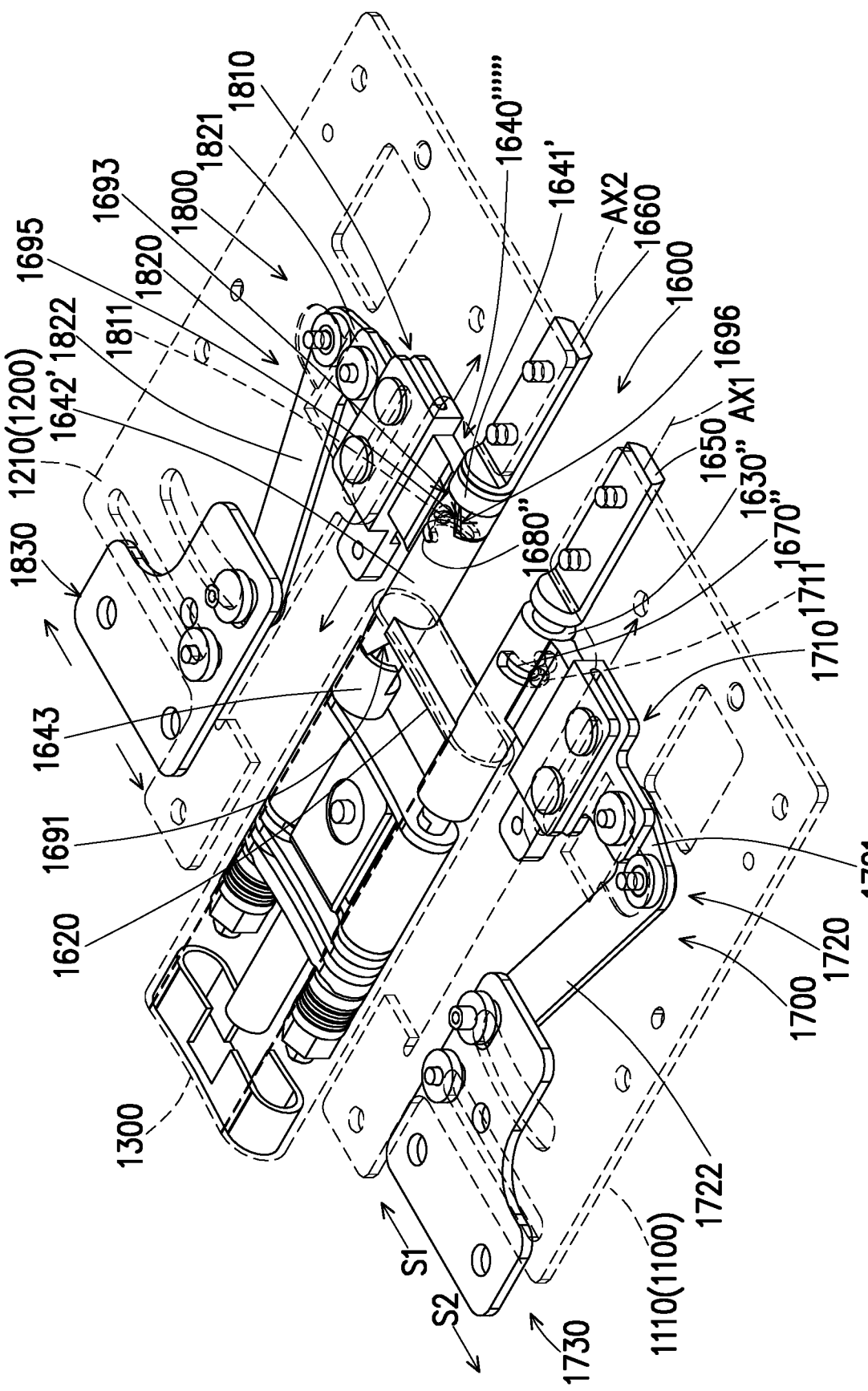
Figure 16F:
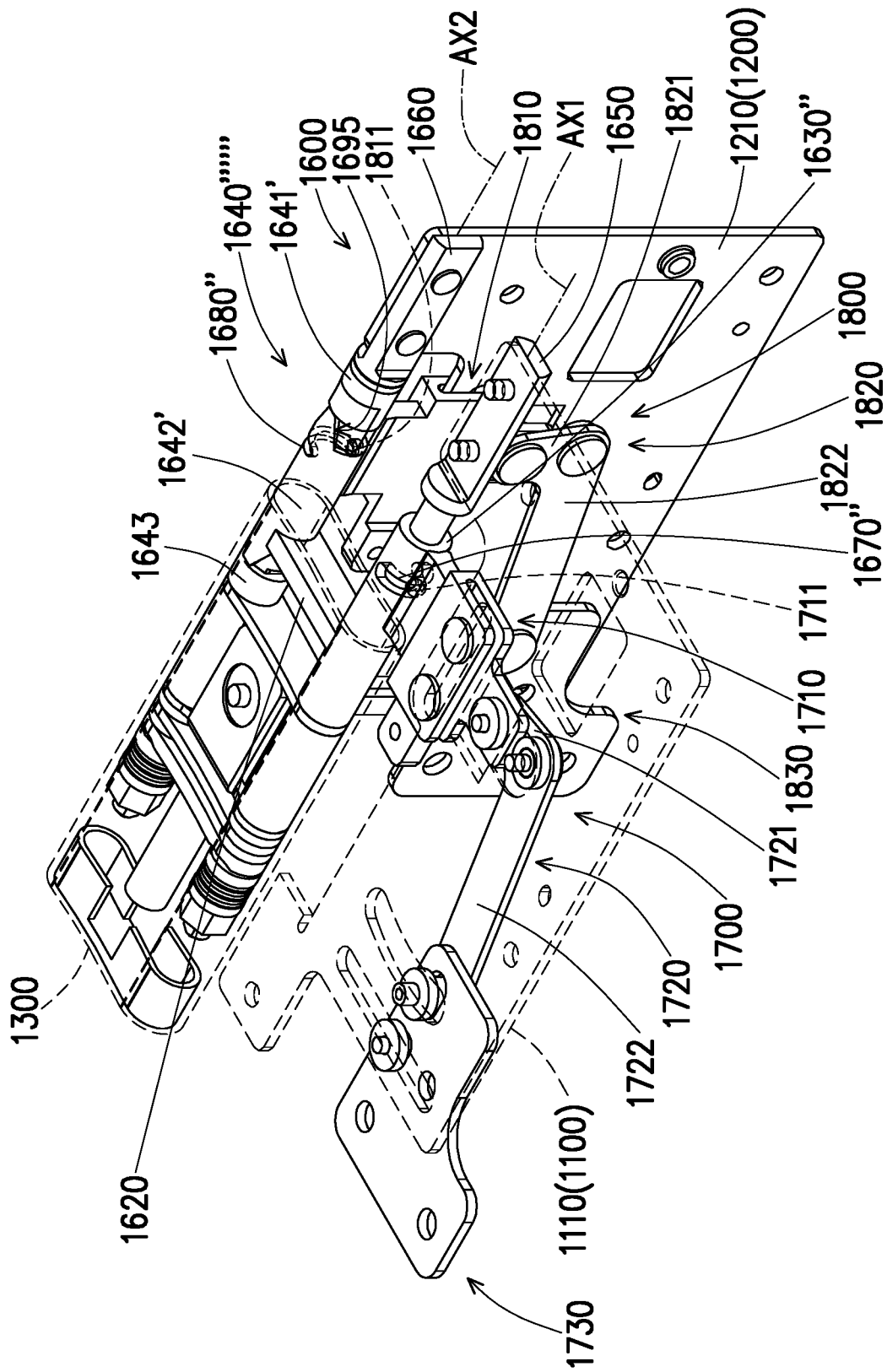
Figure 16G:
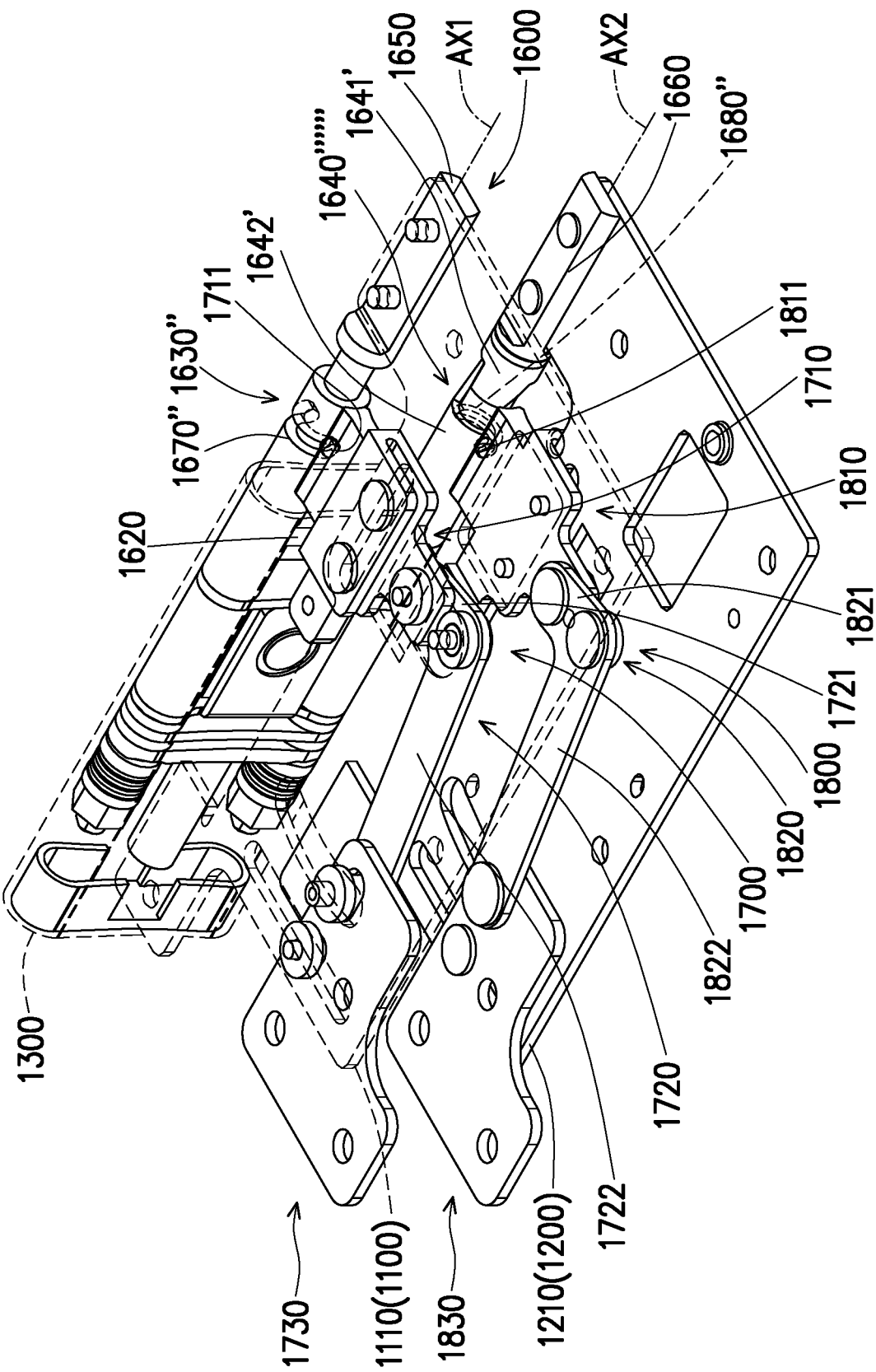

FIG. 16A is a perspective schematic view of the internal components of the foldable electronic device according to an embodiment of the disclosure. FIG. 16B is an exploded view of the components in FIG. 16A. FIG. 16C illustrates a partial enlarged schematic view of the connecting portion, the first bushing and the second bushing in FIG. 16B from a different perspective. FIG. 16D to FIG. 16G are schematic views of different states of the components in FIG. 16A. For clarity and ease of description, a part of the structure is drawn in dashed lines in FIG. 16A, FIG. 16D to FIG. 16G. The components shown in FIG. 16A to FIG. 16G and the components shown in the above figures denoted by the same or similar symbols have the same or similar configuration and operation principle, and therefore repetition will not be narrated herein. In addition, among the components shown in FIG. 16A to FIG. 16G, the configuration and operation principle of the second bushing 1640""" are the same as or similar to the configuration and operation principle of the first bushing 1630""" shown in FIG. 15A to FIG. 15G, and therefore no repetition is narrated herein. In an embodiment, by mounting the components in FIG. 16A to the inside of the hinge cover 1300, it is possible to make the foldable electronic device 1000 to achieve the changes shown in FIG. 1, FIG. 10, FIG. 3B, and FIG. 11D to FIG. 5C in sequence.

Figure 17:
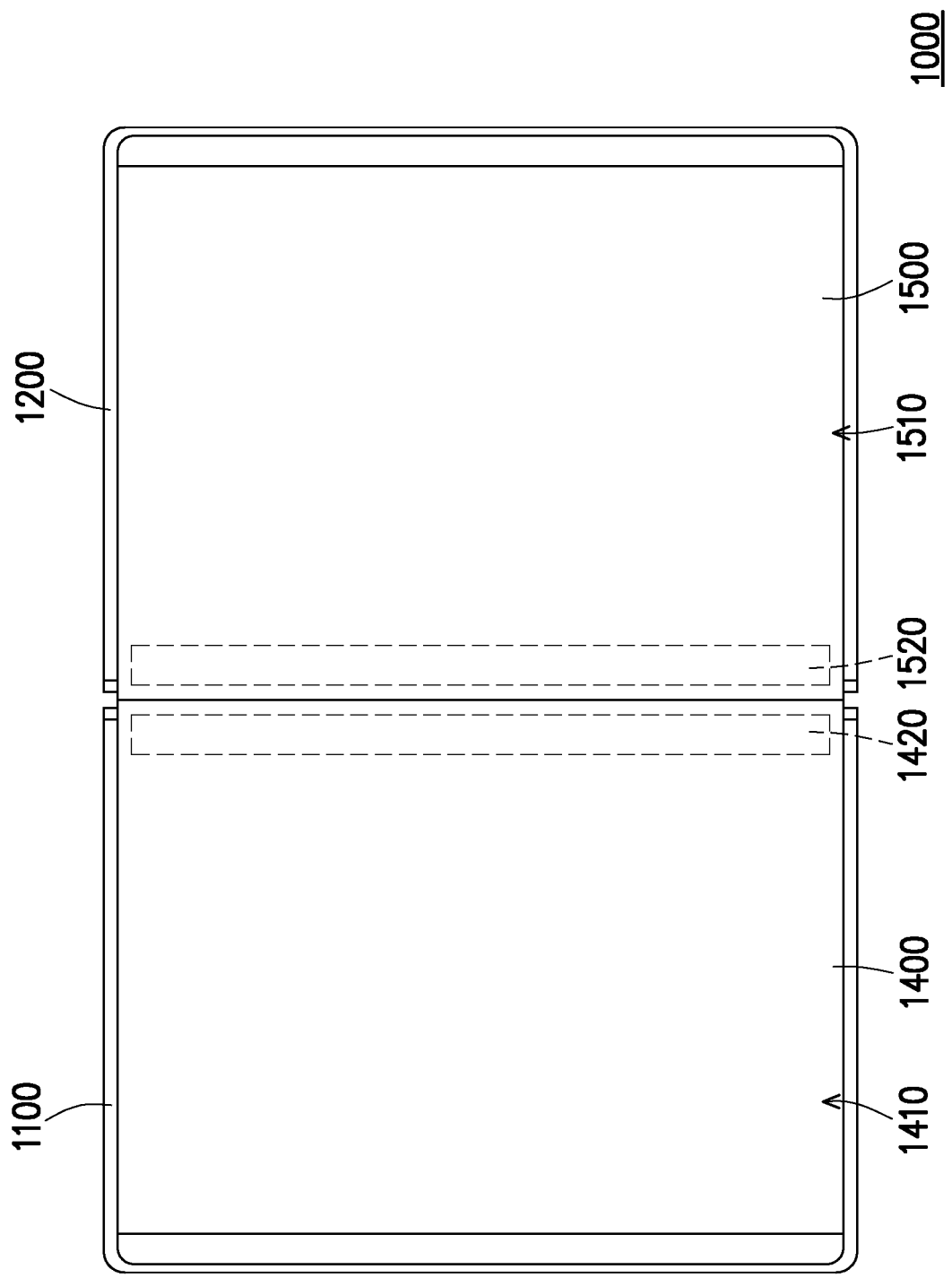
FIG. 17 is a schematic view of the foldable electronic device according to an embodiment of the disclosure.
Figure 18A:
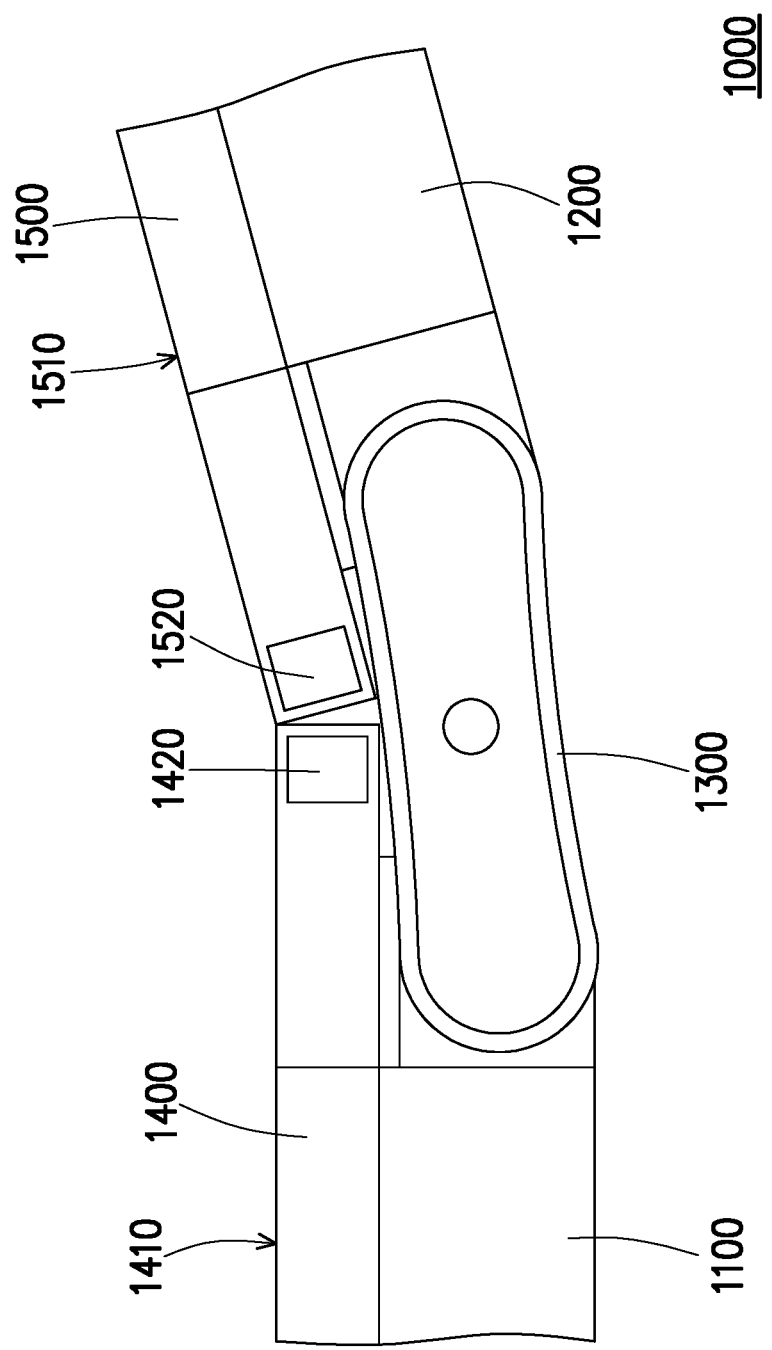
FIG. 18A to FIG. 18C are schematic views of the operation principle of the foldable electronic device of FIG. 17.
Figure 18B:
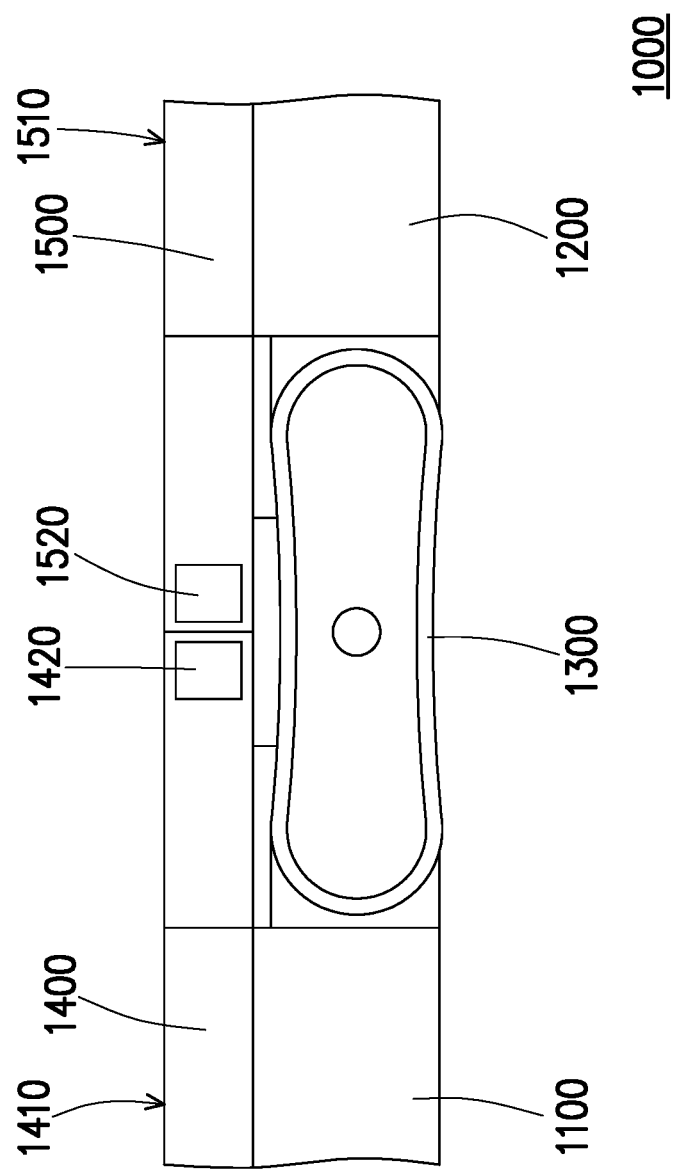
Figure 18C:
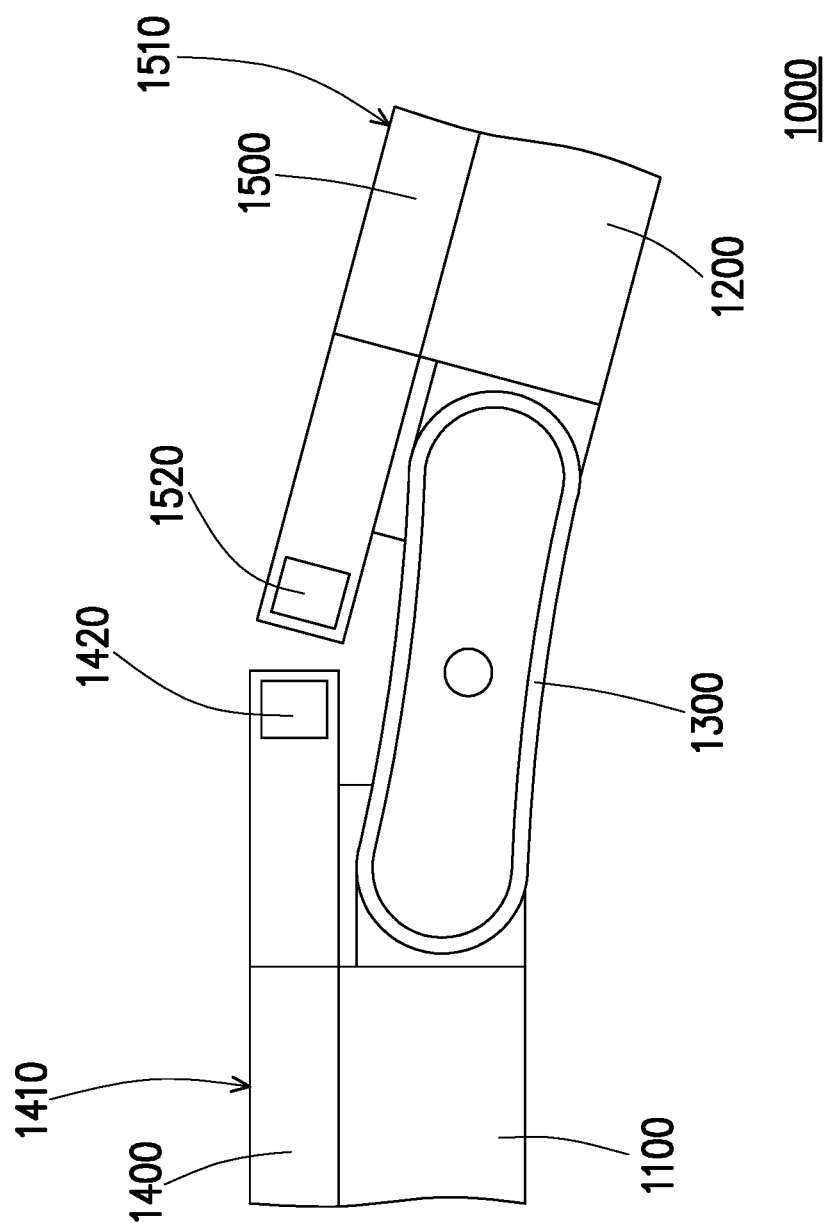

FIG. 17 is a schematic view of the foldable electronic device according to an embodiment of the disclosure. FIG. 18A to FIG. 18C are schematic views of the operation principle of the foldable electronic device of FIG. 17. In an embodiment, the first object 1400 has a first magnetic member 1420 and the second object 1500 has a second magnetic member 1520. The first magnetic member 1420 and the second magnetic member 1520 are, for example but not limited to, a combination of a magnet and a magnet. The first magnetic member 1420 and the second magnetic member 1520 are configured to cooperate with each other to make the first object 1400 slide and abut against the second object 1500, or to make the first object 1400 and the second object 1500 slide and abut against each other. In this manner, when the first object 1400 and the second object 1500 are close to each other as shown in FIG. 18A, the attraction of the first magnetic member 1420 and the second magnetic member 1520 can be used to make the first object 1400 and the second object 1500 closely abut against each other as shown in FIG. 18B. Meanwhile, the first magnetic member 1420 and the second magnetic member 1520 do not prevent the first object 1400 and the second object 1500 from separating from each other as shown in FIG. 18C. Therefore, the arrangement of the first magnetic member 1420 and the second magnetic member 1520 helps to further eliminate the distance between the first object 1400 and the second object 1500. In other embodiments, the first magnetic member and the second magnetic member can be replaced with a combination of a magnet and a magnetic metal according to design requirements.

Figure 19:
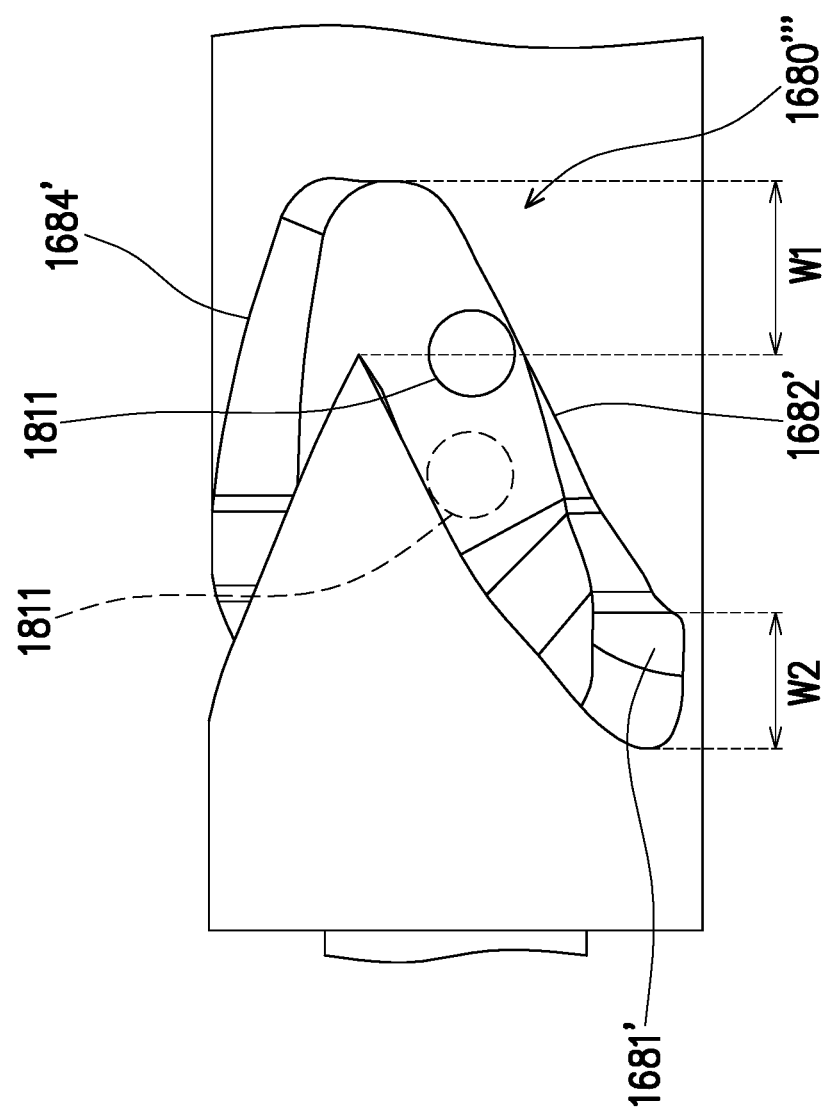
FIG. 19 is a schematic view of the second guiding portion according to an embodiment of the disclosure.

FIG. 19 is a schematic view of the second guiding portion according to an embodiment of the disclosure. In an embodiment, a first width W1 at the junction of the second driving segment 1682' and the second restoring segment 1684' in the second guiding portion 1680''' is greater than a second width W2 at the junction of the second driving segment 1682' and the second idle segment 1681'. Therefore, when the first magnetic member 1420 and the second magnetic member 1520 in FIG. 18A are close to each other, the second linkage portion 1811 will move from the position shown in dashed lines to the position shown in solid lines in FIG. 19. In other words, by making the first width W1 greater than the second width W2, there is a certain space for the second linkage portion 1811 to slide, so that it is possible for the second object 1500 to slide close to the first object 1400 through the sliding action of the second magnetic member 1520 and the first magnetic member 1420.

Figure 20A:
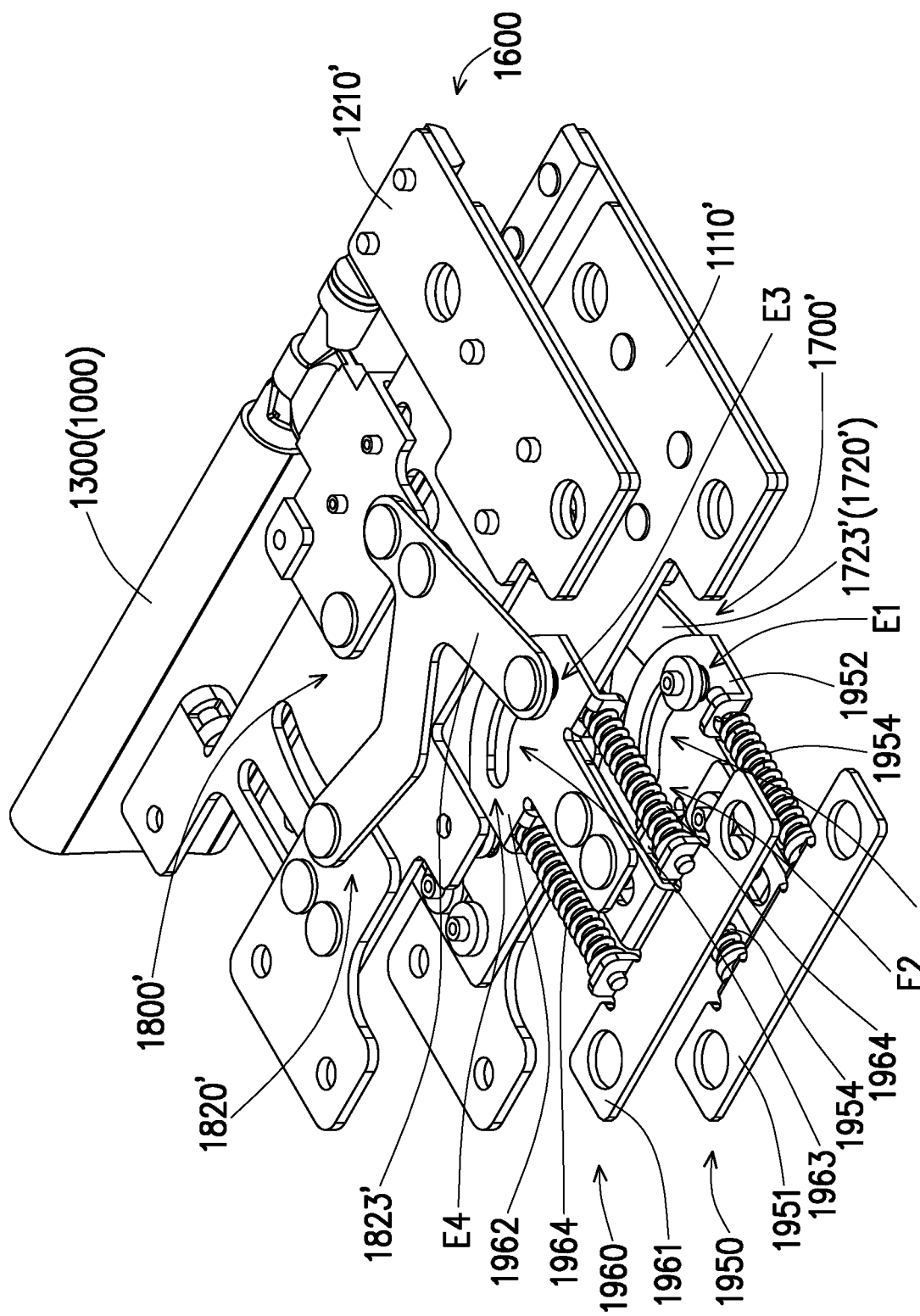
FIG. 20A is a perspective schematic view of the internal components of the foldable electronic device according to an embodiment of the disclosure.
Figure 20B:
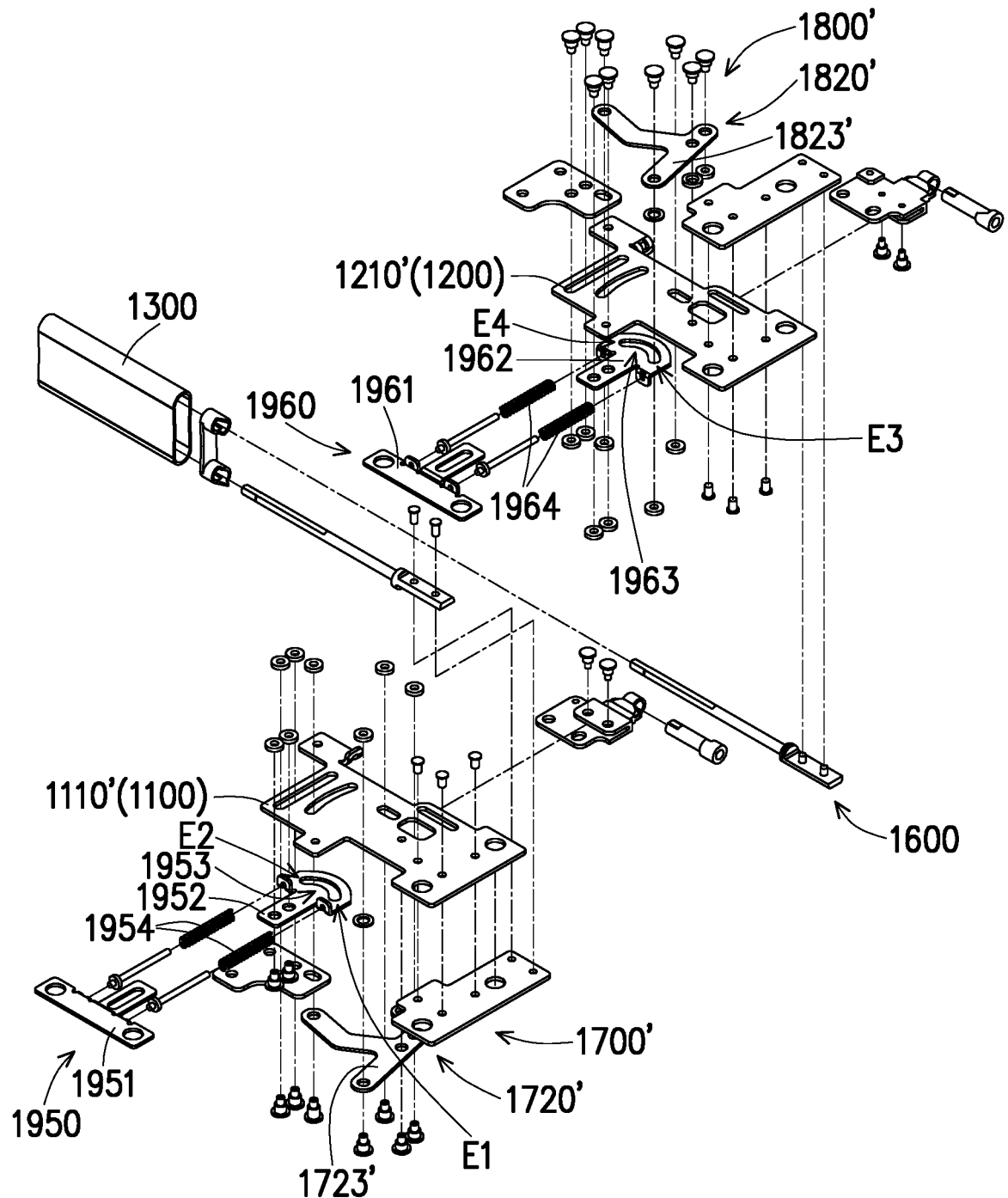
FIG. 20B is an exploded view of the internal components of the foldable electronic device of FIG. 20A.
Figure 20C:
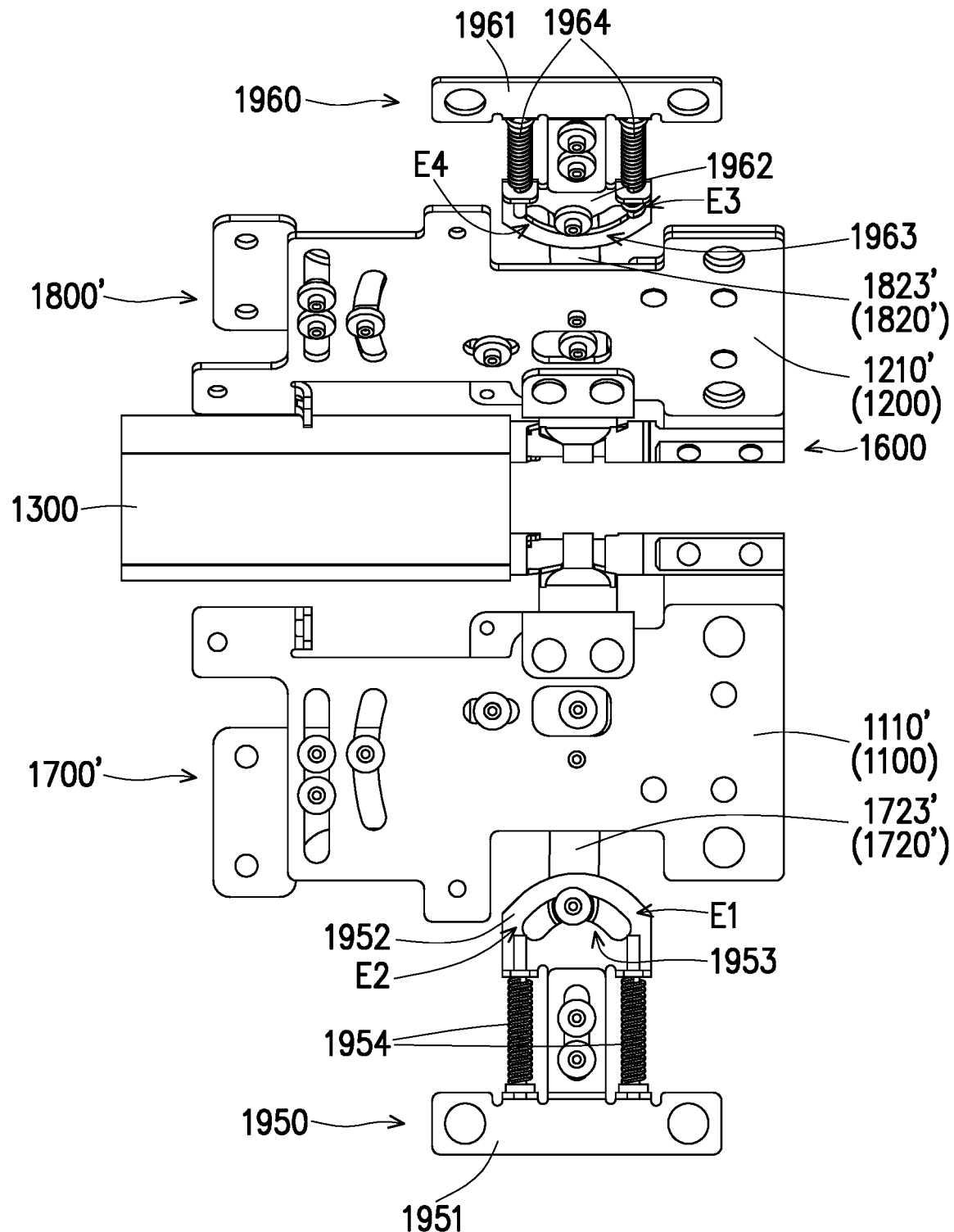
FIG. 20C and FIG. 20D show the operation flow of the internal components of the foldable electronic device of FIG. 20A.
Figure 20D:
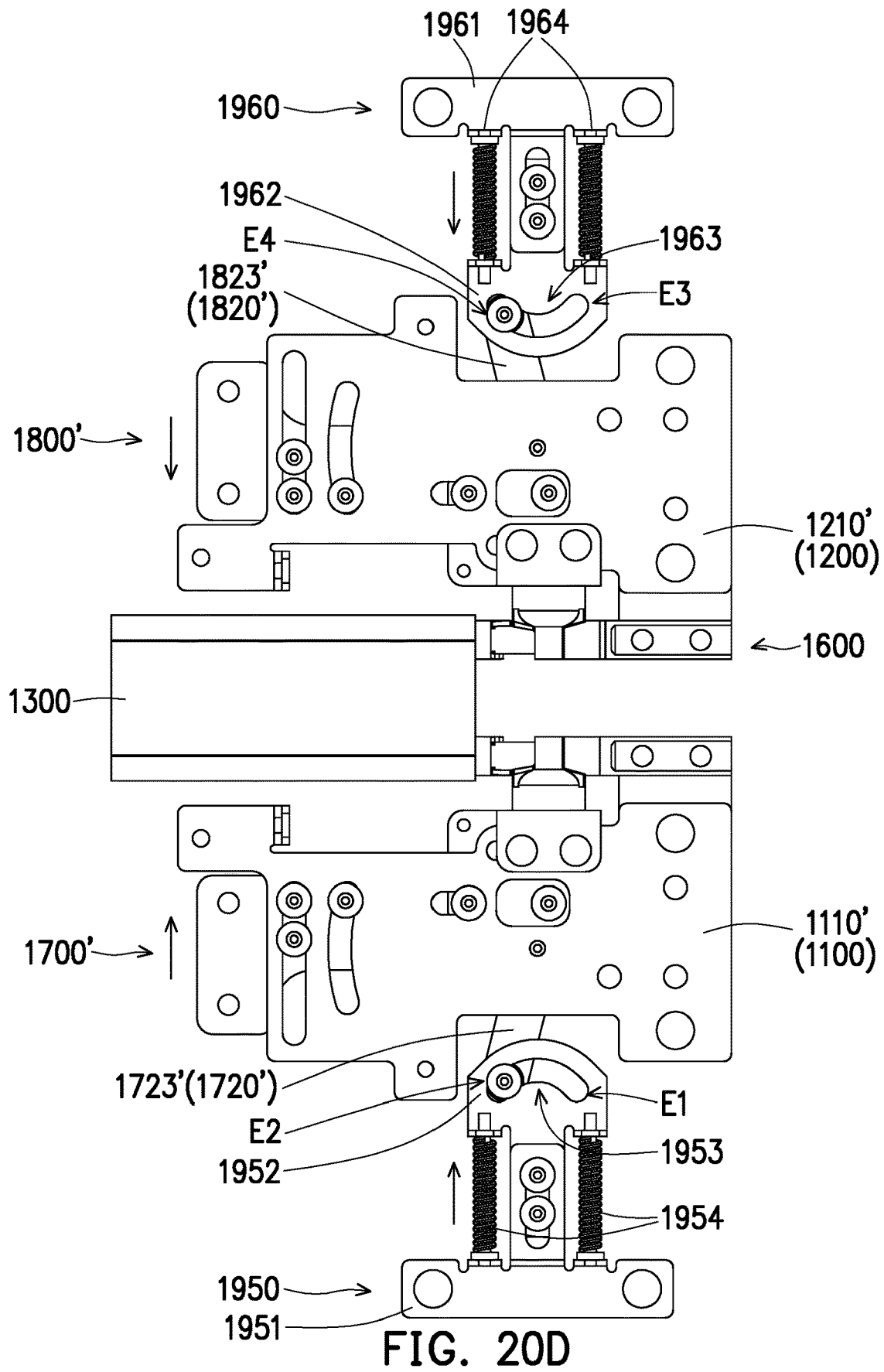

FIG. 20A is a perspective schematic view of the internal components of the foldable electronic device according to an embodiment of the disclosure. FIG. 20B is an exploded view of the internal components of the foldable electronic device of FIG. 20A. FIG. 20C and FIG. 20D show the operation flow of the internal components of the foldable electronic device of FIG. 20A. The components shown in FIG. 20A to FIG. 20D and the components shown in the above-mentioned figures denoted by the same or similar symbols have the same or similar configurations and operation principles, and therefore repetition will not be narrated herein. In an embodiment, the foldable electronic device 1000 in FIG. 3B further includes at least one adjusting mechanism (for example but not limited to the first adjusting mechanism 1950 and the second adjusting mechanism 1960). The first adjusting mechanism 1950 is disposed on the first body 1100, and the first adjusting mechanism 1950 is coupled to the first linkage mechanism 1700' so that the first linkage mechanism 1700' drives the first object 1400 to move toward the dual-axis hinge module 1600. The second adjusting mechanism 1960 is disposed on the second body 1200, and the second adjusting mechanism 1960 is coupled to the second linkage mechanism 1800' so that the second linkage mechanism 1800' drives the second object 1500 to move toward the dual-axis hinge module 1600.

In detail, the first adjusting mechanism 1950 includes a first fixing base 1951, a first driving member 1952, and two first elastic members 1954. The first fixing base 1951 is disposed on the first body 1100. The first driving member 1952 is slidably disposed on the first fixing base 1951. The first driving member 1952 has a first adjusting portion 1953. The first adjusting portion 1953 has, for example but not limited to, an arc shape, and has a first end E1 and a second end E2 opposite to the first end E1. The first driving member 1952 is coupled to the first extending end 1723' of the first linkage 1720' to drive the first linkage mechanism 1700'. The two first elastic members 1954 are disposed between the first fixing base 1951 and the first driving member 1952 to push the first driving member 1952 to move away from the first fixing base 1951. During the process where the second body 1200 is unfolded relative to the first body 1100 from the state shown in FIG. 20C to the state shown in FIG. 20D, the two first elastic members 1954 push the first driving member 1952 to move toward the dual-axis hinge module 1600. The first extending end 1723' of the first linkage 1720' is guided and abuts against the second end E2, such that the first object 1400 slides and abuts against the second object 1500. Therefore, the arrangement of the first adjusting mechanism 1950 helps to further eliminate the distance between the first object 1400 and the second object 1500.

Similarly, the second adjusting mechanism 1960 includes a second fixing base 1961, a second driving member 1962, and two second elastic members 1964. The second fixing base 1961 is disposed on the second body 1200. The second driving member 1962 is slidably disposed on the second fixing base 1961. The second driving member 1962 has a second adjusting portion 1963. The second adjusting portion 1963 has, for example but not limited to, an arc shape, and has a third end E3 and a fourth end E4 opposite to the third end E3. The second driving member 1962 is coupled to the second extending end 1823' of the second linkage 1820' to drive the second linkage mechanism 1800'. The two second elastic members 1964 are disposed between the second fixing base 1961 and the second driving member 1962 to push the second driving member 1962 to move away from the second fixing base 1961. During the process where the second body 1200 is unfolded relative to the first body 1100 from the state shown in FIG. 20C to the state shown in FIG. 20D, the two second elastic members 1964 push the second driving member 1962 to move toward the dual-axis hinge module 1600. The second extending end 1823' of the second linkage 1820' is guided and abuts against the fourth end E4, such that the first object 1400 slides and abuts against the second object 1500. Therefore, the arrangement of the second adjusting mechanism 1960 helps to further eliminate the distance between the first object 1400 and the second object 1500.

In summary, in the foldable electronic device of the disclosure, when the first body and the second body are parallel to each other, through the configuration that the first object slides close to the dual-axis hinge module or that the first object and the second object both simultaneously slide close to the dual-axis hinge module, the distance between the first object and the second object can be eliminated to achieve a better viewing effect.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. A foldable electronic device, comprising:
   a first body and a second body;
   a dual-axis hinge module disposed between the first body and the second body;
   a first linkage mechanism disposed on the first body and coupled to the dual-axis hinge module;
   a second linkage mechanism disposed on the second body and coupled to the dual-axis hinge module;
   a first object slidably disposed on the first body and connected with the first linkage mechanism; and
   a second object slidably disposed on the second body and connected with the second linkage mechanism;
   wherein when a first included angle is formed between the first body and the second body when they are rotated relative to each other through the dual-axis hinge module, the first object is at a first initial position relative to the first body, and the second object is at a second initial position relative to the second body, the first object and the second object are relatively far away from the dual axis module,
   when a second included angle is formed between the first body and the second body when they are rotated relative to each other through the dual-axis hinge module, the first object slides away from the first initial position relative to the first body, and the second object slides away from the second initial position relative to the second body, and the first object and the second object are relatively close to each other, the first object and the second object are relatively close to the dual axis module, wherein the second included angle is greater than the first included angle, when the second body is unfolded relative to the first body from the first included angle to the second included angle, the first included angle and the second included angle are the included angles of the second body relative to the first body on the side with a smallest angle.

2. The foldable electronic device according to claim 1, wherein the first object and the second object respectively have a first magnetic member and a second magnetic member to cooperate with each other so that the first object and the second object slide and abut against each other.

3. The foldable electronic device according to claim 1, wherein when a third included angle is formed between the first body and the second body while they are rotated relative to each other through the dual-axis hinge module, the first object is maintained at a position after sliding relative to the first body while still being far away from the first initial position, and the second object is maintained at a position after sliding relative to the second body while still being far away from the second initial position, wherein the third included angle is different from the second included angle.

4. The foldable electronic device according to claim 3, wherein when a fourth included angle is formed between the first body and the second body while they are rotated relative to each other through the dual-axis hinge module, the first object is maintained at a position after sliding relative to the first body while still being far away from the first initial position, and the second object is maintained at a position after sliding relative to the second body while still being far away from the second initial position, wherein the fourth included angle is different from the third included angle.

5. The foldable electronic device according to claim 1, wherein when a third included angle is formed between the first body and the second body while they are rotated relative to each other through the dual-axis hinge module, the first object is at the first initial position relative to the first body, and the second object is at the second initial position relative to the second body, wherein the third included angle is different from the second included angle.

6. The foldable electronic device according to claim 1, wherein the first body has a first bracket, the second body has a second bracket, the first linkage mechanism comprises a first sliding block, a first linkage, and a first sliding member, the first sliding block is slidably disposed on the first bracket and has a first linkage portion, wherein the first linkage portion is coupled to the dual-axis hinge module, the first linkage is rotatably disposed on the first bracket and coupled to the first sliding block, the first sliding member is slidably disposed on the first bracket and coupled to the first linkage, wherein the first object is fixed at the first sliding member.

7. The foldable electronic device according to claim 6, wherein the second linkage mechanism comprises a second sliding block, a second linkage, and a second sliding member, the second sliding block is slidably disposed on the second bracket and has a second linkage portion, wherein the second linkage portion is coupled to the dual-axis hinge module, the second linkage is rotatably disposed on the second bracket, and is coupled to the second sliding block, the second sliding member is slidably disposed on the second bracket and coupled to the second linkage, wherein the second object is fixed at the second sliding member.

8. The foldable electronic device according to claim 7, wherein the first linkage comprises a first driven end and a first swinging end, the first swinging end is connected to the first driven end, and the first linkage is rotatably disposed on the first bracket through a junction of the first driven end and the first swinging end, the first driven end is coupled to the first sliding block, and the first swinging end is coupled to the first sliding member, wherein the second linkage comprises a second driven end and a second swinging end, the second swinging end is connected to the second driven end, the second linkage is rotatably disposed on the second bracket through a junction of the second driven end and the second swinging end, the second driven end is coupled to the second sliding block, and the second swinging end is coupled to the second sliding member.

9. The foldable electronic device according to claim 1, wherein the first body has a first bracket, the second body has a second bracket, and the dual-axis hinge module comprises:
  a torque module;
  a first bushing and a second bushing arranged side by side with the torque module;
  a first rotating shaft and a second rotating shaft, wherein the first rotating shaft is rotatably disposed through the first bushing, the second rotating shaft is rotatably disposed through the second bushing, and the first bracket is fixed at the first rotating shaft, and the second bracket is fixed at the second rotating shaft.

10. The foldable electronic device according to claim 9, further comprising:
  a synchronization mechanism disposed on the dual-axis hinge module and configured to make the first body and the second body pivot synchronously relative to each other.

11. The foldable electronic device according to claim 10, wherein the dual-axis hinge module further comprises:
  a first guiding portion disposed on the first bushing and coupled to the first linkage mechanism, wherein the first object is fixed at the first linkage mechanism; and
  a second guiding portion disposed on the second bushing and coupled to the second linkage mechanism, wherein the second object is fixed at the second linkage mechanism.

12. The foldable electronic device according to claim 11, wherein the first guiding portion comprises a first idle segment, a first stationary segment, and a first driving segment, and the first idle segment is circumferentially arranged outside the first bushing in a diameter direction of the first bushing, the first stationary segment is circumferentially arranged outside the first bushing in the diameter direction of the first bushing, and the first idle segment and the first stationary segment are located on different cross sections of the first bushing, the first driving segment is connected between the first idle segment and the first stationary segment, and is circumferentially arranged outside the first bushing in the diameter direction and an axis direction of the first bushing.

13. The foldable electronic device according to claim 12, wherein when the first linkage mechanism is coupled to the first idle segment, the first object is at the first initial position relative to the first body, and when the first linkage mechanism is coupled to a junction of the first idle segment and the first driving segment, the first object is at the first initial position relative to the first body, when the first linkage mechanism is coupled to a junction of the first driving segment and the first stationary segment, the first object slides away from the first initial position relative to the first body, wherein when the first linkage mechanism is coupled to the first stationary segment, the first object is away from the first initial position relative to the first body.

14. The foldable electronic device according to claim 12, wherein a first axis is defined at the first bushing, a first idle end point far away from the first driving segment is defined at the first idle segment, and a first idle driving point is defined at a junction of the first idle segment and the first driving segment, a first driving stationary point is defined at a junction of the first driving segment and the first stationary segment, a first stationary end point far away from the first driving segment is defined at the first stationary segment, wherein a first idle center angle is defined at the first axis, the first idle end point, and the first idle driving point, a first driving center angle is defined at the first axis, the first idle driving point, and the first driving stationary point, a first stationary center angle is defined at the first axis, the first driving stationary point, and the first stationary end point, wherein a sum of the first idle center angle, the first driving center angle, and the first stationary center angle is equal to 180 degrees.

15. The foldable electronic device according to claim 12, wherein the second guiding portion comprises a second idle segment, a second stationary segment, and a second driving segment, and the second idle segment is circumferentially arranged outside the second bushing in a diameter direction of the second bushing, the second stationary segment is circumferentially arranged outside the second bushing in the diameter direction of the second bushing, and the second idle segment and the second stationary segment are located on different cross sections of the second bushing, the second driving segment is connected between the second idle segment and the second stationary segment, and is circumferentially arranged outside the second bushing in the diameter direction and an axis direction of the second bushing.

16. The foldable electronic device according to claim 15, wherein a width at a junction of the first driving segment and the first stationary segment is greater than a width at a junction of the first driving segment and the first idle segment, and a width at a junction of the second driving segment and the second stationary segment is greater than a width at a junction of the second driving segment and the second idle segment.

17. The foldable electronic device according to claim 15, wherein when the second linkage mechanism is coupled to the second idle segment, the second object is at the second initial position relative to the second body, and when the second linkage mechanism is coupled to a junction of the second idle segment and the second driving segment, the second object is at the second initial position relative to the second body, wherein when the second linkage mechanism is coupled to a junction of the second driving segment and the second stationary segment, the second object slides away from the second initial position relative to the second body, and when the second linkage mechanism is coupled to the second stationary segment, the second object is away from the second initial position relative to the second body.

18. The foldable electronic device according to claim 15, wherein a second axis is defined at the second bushing, a second idle end point far away from the second driving segment is defined at the second idle segment, a second idle driving point is defined at a junction of the second idle segment and the second driving segment, a second driving stationary point is defined at a junction of the second driving segment and the second stationary segment, a second stationary end point far away from the second driving segment is defined at the second stationary segment, wherein a second idle center angle is defined at the second axis, the second idle end point and the second idle driving point, a second driving center angle is defined at the second axis, the second idle driving point and the second driving stationary point, and a second stationary center angle is defined at the second axis, the second driving stationary point and the second stationary end point, wherein a sum of the second idle center angle, the second driving center angle and the second stationary center angle is equal to 180 degrees.

19. The foldable electronic device according to claim 11, wherein the first guiding portion comprises a first idle segment, a first driving segment, a first restoring segment, and a first stationary segment, the first idle segment is circumferentially arranged outside the first bushing in a diameter direction of the first bushing, the first driving segment is circumferentially arranged outside the first bushing in the diameter direction and an axis direction of the first bushing, and the first restoring segment is circumferentially arranged outside the first bushing in the diameter direction and the axis direction of the first bushing, wherein when the first driving segment is connected between the first idle segment and the first restoring segment, and the first stationary segment is circumferentially arranged outside the first bushing in the diameter direction of the first bushing, and the first idle segment and the first stationary segment are located on a same cross section of the first bushing, wherein the first restoring segment is connected between the first driving segment and the first stationary segment.

20. The foldable electronic device according to claim 19, wherein when the first linkage mechanism is coupled to the first idle segment, the first object is at the first initial position relative to the first body, and when the first linkage mechanism is coupled to a junction of the first idle segment and the first driving segment, the first object is at the first initial position relative to the first body, wherein when the first linkage mechanism is coupled to a junction of the first driving segment and the first restoring segment, the first object slides away from the first initial position relative to the first body, when the first linkage mechanism is coupled to a junction of the first restoring segment and the first stationary segment, the first object slides to be at the first initial position relative to the first body, wherein when the first linkage mechanism is coupled to the first stationary segment, the first object is at the first initial position relative to the first body.

21. The foldable electronic device according to claim 19, wherein a first axis is defined at the first bushing, a first idle end point far away from the first driving segment is defined at the first idle segment, and a first idle driving point is defined at a junction of the first idle segment and the first driving segment, a first driving restoring point is defined at a junction of the first driving segment and the first restoring segment, a first restoring stationary point is defined at a junction of the first restoring segment and the first stationary segment, a first stationary end point far away from the first restoring segment is defined at the first stationary segment, wherein a first idle center angle is defined at the first axis, the first idle end point and the first idle driving point, a first driving center angle is defined at the first axis, the first idle driving point and the first driving restoring point, a first restoring center angle is defined at the first axis, the first driving restoring point and the first restoring stationary point, a first stationary center angle is defined at the first axis, the first restoring stationary point and the first stationary end point, wherein a sum of the first idle center angle, the first driving center angle, the first restoring center angle and the first stationary center angle is equal to 180 degrees.

22. The foldable electronic device according to claim 19, wherein the second guiding portion comprises a second idle segment, a second driving segment, a second restoring segment, and a second stationary segment, and the second idle segment is circumferentially arranged outside the second bushing in a diameter direction of the second bushing, the second driving segment is circumferentially arranged outside the second bushing in the diameter direction and an axis direction of the second bushing, the second restoring segment is circumferentially arranged outside the second bushing in the diameter direction and the axis direction of the second bushing, wherein the second driving segment is connected between the second idle segment and the second restoring segment, the second stationary segment is circumferentially arranged outside the second bushing in the diameter direction of the second bushing, and the second idle segment and the second stationary segment are located on a same cross section of the second bushing, wherein the second restoring segment is connected between the second driving segment and the second stationary segment.

23. The foldable electronic device according to claim 22, a width of a junction of the first driving segment and the first restoring segment is greater than a width of a junction of the first driving segment and the first idle segment, and a width of a junction of the second driving segment and the second restoring segment is greater than a width of a junction of the second driving segment and the second idle segment.

24. The foldable electronic device according to claim 22, wherein when the second linkage mechanism is coupled to the second idle segment, the second object is at the second initial position relative to the second body, wherein when the second linkage mechanism is coupled to a junction of the second idle segment the second driving segment, the second object is at the second initial position relative to the second body, and wherein when the second linkage mechanism is coupled to a junction of the second driving segment and the second restoring segment, the second object slides away from the second initial position relative to the second body, wherein when the second linkage mechanism is coupled to a junction of the second restoring segment and the second stationary segment, the second object slides to be at the second initial position relative to the second body, wherein when the second linkage mechanism is coupled to the second stationary segment, the second object is at the second initial position relative to the second body.

25. The foldable electronic device according to claim 22, wherein a second axis is defined at the second bushing, a second idle end point far away from the second driving segment is defined at the second idle segment, a second idle driving point is defined at a junction of the second idle segment and the second driving segment, a second driving restoring point is defined at a junction of the second driving segment and the second restoring segment, a second restoring stationary point is defined at a junction of the second restoring segment and the second stationary segment, a second stationary end point far away from the second restoring segment is defined at the second stationary segment, wherein a second idle center angle is defined at the second axis, the second idle end point and the second idle driving point, a second driving center angle is defined at the second axis, the second idle driving point and the second driving restoring point, a second restoring center point is defined at the second axis, the second driving restoring point and the second restoring stationary point, and a second stationary center angle is defined at the second axis, the second restoring stationary point and the second stationary end point, wherein a sum of the second idle center angle, the second driving center angle, the second restoring center angle and the second stationary center angle is equal to 180 degrees.

26. The foldable electronic device according to claim 9, wherein the first bushing is slidably disposed on the first rotating shaft, and the second bushing comprises a first sleeve, a second sleeve, and a third sleeve arranged in sequence, the first sleeve is sleeved on the second rotating shaft and engaged with the second rotating shaft, the second sleeve is slidably and rotatably sleeved on the first sleeve, and is connected to the first bushing through a connecting portion, the third sleeve is sleeved on the first sleeve and is engaged with the first sleeve, wherein the dual-axis hinge module further comprises:
- a first guiding portion disposed on the first bushing, wherein the first linkage mechanism is coupled to the first guiding portion, and the first object is fixed at the first linkage mechanism;
- a second guiding portion disposed on the second sleeve, wherein the second linkage mechanism is coupled to the first guiding portion, and the second object is fixed at the second linkage mechanism;
- a first pushing portion arranged on the second sleeve; and
- a second pushing portion arranged on the third sleeve, and configured to cooperate with the first pushing portion to push the second sleeve to slide toward the first sleeve, so that the first object slides away from the initial position relative to the first body.

27. The foldable electronic device according to claim 26, wherein the dual-axis hinge module further comprises:
- a third pushing portion arranged on the second sleeve; and
- a fourth pushing portion arranged on the first sleeve and configured to cooperate with the third pushing portion to push the second sleeve to slide toward the third sleeve, so that the first object slides to be at the initial position relative to the first body.

28. The foldable electronic device according to claim 27, wherein the dual-axis hinge module further comprises:
- a fifth pushing portion arranged on the second sleeve; and
- a sixth pushing portion arranged on the first sleeve and configured to cooperate with the fifth pushing portion to push the second sleeve to slide toward the third sleeve, so that the first object slides toward the initial position relative to the first body.

29. The foldable electronic device according to claim 1, further comprising:
- a first adjusting mechanism disposed on the first body and coupled to the first linkage mechanism, wherein the first adjusting mechanism comprises:
- a first fixing base arranged on the first body;
- a first driving member slidably disposed on the first fixing base and coupled to the first linkage mechanism; and
- two first elastic members disposed between the first fixing base and the first driving member; and
- a second adjusting mechanism disposed on the second body and coupled to the second linkage mechanism, wherein the second adjusting mechanism comprises:
- a second fixing base arranged on the second body;
- a second driving member slidably disposed on the second fixing base and coupled to the second linkage mechanism; and
- two second elastic members arranged between the second fixing base and the second driving member.

30. The foldable electronic device according to claim 29, wherein the first driving member has a first adjusting portion coupled to the first linkage mechanism, wherein the first adjusting portion is arc-shaped and has a first end and a second end opposite to each other, wherein when the two first elastic members push the first driving member to move toward the dual-axis hinge module, the first linkage mechanism abuts against the second end, wherein the second driving member has a second adjusting portion coupled to the second linkage mechanism, wherein the second adjusting portion is arc-shaped and has a third end and a fourth end opposite to each other, when the two second elastic members push the second driving member to move toward the dual-axis hinge module, the second linkage mechanism abuts against the fourth end.

* * * * *